United States Patent [19]

Ferstenberg et al.

[11] Patent Number: 5,873,071
[45] Date of Patent: Feb. 16, 1999

[54] COMPUTER METHOD AND SYSTEM FOR INTERMEDIATED EXCHANGE OF COMMODITIES

[75] Inventors: Robert A. Ferstenberg, Concord; Mauricio Karchmer, Chestnut Hill, both of Mass.; Ran Hilai, Beverly Hills, Calif.

[73] Assignee: ITG Inc., New York, N.Y.

[21] Appl. No.: 856,741

[22] Filed: May 15, 1997

[51] Int. Cl.[6] .................................................. G06F 17/60
[52] U.S. Cl. .............................................. 705/37; 705/36
[58] Field of Search ........................................ 705/37, 36

[56] References Cited

U.S. PATENT DOCUMENTS

| | | | |
|---|---|---|---|
| 2,134,118 | 10/1938 | Foss | 705/37 |
| 3,573,747 | 4/1971 | Adams et al. | 705/37 |
| 3,581,072 | 5/1971 | Nymeyer et al. | 705/37 |
| 4,412,287 | 10/1983 | Braddock, III | 364/408 |
| 4,674,044 | 6/1987 | Kalmus et al. | 705/37 |
| 4,677,552 | 6/1987 | Sibley, Jr. | 705/37 |
| 4,774,663 | 9/1988 | Musmanno et al. | 364/408 |
| 4,823,265 | 4/1989 | Nelson | 705/35 |
| 4,903,201 | 2/1990 | Wagner | 364/408 |
| 4,980,826 | 12/1990 | Wagner | 705/37 |
| 5,077,665 | 12/1991 | Silverman et al. | 364/408 |
| 5,101,353 | 3/1992 | Lupien et al. | 364/408 |
| 5,126,936 | 6/1992 | Champion et al. | 364/408 |
| 5,136,501 | 8/1992 | Silverman et al. | 705/37 |
| 5,148,365 | 9/1992 | Dembo | 364/402 |
| 5,168,446 | 12/1992 | Wiseman | 364/408 |
| 5,297,031 | 3/1994 | Gutterman et al. | 364/408 |
| 5,305,200 | 4/1994 | Hartheimer et al. | 364/408 |
| 5,517,406 | 5/1996 | Harris et al. | 364/408 |
| 5,710,889 | 1/1998 | Clark et al. | 345/344 |
| 5,727,165 | 3/1998 | Ordish et al. | 705/37 |

FOREIGN PATENT DOCUMENTS

| | | | |
|---|---|---|---|
| PCT/US94/ 09398 | 3/1995 | WIPO | 364/401 |

OTHER PUBLICATIONS

Mencke, Claire; "Finding the Lowest–Cost Path for Stock Trading", Investor's Business Daily May 1, 1996.

ITG, POSIT WWW Page Information; http://www.itginc.com/itg_posit_vol_hist.html, . . . /products.html, . . . /pos works.html, . . . /pos_advan.html, . . . /itg_press_rel1.html, . . . /4qpress.html, . . . /pressindi.html, . . . /products/posit.html,http://www.posit.com/4con_0.

Corcella, Karen; "Symphony Plays a Solo", Wall Street and Technology, v12, n11, pp. 22–23, Mar. 1995.

(List continued on next page.)

*Primary Examiner*—Allen R. MacDonald
*Assistant Examiner*—Philip Marsh
*Attorney, Agent, or Firm*—Pennie & Edmonds LLP

[57] ABSTRACT

In a preferred embodiment, this invention includes software processes distributed on one or more computer systems that exchange messages in order to facilitate an intermediated exchange of financial commodities between a plurality of participants. The messages are exchanged according to a preferred protocol that leads to a satisfactory exchange that meets the objectives of the participants, and that substantially maximizes in a fair manner the total amount of financial commodities exchanged. Optionally, the invention employs heuristic rules in association with the preferred protocol that adapt the protocol to the time and exchange requirements of financial commodities. In other embodiments, this invention is equally applicable to the exchange of any tangible or intangible commodities. In a general embodiment, this invention further includes a preferred message-exchange protocol for the construction of computer programs representing exchange participants and an intermediary. These constructed computer programs exchange messages such that a satisfactory intermediated exchange of commodities is substantially certain to be achieved.

85 Claims, 11 Drawing Sheets

OTHER PUBLICATIONS

Oppenheim, Eve; "G–183 Electronic Trading Systems: Which, Why, Where" http://www.buscom.com/commu/G183.html.

Oppenheim Eve; "Electronic Trading Systems: Which, Why, Where", G–183, Business Communications Co., Inc. Report, pp. 134–136.

ITG QuantEx, brochure.

ITG Platform, Brochure.

Platform 2.0 Software Installation Guide dated Jan. 22, 1998.

Orford, James; "Trading on the Frontier", Plan Sponsor, Oct. 1996.

Kansas, Dave; "OptiMark Technologies to Announce Trading System Aimed at Institutions"; Wall Street Journal; Sep. 24, 1996.

Banks, Howard; "Great Expectations", Forbes, Dec. 2, 1996.

"NYSE Technology Chief Joins Digital Stock Market Effort; Wit Capital Acquires Software Plus Core Development Team", Business Wire, Sep. 4, 1996.

"Introducing the OptiMark System," Technologies, Inc.

OptiMark Press Release entitled "OptiMark, IBM, Dow Jones, State Street Bank, Pacific Stock Exchange and Chicago Board Options Exchange Exchange Team Up To Introduce Revolutions Trading System".

Letter to Attorney Simon at Foley & Lardner from the SEC; Nov. 30, 1994 re Chicago Match with enclosure "The Chicago Mach Functional Specification Input via extensive text file".

"ITG POSIT" Brochure.

Printout from Internet of information about "Net Exchange".

"POSIT, Portfolio System for Institutional Trading", User's Guide.

COMPUTER METHOD AND SYSTEM FOR INTERMEDIATED EXCHANGE OF COMMODITIES

1. FIELD OF THE INVENTION

The field of this invention is computerized information systems directed to commercial applications; in particular computer systems that facilitate an automatic exchange of commodities between users of such a computer system according to the users' goals.

2. BACKGROUND

An intermediated exchange involves negotiated trading between two or more participants through a third-party, the intermediary. Specifically, in such an intermediated exchange, the participants do not communicate directly with each other, but rather through the third-party intermediary. Examples of items traded include intangibles, such as securities (stocks, bonds, and options) commodity futures, collateralized mortgage obligations, and pollution rights, as well as tangibles, such as copper or soy beans. All such items involved in an intermediated exchange are herein referred to as "commodities." In fact, any item that can be traded is a commodity.

In the case of stocks and options, there are several examples of intermediaries, which differ depending on the status of the securities as listed or as over-the-counter ("OTC") (i.e., unlisted). Listed stocks and options can be traded on securities exchanges, such as the New York Stock Exchange ("NYSE"), the American Stock Exchange ("AMEX"), and the Chicago Board of Options Exchange ("CBOE"). Specialists on the floors of these exchanges act as intermediaries for listed securities and, typically, have positions in the securities that they intermediate. Over-the-counter securities can be traded on a computer network, known as "NASDAQ," which links securities dealers who make markets and typically maintain positions in certain of these OTC securities. These networked dealers continually make available on NASDAQ the highest price at which they will buy a security ("bid price") and the lowest price at which they will sell a security ("offer price"). They then act as intermediaries between buyers and sellers of those securities for which they make markets. Also, they can trade with each other. Trading on this network is regulated by the National Association of Securities Dealers ("NASD").

Alternately, financial institutions can exchange both listed and OTC securities through intermediaries who form the "fourth" market. Fourth-market intermediaries do not maintain security positions; instead, they act only as agents for market participants, whether as buyers or sellers, maintaining the participant's anonymity and representing the participant's interests. Originally, the fourth market was largely a network of securities brokers communicating primarily by telephone (the "Rolodex" market). Later, Instinet (Reuters, New York, N.Y.) began offering partially automated intermediary services by providing a computer network through which participants can post their security trading interests and subsequently can negotiate trades using standardized messages made available by the network. More recently, POSIT (ITG, New York, N.Y.) and the Arizona Stock Exchange ("AZX") (Phoenix, Ariz.) began providing more fully automated fourth-market intermediary services. Instinet, POSIT, and AZX are referred to as "crossing networks" because they provide intermediary services with varying degrees of computer and communications technology.

In the simple form as currently practiced, a crossing-network intermediated exchange involves two participants who seek, through a computerized intermediary, to buy and/or sell a given amount of a given commodity at a given price. The amount of the commodity is determined by the network. In more complex forms, an intermediated exchange can be desirable where multiple participants who seek, through an intermediary, to buy and/or sell multiple commodities, each with a different price. For example, a portfolio manager may seek to execute an optimized series of commodity exchanges that are interdependent in the sense that, if some exchanges of the series cannot be executed, the portfolio manager would prefer to withdraw the previous series and submit for execution a new series of exchanges. In this more complex case of multiple commodities and optimized exchange strategies, the intermediary may provide for selecting the actual commodities to be exchanged from a list of possible commodities, as well as for determining the amounts and prices that satisfy the more-complex conditions of the participants. It is believed that no current network provides such more-complex exchanges. See, e.g., Orford, Trading on the Frontier, *Plan Sponsor*, October 1996, pp. 18–27.

Most market exchanges of financial commodities involve a specific, single instrument, e.g., "IBM stock," and two counter-parties, one the buyer and the other the seller. Even the most adaptable crossing networks require participants to supply a list of specific commodities they will exchange. But as the size and complexity of commerce and investment has grown, participants have become less interested in single commodities or lists of specific commodities and have become more interested in expressing their exchange goals as portfolios of commodities, which are drawn from a general universe of acceptable commodities and which achieve certain target-risk, return, and exposure profiles.

In this way, the composition of the associated intermediated exchange would be less dependent on any single investment or list and more dependent on the aggregate characteristics of all the commodities combined. The motivation for this approach is that it permits the participant the flexibility to dynamically adapt to market conditions that affect the price and availability of individual commodities. Currently, computer systems that support existing markets or crossing networks are not able to accommodate the evolving needs of participants, such as investment managers and others, who seek to trade multiple commodities to achieve general portfolio goals.

In addition, an intermediated exchange meeting those portfolio goals for multiple participants requires a computerized solution of what is known as a competitive equilibrium problem. See, e.g., Ellickson, 1993, *Competitive Equilibrium—Theory and Applications*, Cambridge University Press. Currently, no satisfactory solution exists for that problem as applied to the specific situations of intermediated exchanges.

3. SUMMARY OF THE INVENTION

This invention provides a computer system (a computer-based machine including hardware and software) for intermediated exchange that is capable of facilitating exchanges of multiple commodities for multiple participants according to their goals. In the preferred implementation the computer system of this invention is used for the exchange of financial commodities according to mean-variance portfolio goals and related portfolio constraints. In the preferred implementation, participants can include investors and investing entities. A single participant can appear in an intermediated exchange single or multiple times. In the latter case, each appearance of a participant can be governed by the same or different objectives.

The system of the preferred embodiment implements a negotiation protocol that facilitates the intermediated exchange of commodities between any number of participants according to their goals. This negotiation protocol specifies how to search through possible combinations of exchanges between participants in order to identify the combination that balances the goals of the intermediary with the goals of the participants in the exchange. The protocol addresses both the determination of which commodities are exchanged among participants and the amount of each commodity exchanged. It also provides a solution for the competitive equilibrium problem as it is applied to intermediated exchanges. A computer program constructed according to this protocol, together with accompanying hardware, permits participants electronically and automatically to carry out negotiations for the transfer of commodities through an intermediary.

A computer program constructed according to this invention includes electronic agents ("e-agents"), each of which represents a participant's exchange goals, and an electronic intermediary, through which the e-agents conduct electronic negotiations leading to an intermediated exchange. The e-agent program for a participant encodes the exchange goals and objectives of that participant. Participants can express their goals and objectives either (1) as an objective (or utility) function together with optional constraints, or (2) through a set of rules, which can be represented in a procedural computer language. Other ways of expressing objectives may be supported by a particular embodiment. However expressed, the participants' objectives can be encoded in a computer program that automatically selects commodities to buy and sell from the universe of acceptable commodities on the basis of current market conditions. Systems for intermediated exchange that do not take into account participants' general goals can simply be represented as special cases of the general e-agents of this invention.

According to this invention, the e-agents negotiate an intermediated exchange through an intermediary computer program. E-agents, acting in conjunction with the intermediary, process data so as to substantially maximize a tradeoff between the amounts exchanged and the fairness of the exchange. An intermediary program constructed according to this invention acts to substantially maximize the aggregate number of units of commodities exchanged in a fair manner that is acceptable to the participants.

A preferred implementation of this embodiment represents the e-agents and the intermediary as one or more software processes residing on one or more computers. If multiple computers are used, the are interconnected by a network. These processes carry out the general negotiation of this invention by exchanging offer and counter-offer messages over this network and/or using an inter-process messages mechanism. Preferably, participants access this system for submitting exchange orders and receiving exchange responses over network connections. These network connections can be private networks or suitably secured public networks, such as the Internet. In the preferred embodiment, this invention is adapted to the exchange of financial commodities, particularly equity securities, but also including commodity futures, stock options, collateralized mortgage obligations, and other financial commodities, individually or combined (e.g. equities and futures or equity options combined). Equity securities are those securities that represent an ownership interest in property.

Five embodiments of this invention will be described. In a first general embodiment, this invention comprises a computer system for electronic intermediated exchange of a plurality of commodities among a plurality of participants. This computer system includes: a plurality of e-agent computer programs running on at least one computer, each participant being associated with at least one of the e-agent programs, and each e-agent program storing in an associated electronic memory digital data representing commodity exchange objectives of its associated participant; an electronic intermediary program running on at least one computer system, the intermediary program storing in an associated electronic memory digital data representing commodity exchange objectives of the intermediated exchange and exchanging electronic offer and counter-offer messages with the e-agent programs. According to this message exchange (i) the e-agent programs receive the electronic offer messages from the intermediary program, generate the electronic counter-offer messages according to the exchange objectives of the associated participants, and send the counter-offer messages to the intermediary program, and (ii) the intermediary program receives the electronic counter-offer messages from the e-agent programs, generates offer messages according to the exchange objectives of the intermediated exchange, and sends the offer messages to the e-agent programs.

This first embodiment can include several more detailed and particular embodiments and aspects, such as the following. In one aspect, the exchange of electronic messages between the intermediary program and the e-agent programs converges to an exchange of commodities that is substantially satisfactory both to the participants, according to the digital data representing the commodity exchange objectives of the participants, and also to the intermediary program, according to the digital data representing commodity exchange objectives of the intermediated exchange. Alternatively, the exchange of electronic messages terminates when the e-agent programs generate counter-offer messages accepting all the amounts of commodities offered in the immediately preceding offer messages received from the intermediary program.

In another aspect of the first embodiment, the electronic offer messages contain digital data representing the amounts of the commodities that the intermediary program offers to the e-agent programs, and the electronic counter-offer messages contain digital data representing the amounts of the commodities that the e-agent programs accept from the intermediary program. Further, the e-agent programs and the intermediary program can exchange messages according to sequential rounds of an electronic negotiation, each round of the negotiation comprising the intermediary program sending electronic offer messages to the e-agent programs followed by the e-agent programs sending electronic counter-offer messages to the intermediary program.

In another aspect of the first embodiment, the electronic memory associated with the intermediary program stores digital data representing a plurality of current and preceding bounds, each current bound representing the maximum amount of a particular commodity that can be offered to a particular e-agent program in a current round of the electronic negotiation and each preceding bound being a current bound from a preceding round of the electronic negotiation. In this case, the intermediary program generates offer messages offering amounts of commodities less than or equal to the appropriate one of the current bounds. Alternatively, the plurality of current bounds depends on commodity amounts in the intermediary offer messages, the e-agent counter-offer messages, and the preceding bounds from one or more preceding rounds of the electronic negotiation, and more particularly from the immediately preceding round of the electronic negotiation. Alternatively, the plurality of current bounds depends on commodity amounts in the e-agent counter-offer messages and on the preceding bounds from the immediately preceding round of the electronic negotiation.

In another aspect of the first embodiment, the electronic memory associated with the intermediary program further stores digital data representing a selected round of the electronic negotiation. For rounds before the selected round of negotiation, the plurality of current bounds are selected to be between commodity amounts in the e-agent counter-offer messages and the preceding bounds of the immediately preceding round of the electronic negotiation. For rounds after the selected round of negotiation, the plurality of current bounds are selected to be equal to preceding e-agent counter-offer messages of the immediately preceding round of the electronic negotiation. Alternatively, before the selected round of negotiation the plurality of current bounds are selected to be a weighted average of the commodity amounts in the e-agent counter-offer messages and the preceding bounds of the immediately preceding round of the electronic negotiation.

In another aspect of the first embodiment, the e-agent programs generate counter-offer messages accepting amounts of commodities that are less than or equal to the amounts offered in one or more of the preceding offer messages received from the intermediary program, and more particularly from the immediately preceding offer message. Alternatively, the e-agent programs further send opening messages to the intermediary program before the exchange of offer and counter-offer messages. Each opening message includes digital data representing maximum amounts of commodities each participant will exchange in the intermediated exchange.

In another aspect of the first embodiment, the commodity exchange objectives of the intermediary program comprise that a substantially maximized amount of commodities are exchanged in the intermediated exchange subject to constraints (i) that for each commodity the total amount sold equals the total amount bought by all the e-agent programs, and (ii) that for each commodity the amount sold or bought by each e-agent program is less than the appropriate one of the bounds. Alternatively, the commodity exchange objectives of the intermediary program further include a measure of the unfairness of the share of commodities offered to each e-agent program that is substantially minimized. Alternatively, a measure of the fairness can be substantially maximized. The measure of unfairness increases as the share of commodities offered to each e-agent program differs from a pro-rata share. Preferably, the measure of unfairness increases as the square of the difference of the share of commodities offered to each e-agent program differs from a pro-rata share. The pro-rata share for a commodity for an e-agent program can be determined by the ratio of the bounds for that commodity for that e-agent program to the sum of the bounds for that commodity for all the e-agent programs. Alternatively, the measure of unfairness includes a plurality of adjustable factors, each factor associated with an e-agent program and for adjusting the rate of increase of the measure of unfairness as the share of commodities offered to an e-agent program differs a pro-rata share.

In another aspect of the first embodiment, the intermediary program generates the commodity amounts for the offer messages by substantially maximizing the value of a utility function of the amounts of commodities subject to constraints. The utility function can be a difference of a first term and a second term, the first term representing the total amount of all commodities offered to the e-agent programs and the second term representing the unfairness of the share of commodities offered to the e-agent programs. Alternatively, non-linear terms in the utility function may be approximated by a plurality of piece-wise linear terms. Where commodities are exchanged in whole commercial units, any fractional commercial units generated by substantially maximizing the value of the utility function can be preferably reallocated among the e-agent programs in a fair manner, whereby only whole commercial units of commodities are actually offered.

In another aspect of the first embodiment, at least one of the e-agent programs generates counter-offer messages by executing a program that substantially maximizes the value of a utility function of the commodity amounts. Preferably, the utility function is determined according to mean-variance portfolio methods. Alternatively, the utility function is a difference of two terms, a first term representing the expected return from a portfolio having the commodity amounts and a second term representing the risk of a portfolio having the commodity amounts. The substantial maximization of the utility function can be limited by optional constraints.

In other aspects of the first embodiment, at least one of the e-agent programs generates counter-offer messages by accepting all commodity amounts previously offered by the intermediary program up to certain pre-specified maximum commodity exchange bounds and also limited by optional constraints. Optionally, at least one of the e-agent programs for the associated participant generates counter-offer messages by executing procedural rules having variables referring to the commodity amounts. Optionally at least one of the e-agent programs is provided by the associated participant. Optionally At least one of the e-agent programs is memoryless. Optionally at least one of the participants is associated with more than one e-agent programs. Optionally at least one of the e-agent programs is an autonomously running computer process. Optionally at least one of the e-agent programs are executed on the same computer as the intermediary program. Optionally at least one of the e-agent programs are executed on computers geographically remote from the computer on which the intermediary program is executed.

In another aspect of the first embodiment, this first embodiment includes communications means for sending digital information representing the electronic offer messages and the electronic counter-offer messages between e-agent programs and the intermediary program. The communication means can include the IP or the TCP/IP communication protocols. The communication means can also include inter-process communication of an operating system of a computer running at least one of the e-agent programs and the intermediary program. Alternatively, the communication means includes inter-computer communication means between at least two of the computers where the e-agent programs and the intermediary programs are executed.

In another aspect of the first embodiment, the e-agent programs receive electronic order messages from computers of the associated participants. The order messages contain digital data representing the commodity exchange objectives of the associated participants. Also, the intermediary program can send electronic results messages to the computers of the participants. The results messages contain digital data representing the results of an intermediated exchange. Alternatively, the digital data representing the commodity exchange objectives of the participants is tested before the electronic intermediated exchange begins.

In other aspects of the first embodiment, the first embodiment also includes interface programs that communicate with the computers of the participants for transferring the order messages and the results messages between the computers and the intermediary program. Also, the first embodiment can include an exchange driver program running on at least one computer, such that the interface programs communicate with the intermediary program through the exchange driver program. Also included can be a database program running on at least one computer for storing copies of the order messages and the results messages. Alternatively, the database, in case of a failure in the computer system, can retrieve the copies of the messages in order to recover from failure. Also included can be a supervisor program running on at least one computer, and for periodically testing each program of the computer system to determine if it has failed.

In a second general embodiment, this invention comprises a computer-based method for an electronic intermediated exchange of a plurality of commodities among a plurality of participants. This method includes the steps of: sending a plurality of electronic offer messages generated by an intermediary computer program, which intermediates the intermediated exchange, to a plurality of e-agent computer programs, each e-agent computer program associated with and representing one of the participants, each electronic offer message including digital data representing amounts of commodities offered to the e-agent programs by the intermediary program; sending a plurality of electronic counter-offer messages generated by the e-agent programs to the intermediary program, each electronic counter-offer message including digital data representing amounts of commodities accepted by the e-agent program; and repeating the previous steps in order, each ordered repetition being a round of an electronic negotiation, until the amounts of commodities in the electronic offer messages are substantially satisfactory to the e-agent programs, according to exchange objectives of the participants stored in the e-agent programs, and to the intermediary program, according to objectives for the intermediated exchange stored in the intermediary program. Alternatively, the repetition of the first two steps terminates when the e-agent programs generate counter-offer messages representing acceptance of the total amounts of commodities offered in the immediately preceding offer messages received from the intermediary program.

This second embodiment includes several more detailed and particular embodiments and aspects, such as the following. In one aspect, the counter-offer messages generated by the e-agent programs represent accepted amounts of commodities that are less than or equal to amounts of commodities represented in one or more of the preceding offer messages received from the intermediary program, more particularly from the immediately preceding offer message.

In another aspect of the second embodiment, to generate offer messages, the intermediary program performs a first step of determining digital data representing a plurality of bounds, each bound representing a maximum amount of a particular commodity that can be offered to a particular e-agent program in a current round of the electronic negotiation, followed by a second step of generating the offer messages representing offered amounts of commodities less than or equal to the appropriate one of the bounds. Alternatively, the method further includes, preceding the first step, a further step of sending a plurality of electronic opening messages from the e-agent programs to the intermediary program, each opening message including digital data representing maximum amounts of commodities participants will exchange in the intermediated exchange. The intermediary then sets the initial bounds to be these maximum amounts. Preferably, the bounds in a later round of the negotiation are not greater than the bounds in an earlier round of the negotiation. Further, the plurality of bounds in a current round of the negotiation can depend on commodity amounts represented in the intermediary offer messages, the e-agent counter-offer messages, and the bounds from one or more preceding rounds of the negotiation, more particularly from the immediately preceding round of the negotiation.

In another aspect of the second embodiment, the plurality of current bounds depends on commodity amounts represented in the e-agent counter-offer messages and on the bounds from the immediately preceding round of the negotiation. Alternatively, the plurality of bounds are determined to be a weighted average of commodity amounts represented in the e-agent counter-offer messages and the bounds from the immediately preceding round of the negotiation. Further, after a selected round of the negotiation, the bounds can be determined to be equal to commodity amounts represented in the e-agent counter-offer messages from the immediately preceding round of the negotiation.

In another aspect of the second embodiment, before the first step, the method further can include various preliminary steps. Among these preliminary steps is a step of sending from the intermediary program to the e-agent programs a plurality of electronic initial messages, each initial message including digital data representing the particular commodities that can be exchanged in the intermediated exchange. Also, before the first step, the method can include a step in which the e-agent programs receive and store a plurality of electronic order messages from the participants. Each order message includes digital data representing the exchange objectives of that participant. Another possible preliminary step is a step of the intermediary program receiving and storing electronic objective messages from an operator of the electronic intermediated exchange. The objective messages can include digital data representing the objectives of the intermediated exchange. Additionally, after the last step, the method can include a step of sending a plurality of electronic results messages to each participant. Each results message has digital data representing the amounts of commodities in the satisfactory offer message.

In a third general embodiment, this invention comprises a computer-based method for representing a participant in an intermediated exchange of commodities, the intermediated exchange performed by an electronic negotiation with an intermediary computer program. The method has the following steps: receiving by an e-agent computer program an electronic order message from a computer of the participant, the order message including digital data representing the objectives of the participant for the intermediated exchange in order that the e-agent program can represent the participant; receiving one of a plurality of electronic request messages from the intermediary program; and sending one of a plurality of electronic response messages to the intermediary program in response to the previous request message. The response message is (i) an opening message, if the previous request message was a query for an opening message, the opening message including digital data representing the maximum amounts of commodities that the e-agent program will exchange in the intermediated exchange, and (ii) a counter-offer message, if the previous request message was an offer message, the offer message including digital data representing amounts of commodities offered to the e-agent program by the intermediary program, the counter-offer message including digital data representing amounts of commodities accepted by the e-agent program as determined according to the exchange objectives, the accepted amounts being less than or equal to the offered amounts and being all equal to the offered amounts only if the offered amounts meet the exchange objectives.

This third embodiment includes several more detailed and particular embodiments and aspects, such as the following. In one aspect, the method includes, between the first two steps, a further step of exchanging one or more electronic initial messages between the e-agent program and the intermediary program, the initial messages including digital data representing commodities of interest to the participant according to the exchange objectives as determined by the e-agent program, and commodities participating in the intermediated exchange with prices for the participating commodities as determined by the intermediary program.

In another aspect of the third embodiment, the exchange objectives of the participant can be expressed according to a variety of methods. In a preferred method, the exchange objectives are expressed according to mean-variance portfolio theory. More particularly, the exchange objectives are expressed as a utility function of commodity amounts. Commodity amounts in counter-offer messages are those that substantially maximize the utility function subject to maximum amount constraints given by the previously offered commodity amounts. Further, the utility function can include terms representing expected return and expected risk. In a further method, the exchange objectives are expressed as procedural rules which determine accepted amounts of commodities from offered amounts of commodities.

A program for performing the method of this third embodiment can be recorded on a computer readable medium, either as encoded instructions for causing an electronic computer to function according to this method or as human-readable instructions which can be compiled into such encoded instructions.

In a fourth general embodiment, this invention comprises a computer-based method for an intermediated exchange of commodities among a plurality of participants, each participant represented by an e-agent computer program. The method includes the following steps: sending electronic opening messages to an intermediary computer program from the e-agent programs, the opening messages including digital data representing the maximum amount of each commodity that each e-agent program will exchange in the intermediated exchange; sending electronic offer messages by the intermediary program to the e-agent programs, each offer message including digital data representing amounts of commodities currently offered to each e-agent program, the amounts being determined so that for each commodity the amount being offered for sale by all the e-agent programs equals the amount being offered for purchase by all the e-agent programs; receiving electronic counter-offer messages by the intermediary program from the e-agent programs, each counter-offer message including digital data representing amounts of offered commodities accepted by each e-agent program, the accepted commodity amounts being less than or equal to the offered commodity amounts; repeating the previous two steps in order, each ordered repetition being a round of an electronic negotiation, until the e-agent programs accept all the amounts of commodities offered, the accepted amounts being final commodity amounts; and sending results electronic messages to computers of the participants, the results messages including digital data representing the final commodity amounts.

This fourth embodiment includes several more detailed and particular embodiments and aspects, such as the following. In one aspect, additional steps can precede the first step of this method. One such additional step includes exchanging one or more electronic initial messages between the intermediary programs and the e-agent programs. The initial messages can include digital data representing commodities that the e-agent programs will exchange in the intermediated exchange, and commodities actually participating in the intermediated exchange with their prices. Further initial message can include digital data representing the particular commodities available for exchange in the intermediated exchange.

In another aspect of the fourth embodiment, the second step can further include that the intermediary program, first, determine digital data representing a plurality of bounds, each bound representing a maximum amount of a particular commodity that can be offered to a particular e-agent program in a current round of the electronic negotiation, and second, generates the offer messages representing offered amounts of commodities that are less than or equal to the bounds. The intermediary can determine the bounds initially to be the opening maximum amounts. Preferably, the bounds in a later round of the negotiation are not greater than corresponding bounds in an earlier round of the negotiation.

In another aspect of the fourth embodiment, the plurality of bounds in a current round of the negotiation can depend on commodity amounts represented in the intermediary offer messages, the e-agent counter-offer messages, and the bounds from one or more preceding rounds of the negotiation, more particularly from the immediately preceding round of the negotiation. Alternatively, the plurality of current bounds can depend on commodity amounts represented in the e-agent counter-offer messages and on the bounds from the immediately preceding round of the negotiation. More particularly, the plurality of bounds can be a weighted average of commodity amounts represented in the e-agent counter-offer messages and the bounds from the immediately preceding round of the negotiation. Alternatively, after a selected round of the negotiation, the bounds are determined to be equal to commodity amounts represented in the e-agent counter-offer messages from the immediately preceding round of the negotiation.

A program for performing the method of this fourth embodiment can be recorded on a computer readable medium, either as encoded instructions for causing an electronic computer to function according to this method or as human-readable instructions which can be compiled into such encoded instructions.

In a fifth general embodiment, this invention comprises an order-manager computer system for electronic intermediated exchange of a plurality of commodities among a plurality of participants. The order-manager system comprises: a plurality of client-interface electronic processes for communicating with computers of the participants in order to receive from the participants electronic order messages representing exchange objectives of the participants and to send to the participants electronic results messages representing the commodities exchanged in the intermediated exchange; an exchange-driver electronic process for transferring the order messages and the results messages between the client interface processes and an intermediary electronic process; an electronic database for storing copies of the order and the results messages, and in event of process failure in the order-manager system, for retrieving the message copies in order to restart the failed process; a plurality of e-agent electronic processes, each e-agent process for representing one of the participants according to the exchange objectives by generating electronic counter-offer messages sent to the intermediary process in response to electronic offer messages received from the intermediary process; and the intermediary electronic process for generating the offer messages sent to the e-agent processes in response to the counter-offer messages received from the e-agent processes, the exchange of offer and counter-offer messages being according to a protocol for performing the intermediated exchange, and further for generating the results messages when the intermediated exchange completes. Optionally, this embodiment further includes a plurality of computers for executing the processes of the order-manager system, the computers interconnected by communication means.

This fifth embodiment includes several more detailed and particular embodiments and aspects, such as the following. In one aspect, the offer messages and the counter-offer messages include digital data representing amounts of commodities. Accordingly, the protocol specifies (i) that the amounts of commodities represented in the counter-offer messages are less than or equal to the amounts of commodities represented in immediately preceding corresponding offer messages, and (ii) that the amounts of commodities represented in the offer messages are less than or equal to the amounts of commodities represented in immediately preceding corresponding offer messages.

In other aspects of the fifth embodiment, this embodiment can include additional elements. Such additional elements are a supervisor process for periodically testing other processes of the order-manager system for failure, and in case of failure, for managing restart of the failed process, and a slave-supervisor process for periodically testing the supervisor process for failure, and in case of failure, for assuming the functions of the supervisor process. Other additional elements include a ticker plant process for providing digital data representing the prices of the commodities, and a tape reporting process for forwarding results of an intermediated exchange for public reporting. Alternatively, the intermediary can include, in turn, a communications interface component for communicating messages between the intermediary process and the exchange driver process and the database, an allocation component for performing the computations for generating the offer messages, and a local data area component for storing data to be exchanged between the communication interface function and the allocation function.

4. BRIEF DESCRIPTION OF THE DRAWINGS

These and other features, aspects, and advantages of the present invention will become better understood by reference to the accompanying drawings, following description, and appended claims, where:

FIG. 1 schematically illustrates software that performs the principal functions of this invention;

FIG. 2 is a flow chart of a process performed by the software of FIG. 1;

FIG. 3 schematically illustrates a preferred protocol for the process of FIG. 2;

FIG. 4 schematically illustrates an embodiment of an order-manager of the system of this invention;

FIG. 5 schematically illustrates in greater detail the order-manager of FIG. 4;

FIG. 6 schematically illustrates in greater detail an intermediary machine depicted in FIG. 5;

FIG. 7 schematically illustrates internal data messages of the intermediary machine of FIG. 6;

FIG. 8 schematically illustrates e-agent data messages used in the intermediary machine of FIG. 6;

Figure 6:
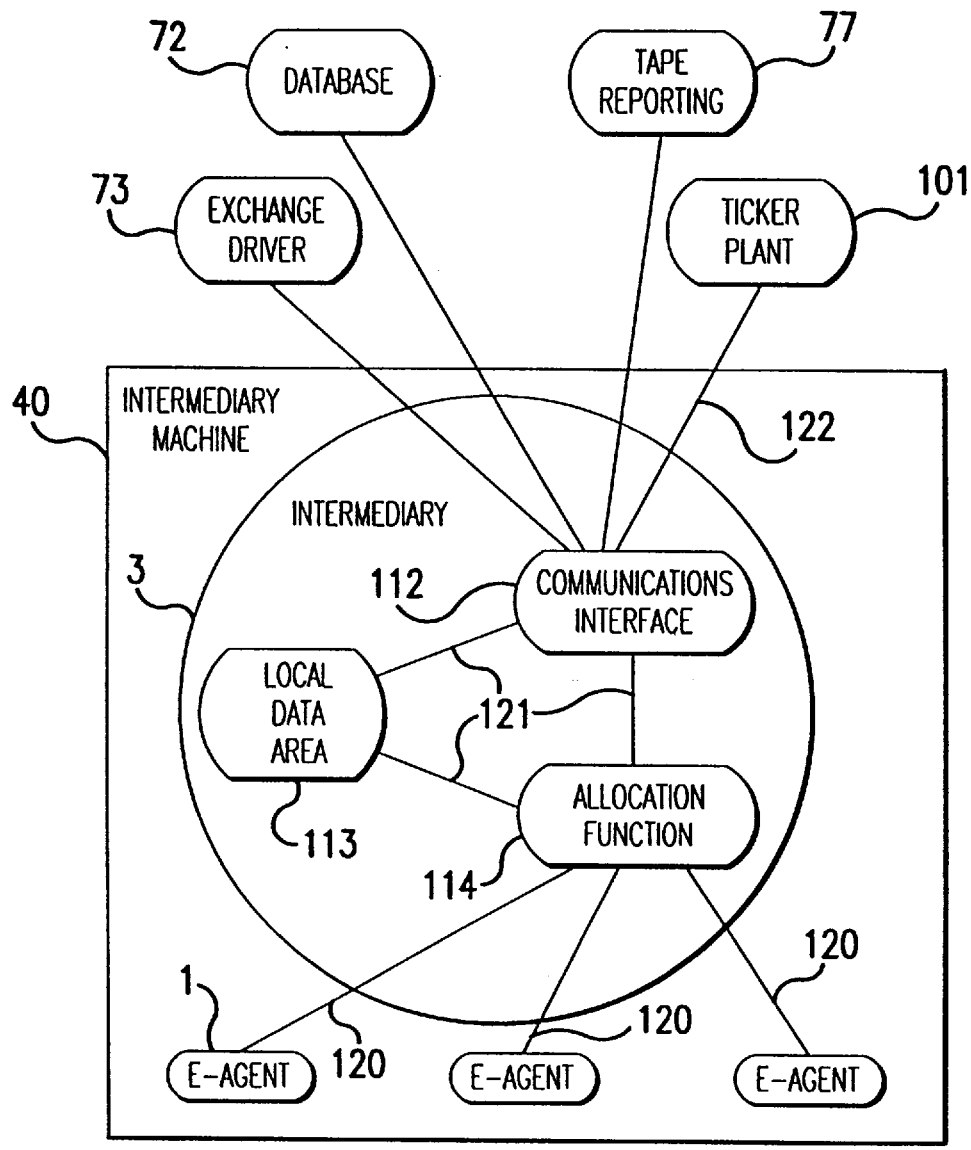
Figure 11:
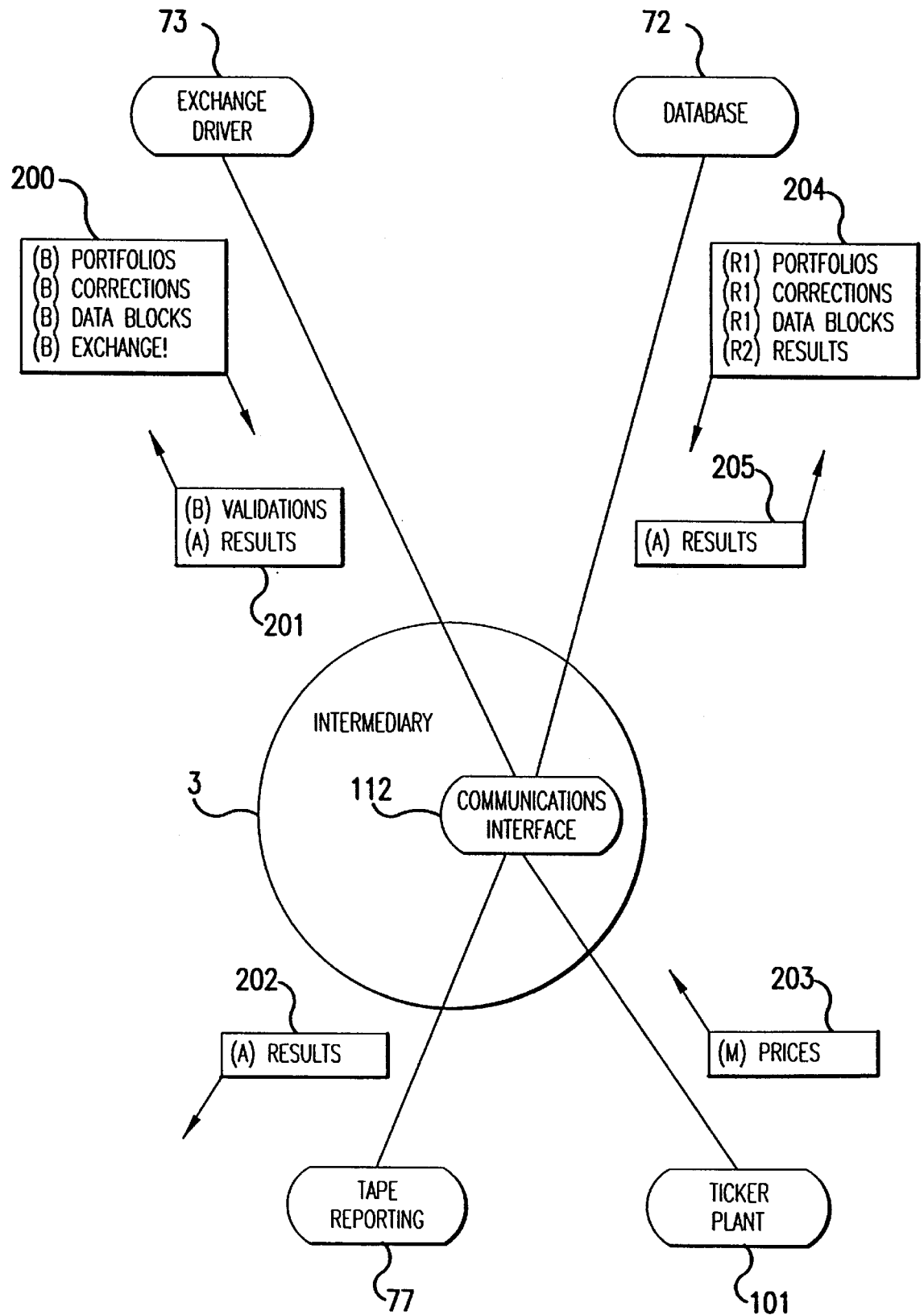

FIG. 11 schematically illustrates external data messages used in the intermediary machine of FIG. 6.

5. DETAILED DESCRIPTION

For clarity of disclosure, and not by way of limitation, the preferred embodiment of this invention is described in detail with respect to the exchange of financial commodities. However, this invention is not so limited, and from the following detailed description it will be apparent to one of skill in the art that this invention is applicable to exchanges of tangible or intangible commodities of any sort. For example, it can be applied to the exchange of tangible commodities such as agricultural, mineral, and manufactured products, or exchange of intangible commodities such as contracts for the future exchange of tangible or intangible commodities.

5.1. E-Agents and the Intermediary

This invention provides substantially simultaneous exchange of commodities between participants represented by electronic agents, e-agents, that interact with an electronic intermediary in order to facilitate negotiations leading to the exchange. The intermediary and agents are implemented in the preferred embodiment as software processes running on one or more computer systems. The agents conduct negotiations by exchanging electronic messages with the intermediary. This subsection describes the following: (1) typical electronic negotiations leading to an intermediated exchange according to the preferred embodiment of this invention; (2) general software and hardware architecture for this embodiment; and (3) a preferred process and protocol for the exchange of messages.

By way of illustration, the process of typical electronic negotiations are described here, first, for a simpler case of an exchange between two participants, and subsequently, for an exchange between three or more participants, the preferred application of this invention. Although the simpler case is described as a negotiation directly between two e-agents, without an intermediary, as will become apparent later, an intermediary according to this invention can provide assistance in realizing a satisfactory exchange even in the simple case. More specifically, in advance of the negotiation, the participants electronically instruct their respective e-agents about the criteria for a satisfactory final exchange of the commodities of interest. Thereafter, the electronic negotiation begins with an opening message from each e-agent that establishes the bounds within which a final exchange must lie, that is the maximum and minimum amounts of each commodity the e-agent is prepared to buy or sell. Then, the electronic negotiation proceeds in a series of rounds, in which each e-agent considers the current offer from the other e-agent and makes a corresponding counter-offer. After a certain number of rounds of this electronic negotiation, the offers and counter-offers typically converge so that the amounts of each commodity to be exchanged are acceptable to both participants, according to their initial electronic instructions. At this point the negotiation terminates, and the parties can then proceed to perform the exchange according to the amounts negotiated using means known in the art.

In the more complex case of the preferred embodiment, three or more participants electronically negotiate a common exchange through their respective e-agents and a single, trusted electronic intermediary. The intermediary is designed to represent the interests of all the participants in such a manner that each e-agent needs only to conduct a two-party electronic negotiation with the intermediary, which negotiation proceeds according to a process substantially similar to the simpler case discussed above. Without such an intermediary, each of the, say N, agents would need to negotiate directly and individually with all of the other agents, requiring on the order of $N^2$ negotiations. However, the intermediary, as provided by the preferred embodiment, facilitates the electronic exchange by requiring only on the order of N direct negotiations with each e-agent individually.

Preferably, the intermediary should be programmed to act fairly by not favoring any of the agents and by promoting a greater volume of exchanges. An exchange among electronic agents using the services of a trusted electronic intermediary also proceeds, as in the simpler case above, as a several step process. First, after the e-agents receive electronic instructions from their participants, the negotiation opens with each e-agent informing the intermediary of the bounds within which must lie an acceptable deal. Using this information, the intermediary presents each e-agent with an initial offer that is constructed by allocating to each e-agent, according to whether it wishes to buy or sell a given commodity, a share of the total of all the offers to sell or to buy, respectively, of that commodity. This process is known as "crossing" and "allocating" the "buys" with "sells." In the following steps, the e-agents receive further offers from the intermediary and return counter-offers to the intermediary, which it again crosses and allocates so as to generate new offers to all of the agents. The process of electronic negotiation is designed so that for a typical case, after several rounds of this negotiation all the agents will be "satisfied" with their offers from the intermediary for the commodities being exchanged, and the negotiation will terminate.

This invention is equally adaptable to exchanging portfolios of several linked commodities as well as individual commodities. A portfolio of commodities is a group of commodities collectively having or requiring certain characteristics. In the case of financial commodities, such characteristics include, for example, total cost, overall expected return, overall expected risk, certain weightings with respect to industrial sectors or to benchmark portfolios (such as the S&P 500), and so forth.

In the following detailed description, an "offer" for a commodity is an electronic message sent from an intermediary to an e-agent that includes the amount of the commodity that the intermediary has made available to the e-agent to buy or sell at a given stage of the electronic negotiation. A "counter-offer" for a commodity is an electronic message sent from the e-agent to the intermediary that includes the amount of the commodity that the e-agent intends to buy or sell at this stage of the electronic negotiation. An "opening" for a commodity is an initial electronic message sent from an e-agent to the intermediary that includes the maximum amount of a commodity that the e-agent intends to buy or sell in a given negotiation. Preferably, offers, counter-offers, and openings contain data for all the commodities to be exchanged in one electronic message.

5.1.1. The System of Intermediated Exchange

Figure 1:
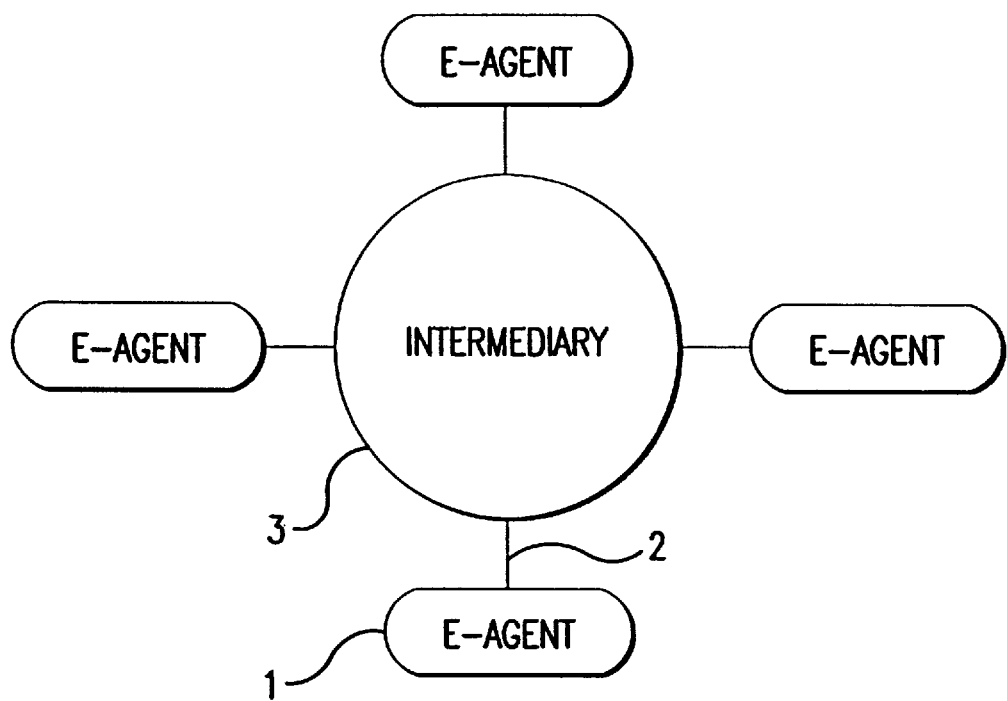
Figure 4:
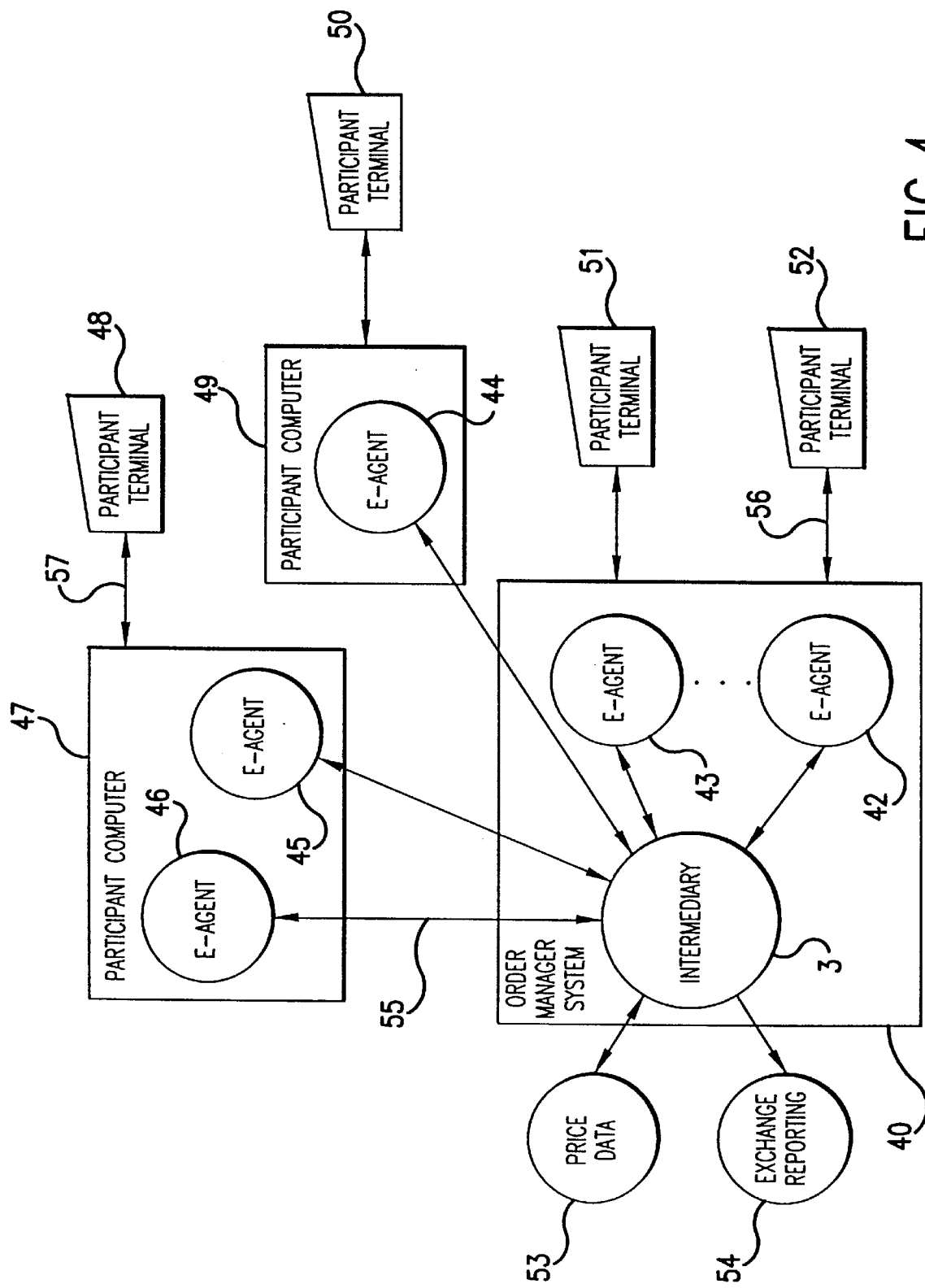

FIG. 1 generally illustrates the software architecture of the system for automated intermediated exchanges of the preferred embodiment. FIG. 4 shows an implementation of this architecture in greater detail.

Turning first to FIG. 1, each participant who wishes to exchange commodities is represented by a software agent, such as 1, known as an electronic agent or an e-agent. An electronic intermediary 3, conducts electronic negotiations individually with e-agents 1 in order to arrive at a successful intermediated exchange of commodities. The negotiation is facilitated by the exchange of electronic messages 2, transmitted between the e-agents and the intermediary.

As illustrated in FIG. 1, e-agents 1 communicate only with the intermediary 3 and not with each other. Since the intermediary and an e-agent exchange only offers and counter-offers relative to that agent, no e-agent is "aware" of any other e-agent's activities. Thus, all e-agents act substantially independently and all commodities are substantially fungible among the e-agents. Further, in the preferred embodiment, the intermediary actively initiates all message exchanges, while each e-agent waits passively for and responds to messages from the intermediary.

E-agents 1 evaluates offers from the intermediary and generate counter-offers to the intermediary in order to arrive at an exchange of the commodities consistently with the participant's objective. In the preferred embodiment the intermediated exchanges occur periodically, e.g., preferably every 90 minutes. Typically, each participant specifies the commodities of interest and corresponding objectives to its e-agent just before each intermediated exchange, as these objectives are expected to change between sessions. The specification of commodities of interest can for example be provided as a list by means known in the computer arts. Where these commodities form a portfolio, data provided to an e-agent includes the characteristics of the portfolio, for example, risk, expected return, and sector allocations.

The objectives of a participant can be provided to the e-agent process according to the following options. According to one option, the participant provides to the system of this invention the entire program that is executed by the e-agent process and that encodes the participant's objectives. According to another option, the participant selects one of e-agent programs already provided by the system and supplies parameters to tailor the selected program to the participant's objectives. For example, according to this option, a participant can select a rule interpreter and provide it with a list of procedural rules which the selected interpreter uses to evaluate an offer from the intermediary and to generate a counter-offer. In the preferred embodiment, the participant selects a program capable of finding substantially the extremum of an objective function of amounts of commodities to be exchanged, as limited by optional constraints, and supplies parameters defining the precise form of the objective function and constraints. The e-agent then generates counter-offers by substantially maximizing the defined objective function. This option is referred to as substantially maximizing the "utility" function of the participant. Other ways of evaluating offers and generating counter-offers can be employed.

Software intermediary 3 sums the commodity amounts offered for exchange in the opening and counter-offer messages of the participating e-agents, allocates these total amounts among the e-agents, and generates commodity offers to send back to the e-agents. In general, it is usually preferred that the intermediary act substantially fairly in not favoring one e-agent over another. One measure of fairness is that all offers are at least partially satisfied on a pro-rata basis. Beyond this general preference, commodity allocation can be done in many manners reflecting objectives of the participants and the type of commodities exchanged. For example, for commodities whose value decrease over time, such as for perishable agricultural commodities, it can be preferable to allocate the oldest, fresh commodities first. In the preferred application of this invention to exchanges of financial commodities, and similarly for other fungible commodities, it is desirable that commodities be allocated such that the total amount of commodities exchanged is substantially maximized. Therefore, the electronic intermediaries of the preferred embodiment, to which the remainder of this description is generally directed, attempts to fairly allocate the maximum amounts of commodities.

The goals for the commodity allocation, e.g., fairness and maximum exchange, can conflict, and an electronic intermediary can resolve such conflicts and perform acceptable allocations in various ways. In the preferred embodiment, each exchange is treated separately, and the electronic intermediary seeks commodity allocations for each round of the negotiation that trades off maximum amounts exchanged with maximum allocation fairness. In the preferred implementation, allocation fairness and the amounts exchanged are expressed as functions of amounts of individual commodities offered to the e-agents. Amounts for an actual offer are determined by the maximum, or an approximate maximum, of a selected combination of these functions. (Both the "maximum" and the "approximate maximum" will be referred to as "maximum"). Further, this maximum must be consistent with any e-agent constraints. For example, one such constraint is that each e-agent is willing to exchange only limited, maximum amounts of each commodity. Other constraints are, for example, minimum amounts to exchange, tiering constraints, which list certain other e-agents with which this agent is unwilling to exchange, and so forth. This maximum can be found by known techniques of mathematical programming and optimization known in the arts that are appropriate to the form of the functions chosen. Such techniques include the simplex method, the maximum flow method, or the barrier method in conjunction with branch-and-bound techniques. See, e.g., Gonzaga, 1992, Path-following methods for linear programming, SIAM Review 34 (2):167–224; Karloff, 1991, Linear Programming, Birkhauser; Papadimitriou et al., 1982, Combinatorial Optimization, Prentice-Hall. In other embodiments fairness can be maintained only on average over a plurality of separate intermediated exchanges, with each single exchange substantially maximizing amounts exchanged in a not necessarily fair manner. In this case, allocations can then be made by a rule interpreter which interprets agreed rules governing longer term fairness tradeoffs while substantially maximizing amounts exchanged at each offer.

The hardware and software architecture of the preferred embodiment are illustrated in FIG. 4. Generally, the various software functions of this invention are implemented as software processes, such as intermediary process 3 and e-agent process 42–46, that can be running on different computers, such as intermediary computer 40 or participant computer 47. These computers are connected by at least one communication network which provides communication links, such as communication link 55, for the exchange of messages between the processes.

As FIG. 4 illustrates, the software processes can be distributed across the various computers. For processes to be freely distributable it is preferable that they be separately addressable nodes of a general electronic communication network. Such a preferred network is one constructed using the TCP/IP protocols, and can thus be implemented using a private intranet or the public Internet. Such a TCP/IP network can transparently link processes on one or more computers. However, for those processes known to reside only on one computer, it is often more efficient that the operating system's facilities for inter-process communication serve as the communication network, using process-ids for addresses. Actual process distribution in a particular embodiment is generally determined by cost, response-time, and throughput considerations, as known in the computer arts, as well as by requirements of the participants for security and control of their own e-agent processes.

E-agents are preferably single processes, each executed on the appropriate and convenient computer. In some instances, participants require direct control of their e-agent computers, for example, for security reasons. FIG. 4 illustrates such an instance in which single e-agent process 44 executes on participant computer 49. Participant terminal 50, attached to computer 49, inputs to the e-agent the participant's commodities of interest and exchange objectives and outputs to the participant the results of the negotiated exchanges among all the e-agents conducted by electronic intermediary 3. In another instance, participant computer 47 executes two e-agent processes 45 and 46 because this participant controls two independent and different portfolios of commodities which these two separate e-agents manage. In other cases, e-agents can execute remotely from their participants. For example, e-agent processes 42 and 43 reside on the intermediary computer(s) 40. These e-agents are accessed by terminals, such as participant terminal 52 attached through link 56, which can either be a local or a long-distance link to computer 40.

The computers that run e-agent processes preferably enable e-agents to respond rapidly to intermediary offers in order that the intermediated exchange not be unduly delayed. When it is necessary that an exchange be completed as rapidly as possible, as in the case of financial commodities, e-agents preferably reside locally with the intermediary, as e-agents 42 and 43 in FIG. 4, so that the system response times can be optimized. Exemplary e-agent computers include Sun Microsystems Sparc 20, Compaq Deskpro 6000, and the IBM RS6000.

Intermediary 3 is also preferably implemented as one or more processes executed on one or more computers, each intermediary process having one or more threads of execution. Intermediary computer(s) 40 is sufficiently capable to meet computational and turnaround time requirements of a particular embodiment. If a single computer is not sufficiently capable, the intermediary can be parallelized into multiple cooperating and parallel processes or threads in ways known in the computer arts. In this case, computer 40 can be a local network of computers or, alternatively, a single parallel computer. For example, in a preferred embodiment directed to financial commodities and especially equities, the turnaround time for an intermediated exchange is typically required to be less than 90 secs. and, preferably, computer(s) are chosen to be sufficiently powerful to meet such a turnaround time. For example, Sun UltraSparc systems can be used for computer(s) 40.

Also, optionally, certain e-agents can be implemented as part of the intermediary process or processes. Such e-agents are those with particularly limited computational requirements. By implementing these e-agents within the intermediary the system can reduce communication delays and, thereby, improve performance.

Various alternative distributions of the software to processes and threads, and the processes and threads to physical computers are apparent to one of skill in the computer art. Such specific distributions are governed by computational demands and computer costs.

FIG. 4 also illustrates communication links to external data gateways. Since the intermediary of the preferred embodiment of this invention does not determine prices, this information is obtained from external sources that report prevailing commodity prices in markets acceptable to the electronic agents involved in an exchange. Thus, price data source 53 is linked to the intermediary computer 40. Also, for certain commodities, in particular for financial commodities, laws and regulations dictate the prompt, public reporting of all exchanges of those commodities. In this case, successful exchanges are appropriately reported at 54 as well as to the participants.

5.1.2. The Method of Intermediated Exchange

Figure 2:
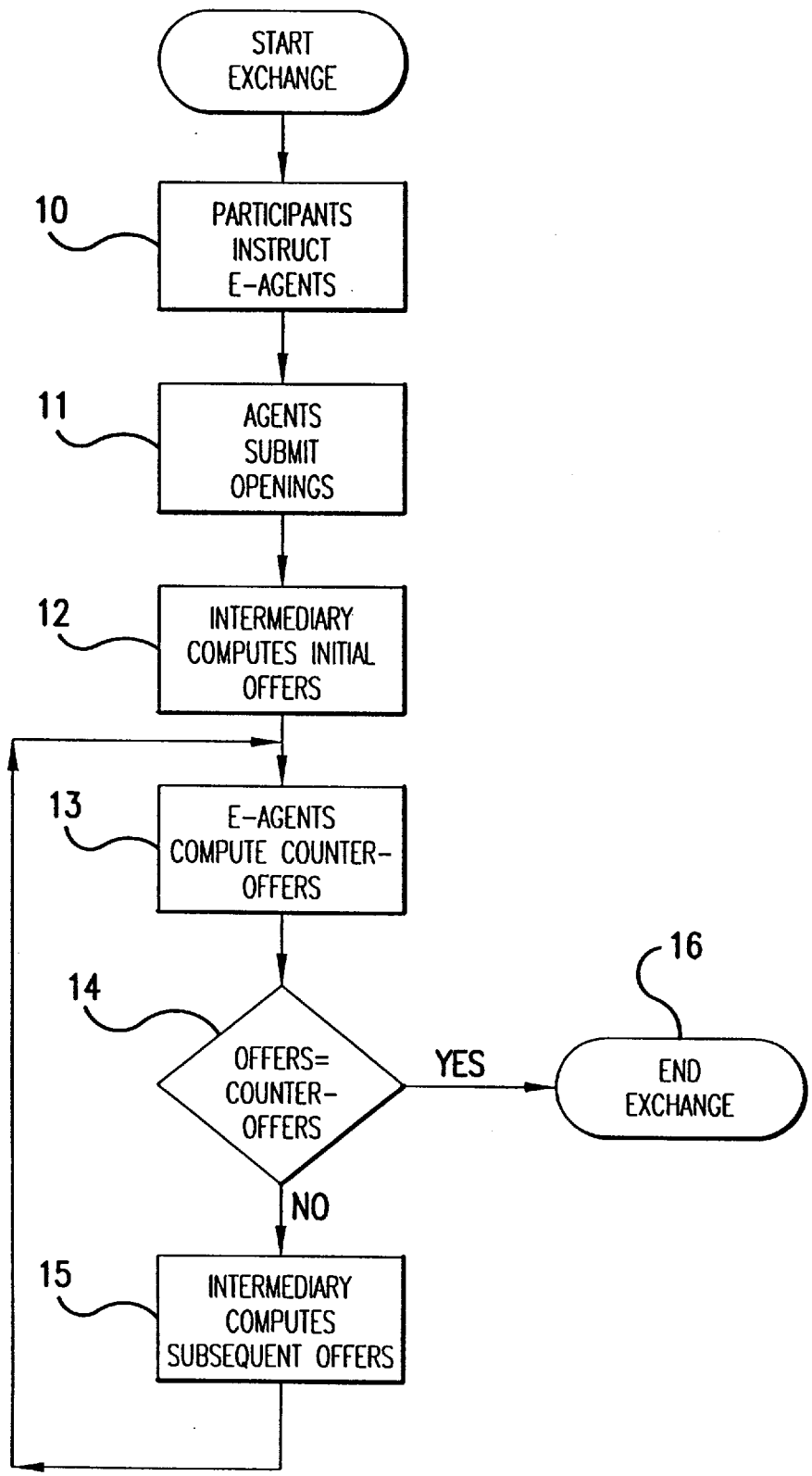

FIG. 2 illustrates in more detail the process of the electronic intermediated exchange of the preferred embodiment, which is a synchronized sequence of exchanges of offers and counter-offers between the electronic intermediary and the e-agents. Preliminary to the steps of FIG. 2, the intermediary, which represents the joint goals of a group of agents that might seek to exchange certain commodities, is constructed. Preferably, the intermediary for a certain group of participants is constructed on the basis of a parameterized utility function with constraints that reflect the interests of the group of participants. That intermediary then facilitates exchanges executed according to the steps of FIG. 2.

Generally, at step 10, the participants instruct their e-agents regarding the exchange objectives; at step 11, the e-agents submit opening messages to the electronic intermediary; at step 12, the intermediary generates initial offer messages to the e-agents; at step 13, the e-agents respond with counter-offer messages; step 14 tests for successful completion of the electronic negotiation; and at step 15 if the exchange is not yet completed, the intermediary generates further offers to the e-agents. Steps 13, 14, and 15 are repeated until the negotiation completes according to the test of step 14. Alternatively, the negotiation can be terminated after a pre-determined number of steps, whether or not this test is met.

More specifically, at step 10, each participant specifies to its e-agent the commodities of interest, as well as objectives and constraints for evaluating offers and for generating counter-offers. In the preferred embodiment, objectives and constraints are provided as parameters that define an instance of a utility function of commodity amounts exchanged, along with optional associated constraints. The maximum of the constrained utility function determines the counter-offer amounts. Alternatively, a participant can supply rules that when interpreted or executed evaluate offers and generate counter-offers. Also, a participant can supply an entire e-agent program.

Based on their exchange objectives, at step 11, the e-agents send to the electronic intermediary opening messages indicating all the commodities which an e-agent can exchange and for each, the maximum amounts to exchange.

In the opening message, an e-agent may specify that it is willing to both buy and sell the same commodity if, for example, its final decision to buy or to sell that commodity is based on the availability of other commodities in the exchange.

In general, the opening, offer, and counter-offer messages may have buy and sell requests for the same commodity. These are called herein the "buy side" and the "sell side" for a commodity. In the example below, Moe, Larry, and Curly want to exchange PG&E stock, PCs, and plums, and they have instructed their agents to make the following openings.

TABLE 1

Example of an Opening

| Agent | Buy Side | | | Sell Side | | |
| --- | --- | --- | --- | --- | --- | --- |
| | PG&E | PCs | Plums | PG&E | PCs | Plums |
| Moe | 16 | 10 | | 16 | | 10 |
| Larry | 10 | | 6 | | 5 | |
| Curly | 10 | 15 | | | | 10 |
| TOTAL | 36 | 25 | 6 | 16 | 5 | 20 |

In this example, Moe has indicated that, in this particular exchange, he might buy up to 10 PCs or sell up to 10 plums, but not more. Further, he has indicated that he might buy or sell up to 16 shares of PG&E, depending on how the negotiation progresses.

Based on the information provided by the opening messages, at step 12, the intermediary generates initial offer messages listing commodities offered and sends them to the e-agents. Because the e-agents collectively may seek to purchase more units of a commodity than they seek to sell, or vice versa, the intermediary's initial offer for each commodity allocates the total quantity offered by all the e-agents among all the e-agents interested in buying or selling. As discussed above, this allocation is preferably done fairly, and, in the case of financial and similar commodities, so as to substantially maximize the total amount exchanged. This allocation preferably satisfies a set of "basic" constraints on the exchange set by the e-agents. One such constraint is that each e-agent is willing to exchange only a certain maximum amount, as communicated in the opening message. Other e-agent constraints, for example, include: (i) a minimum amount of a commodity that must be exchanged by an e-agent for any exchange to occur; (ii) a group of other e-agents not eligible for exchange with this e-agent; (iii) a refusal to accept fractional units of a commodity; and so forth. As described, different intermediary goals can be appropriate for different groups of participants exchanging other types of commodities.

Continuing with the previous example of Moe, Larry, and Curly, assume that these participants have selected an intermediary that attempts to substantially maximize the total amount of commodities exchanged while fairly allocating amounts according to a pro-rata scheme. Accordingly, an offer can contain the following allocations. Since only Larry wants to buy plums while Moe and Curly want to sell equal amounts of plums, Larry can be initially offered a purchase of 6 plums, 3 each from Moe and Curly. Since only Larry wants to sell PCs while Moe and Curly want to buy PCs in the ratio of 2/3, Larry can be initially offered a sale of 5 PCs, with 2 going to Moe and 3 to Curly. Finally, to maximize the commodities exchanged, Moe can be initially offered a sale of all 16 shares of PG&E to be divided equally between Larry and Curly. Further rounds of counter-offers and offers can modify these initial offers to reach a successful exchange for all participants.

At the next step 13, each e-agent evaluates its current offer from the intermediary, either an initial offer or an offer during a subsequent round of electronic negotiation, and responds with a counter-offer. In the preferred embodiment, this evaluation is determined by the amounts offered in the last offer from the intermediary together with initial instructions from the participant. In other words, an e-agent of the preferred embodiment is "memoryless" in that it does not look back to prior offers from the intermediary at any given round of negotiation, but rather computes a counter-offer only from the offer just received. In an alternative embodiment, an e-agent may act tactically or strategically to try to increase its utility by considering a sequence of several offers and counter-offers at a given round of negotiation. Such an e-agent, however, can prevent other e-agents from obtaining desired outcomes, and therefore is less preferred.

A memoryless e-agent of the preferred embodiment can use its counter-offer to signal certain preferences to the intermediary. For example, the e-agent can signal its interest in a particular commodity by a counter-offer to take all, or substantially all, of that commodity. Further, the e-agent can signal its satisfaction with the offer as a whole by returning a counter-offer that is identical to the preceding offer. As described, in the preferred embodiment, an e-agent evaluates previous offers according to a "utility" function, together with optional constraints, whose joint extremum determines the counter-offer to a prior offer. Alternatively, the e-agent can use a set of rules, such as expressed in a programming language format, for evaluating offers.

At step 14, the negotiation successfully terminates if all the e-agents signal that they are satisfied with their last offers from the intermediary. Preferably, they do this by returning counter-offers that are equal to the previous offers. Alternatively, the negotiation can be terminated after a predetermined number of steps of negotiation, whether or not all the e-agents signal satisfaction. Upon termination, the participants actually exchange the agreed upon amounts of the commodities using any mutually acceptable known means.

If the negotiation did not terminate at step 14, then at step 15, the intermediary generates new offers by a process similar to that for generating initial offers, that is, it allocates commodities among e-agents based on fairness, substantially maximizing commodity exchange, and satisfaction of e-agent basic constraints. Preferably the intermediary, unlike e-agents, has a memory of the recent rounds of negotiation, so that it can generate offers that depend on previous offers and counter-offers. In the preferred protocol, described subsequently, the intermediary generates offers based on the immediately preceding counter-offer and the immediately preceding offer.

The Protocol for Intermediated Exchanges of the Preferred Embodiment

In the preferred embodiment the negotiation between the intermediary and the e-agents proceeds according to a protocol which leads to (1) a substantially satisfactory outcome of the negotiated exchange according to the goals of the participants and the intermediary, and (2) a near optimum solution for commodity exchange according to the particular e-agent and intermediary utility functions or exchange rules adopted to reflect these goals. Time requirements on completion of an intermediated exchange, as are present for financial commodities, may require the use of approximations or heuristics in order to perform the computations of the intermediated exchange in the required time. This preferred protocol includes the following rules:

E-agent Rule:
(i) The amount of a commodity in the current counter-offer generated by an e-agent is less than or equal to the amount of that commodity in the immediately preceding intermediary offer; and
(ii) The current e-agent counter-offer depends only on commodity amounts in the immediately preceding intermediary offer.

Intermediary Rule:
(i) The amount of a commodity in an offer to an e-agent being generated by the intermediary is chosen to be less than or equal to the "current demand," which is an upper bound for that commodity and that e-agent that varies during the negotiation, and to satisfy the applicable set of basic e-agent constraints; current demands for an e-agent do not change if the immediately preceding offer is equal to zero, or if the immediately preceding counter-offer equals the immediately preceding offer; and
(ii) Preferably, the current demand, and thus the amounts in the current intermediary offer, depends on both the last offer, the last counter-offer, and on the round of the negotiation; further the current demand is less than or equal to the immediately preceding demand and greater than or equal to the amount in that e-agent's immediately preceding counter-offer.

It is preferred that the amounts to be offered next by the intermediary be close to the demands, and that these amounts are between the amounts in the e-agent's immediately preceding counter-offer and the amounts in the intermediary's immediately preceding offer. Accordingly, the e-agents are presented with opportunities to obtain the maximum satisfactory commodity exchange, at least for those amounts in which they expressed an interest in their most recent counter-offers.

However, since such desirable offer amounts cannot, in general, be guaranteed, the demands in the preferred protocol are targets for the intermediary's next offer. In particular, the intermediary should always be able to arrange some satisfactory commodity exchange. A failure of offer determination, and a consequent failure of an intermediated exchange, is undesirable for exchange participants. Depending on the intermediary's offer selection method and its constraints, imposing a lower bound on the offers, such as the e-agents' previous counter-offers, can result in such a failure to determine next offers for all the e-agents. For example, lowering a bound for an intermediary that uses optimization to determine offers may cause offer amounts to be less than the amounts in which an e-agent previously indicated an interest. Therefore, the demands or bounds are treated as targets for the intermediary to generate is offers. It is preferable that the resulting offers are close to the demands. However, in an alternative intermediary implementation, where lower bounds can be specified without a risk of failure, a preferred lower bound is the e-agent's immediately previous counter-offer. In such an implementation, the actual intermediary offer, not just the upper bounds, would lie between the immediately preceding e-agent counter-offer and the immediately preceding intermediary offer.

Figure 3:
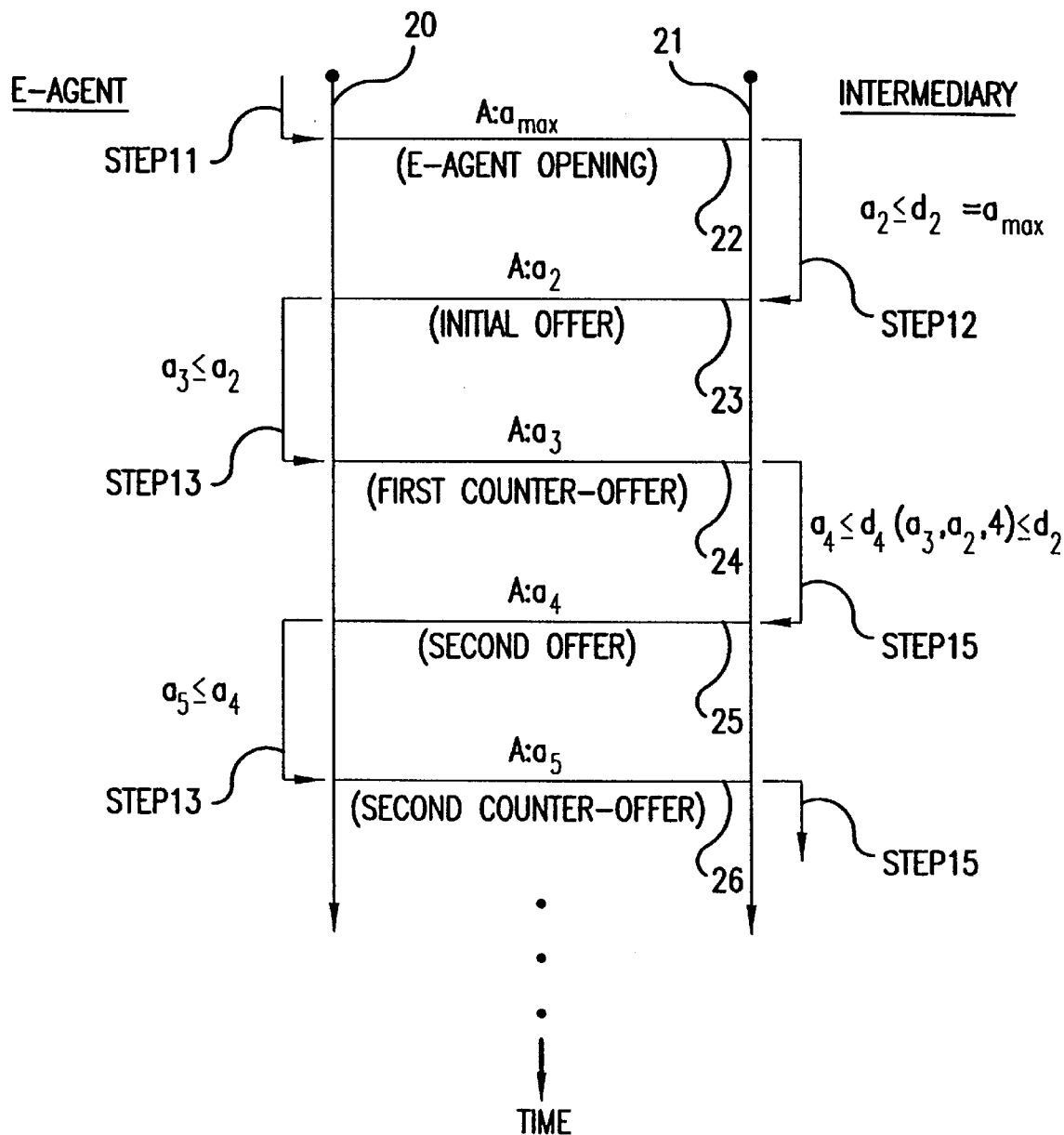

In more detail, FIG. 3 illustrates the protocol of the preferred embodiment with reference to the steps of FIG. 2. E-agent process 20 and intermediary process 21 are illustrated as exchanging the following messages as time increases: opening message 22 generated by step 11 of FIG. 2, initial offer message 23 generated by step 12, first counter-offer message 24 generated by step 13, second offer message 25 generated by step 15, second counter-offer message 26 generated by step 13, and so forth. Also illustrated are amounts of commodity A in these messages. For example, opening message 22 indicates that the maximum amount of A that e-agent 20 is prepared to exchange is $a_{max}$. Similarly, $a_n$, where n is from 2 to 5, is the amount of A that is offered or counter-offered in the subsequent messages illustrated in FIG. 3. Further, $d_n$ is the current demand for a particular commodity for a particular e-agent.

More specifically, this exchange begins at step 11 of FIG. 3, when e-agent process 20 sends opening message 22 indicating the maximum amount of commodity A, $a_{max}$, that it is willing to trade in this intermediated exchange. In step 12, intermediary process 21 sets the current demand for A, $d_2$, to be equal to the opening maximum amount, $a_{max}$, allocates the opening amounts of A among the interested e-agents as described above, and then generates initial offer message 23 to e-agent process 20. According to the Intermediary Rule of the preferred protocol, the amount offered to the e-agent is equal to or less than the current demand, that is:

$$a_2 < d_2 \qquad (1)$$

During step 13, e-agent process 20 evaluates its offer and determines a counter-offer, substantially optimum according to its utility function, for all the commodities in which it is interested. According to the E-agent Rule of the preferred protocol, the e-agent is not constrained in this determination as long as it uses only the preceding offer message 22, and its counter-offer for A is less than or equal to the previous offer for A, that is:

$$a_3(a_2) < a_2 \qquad (2)$$

If all the e-agents are not satisfied, then, during step 15, the intermediary process generates new offers to all the e-agents. According to the Intermediary Rule, if an e-agent does not counter-offer to take all that was offered of a commodity in the previous offer, the intermediary selects that e-agent's next demand, $d_n$, according to the Intermediary Rule. That is, in general, this demand, or upper bound, is given preferably by:

$$a_{n-1} \leq d_n = d_n(a_{n-1}, a_{n-2}, d_{n-2}, n, \ldots) \leq d_{n-2} \qquad (3)$$

Here, "$a_{n-1}$" denotes the amount in the immediately preceding e-agent counter-offer; "$a_{n-2}$" denotes the amount in the immediately preceding intermediary offer; "$d_{n-2}$" denotes the demand for the generation of the immediately preceding intermediary offer; and "n" denotes the current stage of the negotiation. The " . . . " denote that the demand can depend on additional variables in alternative embodiments. Thus, second offer message 25 proposes quantity $a_4$ of commodity A which satisfies:

$$a_4 \leq d_4(a_3, a_2, 4) \leq d_2 \qquad (4)$$

Preferably, the actual offer amount, as well as the demand, is between the previous offer, that is $a_2$, and the previous counter-offer, that is $a_3$.

$$a_3 \leq a_4 \leq a_2 \qquad (5)$$

However, if this condition cannot be satisfied, this preference is dropped and only equation 4 is satisfied.

Finally, FIG. 3 illustrates further counter-offer message 26 in which the e-agent responds according to the E-agent Rule with counter-offered quantity satisfying:

$$a_5(a_4) \leq a_4 \qquad (6)$$

The preferred protocol is accompanied by heuristic rules for determining the demands or bounds, $d_n$. These heuristic rules preferably balance several competing requirements, including requirements for rapid and efficient convergence of the protocol to a final exchange, requirements to substantially maximize the total amounts of commodity exchanged, and requirements for overall fairness of the exchange. To insure convergence of the negotiation, it suffices that, for every round beyond some point in the negotiation, there is at least one commodity for which the new demand, $d_n$, is less than the previous demand, $d_{n-2}$ for that commodity. In other words, preferably, there is some negotiation stage, denoted by N, such that for all rounds, n, of the negotiation beyond N, n>N, there is at least one commodity for which the following equation is true.

$$d_n(\ldots, n, \ldots) < d_{n-2}(\ldots, n-2, \ldots) \qquad (7)$$

This insures convergence of the negotiation, because then the sequence of the sums of the demands of all the e-agents is decreasing. Since commodities are exchanged in predetermined, integer units, the amounts offered to each e-agent must eventually stop decreasing, arriving at a successful exchange for all e-agents. The speed of convergence depends on the rate of decrease of the demands, the more rapid the decrease the fewer rounds of negotiation are required for convergence.

However, it is preferable that the heuristic rules balance convergence requirements against requirements for a maximal commodity exchange. To encourage the e-agents to respond with larger counter-offers, and thereby to obtain a larger final intermediated exchange, it is preferable for the intermediary to present larger offers. In other words, it is preferable that the demands or bounds, $d_n$, not be decreased rapidly. In one extreme case, if the demands were not reduced at all, a maximal exchange would occur if the negotiation converged. However, in this case, it may not. In an opposite extreme case, if the demands are merely set to the amount in the e-agents' counter-offers, the intermediary then only allocates the counter-offers from the e-agents without modification. Thus, each offer will be less than or equal to the proceeding counter-offer amount. Such a rule may sharply reduce the amounts of commodities exchanged because each e-agent acts in isolation and in a memoryless fashion. For example, if one e-agent linked the exchange of two commodities together, a low offer for the first commodity can result in a low counter-offer for both the first and second commodities, which can sharply restrict the amount of the second commodity finally exchanged if this e-agent is a major supplier of that commodity in this exchange.

Therefore, it is desirable that the heuristic rules specify that the demands, or upper bounds, decrease at an intermediate rate during the course of the negotiation. In this manner convergence occurs while the intermediary generates offers that permit the e-agent to explore the greatest range of possible satisfactory exchanges.

Heuristic rules are chosen to satisfy the joint goals of the participants and the intermediary with respect to convergence, exchange size, and fairness. There rules can be determined empirically by rerunning past intermediated exchanges, using, for example, the previous e-agent instructions provided by the participants along with other previous data, with different heuristics. A satisfactory heuristic achieves, on average during such reruns, the greatest commodity exchange within whatever time constraints determine the required rate of convergence. For example, for financial equities, convergence must occur in no more than approximately 90 seconds. Satisfactory heuristic rules substantially maximize total commodity exchanges within this time limit for those e-agents and e-agent parameters likely to be used by the participants. Optimal heuristic selection is preferably an on-going process. The participants are likely to change their e-agent instructions, which can change convergence speed and exchange sizes and in turn require adaptation of the heuristic rules.

This invention is adaptable to other rules for intermediary offer generation that have properties of (i) generating ultimately non-increasing offers for a commodity while (ii) not being merely limited to the amounts in the e-agents' counter-offers. In particular, the variable demands determined by the intermediary can depend on several prior intermediary offers and several prior e-agent counter-offers. Further, the demands can be chosen to be greater than the least of a determined number of prior counter-offers but less than the maximum of another determined number of prior offers.

5.2. Offer and Counter-Offer Generation

In this embodiment, the intermediary and e-agents exchange offer and counter-offer messages, according to the preferred protocol, described above, to arrive at a satisfactory exchange. As indicated, an intermediary allocates commodities among the e-agents in a manner satisfactory to the joint goals of the participants. Each e-agent responds to offers from an intermediary with counter offers, generated according to its objectives. This section presents methods for the intermediary and an e-agent to generate offers and counter offers.

An offer message of the preferred embodiment includes the following data:

1. Commodity names; and
2. For each commodity, the amount of that commodity that is currently offered by the intermediary for sale or for purchase.

Similarly, a counter-offer message includes:

1. Commodity names; and
2. For each commodity, the amount of this commodity that the e-agent currently is prepared to buy or to sell.

5.2.1. E-Agent Counter-Offer Generation

An e-agent of the preferred embodiment is a computer process that acts according to the objectives of its principle. As indicated, at the start of the electronic intermediated exchange, an e-agent sends to the intermediary an opening message listing all the commodities of interest to its principle and the maximum amounts of each commodity to buy or sell at the exchange. Subsequently, the e-agent responds to offer messages from the intermediary with counter-offers as discussed above. This subsection describes two exemplary embodiments of counter offer generation: (1) a method primarily suitable for financial commodities based on portfolio theory, and (2) a method primarily suitable for other types of commodities in general, based on general rules.

Method Based on Portfolio Theory

In this embodiment, counter-offer generation is based on portfolio theory so that a counter-offer is selected from a previous offer by substantially maximizing a utility function within the limits established by optional constraints. The utility function, which is a function of the amounts of commodities in the counter-offer, includes terms representing, among others, such factors as the preference of the participant for different commodities, the risk of the various commodities, the transaction costs of buying or selling the commodities, and the degree to which certain constraints on commodity holdings may be violated.

Commodity preferences are numerical weights expressing a participant's interest in a given commodity, and can be, for example, the participant's expected financial return from owning the commodity. The risk represents the participant's estimation of the uncertainties associated with owning a particular commodity, and can be, for example, the variance of the expected financial return from owning the commodity. Transaction costs are estimates of the cost of buying or selling in a market. Finally, a participant can establish certain approximate goals for owning groups of commodities, and can allow a certain slack in meeting these goals. For example, a financial participant may wish to divide holdings among industry groups according to certain percentages. The maximum of the utility function minimizes the extent to which these allocations are not met.

These components can be gathered into certain strategies, for example, as illustrated in Table 2.

TABLE 2

| Utility Function Terms and Strategies | | | | |
|---|---|---|---|---|
| Strategy | Commodity Preference | Risk | Trans. Costs | Constraints |
| Active with risk | • | • | • | • |
| Active with no risk | • |  | • | • |
| Indexing |  | • | • | • |
| Characteristics |  |  | • | • |
| Opportunity Cost |  | • |  | • |
| List Completion |  |  |  | . |

According to a simple strategy called "list completion" (also called herein "list"), the participant merely instructs its e-agent to make exchanges from a list of commodities up to certain maximum exchange amounts. Such a participant may optionally, specify limited types of constraints, such as dollar imbalance or tiering constraints. According to a complex strategy called "active with risk", the participant generally instructs its e-agent to substantially maximize preferences or expected return while substantially minimizing risks associated with these preferences. Optionally, the participant can specify broader types of additional constraints, such as constraints on transaction costs of the exchange, on the deviation of the resulting portfolio from specified allocation constraints, and so forth. A less complex strategy is called "active with no risk," and differs from the "active with risk" strategy only in that risk is not considered by the e-agent, which substantially maximizes only expected returns subject to optional constraints. According to the "indexing" strategy a participant instructs its e-agent to substantially minimize the risk, or variance of the return, of a portfolio that represents the difference between the participant's current portfolio and a benchmark portfolio, such as the S&P 500. A participant using "characteristics strategy," for example, may instruct its e-agent to invest up to $100M with 40% in identified technology stocks, 40% in automobile stocks, and 20% in banking stocks. Finally, an "opportunity cost" strategy is a more sophisticated form of a list completion strategy in which an overall exchange is performed as a series of sub-exchanges, each sub-exchange in the series being defined so that after its completion the risk of the unexecuted portion of the overall exchange decreases.

Importantly, Table 2 illustrates that these and other strategies can be implemented by choosing which terms to include in the utility function to be substantially maximized by the e-agent and also which constraints limit this maximization. The details of each strategy are chosen by selecting the actual values of the scalars, vectors, and matrices defining the utility function terms and the constraints.

The portfolio method of counter-offer generation configures the e-agent based on parameters passed from its participant. In the following, first, the general e-agent implementation is described, followed, second, by description of how it is parameterized. The subsequent description presented in equations 7 through 15 uses variables from Table 3.

Table 3 below uses vector and matrix variables and vector and matrix notation to group the commodities together. For example vector h represents commodity holdings with components $(h_1, h_2, \ldots h_n)$, where $h_i$ is the amount held of commodity i. In this notation $a^t\omega$ is a scalar with the value $a_1*w_1+a_2*w_2+ \ldots +a_n*w_n$, where juxtaposition represents matrix multiplications and t is the transpose operator.

TABLE 3

| E-agent Variables | |
|---|---|
| Variable | Meaning |
| h | Vector of current commodity holdings |
| b | Vector of commodity amounts to buy |
| s | Vector of commodity amounts to sell |
| $\Delta\omega$ | Vector of changes in portfolio holdings due to amounts bought and sold |
| $\Delta\omega^l$; $\Delta\omega^u$ | Vectors with positive elements which give the upper and lower bounds on the amounts of each commodity to buy or to sell |
| $\omega$ | Vector of commodity holdings after buying and selling the amounts indicated in vectors b and s |
| $\omega^l$; $\omega^u$ | Vectors with positive elements which give the upper and lower bounds on the amounts of each commodity to have in a final portfolio |
| $\alpha$ | Vector indicating the expected return, or other numerical preference measure, for each commodity |
| $\Sigma$ | Matrix giving the covariance of the expected returns, or other numerical risk measure, for all pairs of commodities, i.e. the risk model |
| B | Vector of the holdings of a benchmark portfolio against which risk is judged; if set to 0, then risk is judged absolutely without reference to any benchmark |
| $\gamma$ | Scalar measuring the aversion to risk; if set to 0, risk is ignored in generating counter-offers |
| $\sigma^u$ | Scalar which limits the maximum value of the risk measure |
| T ($\Delta\omega$) | Separable model of transaction costs giving the transaction costs for the net buys and sells indicated by $\Delta\omega$ |

TABLE 3-continued

| E-agent Variables | |
|---|---|
| Variable | Meaning |
| $\delta$ | Scalar measuring the aversion to transaction costs; if set to 0, transation costs are ignored in generating counter-offers |
| C | Matrix providing linear constraints on the commodities in a final portfolio; an exemplary such matrix groups financial commodities into industry sectors |
| $c^l$; $c^u$ | Vectors providing lower and upper bounds, respectively, for the linear constraints on the final portfolio |
| $\phi$ | Vector measuring the aversion to missing each linear constraint bound; if an element is set to 0, errors in that bound are ignored in the utility function and the constraint is left rigid |
| $S^l$; $S^u$ | Vectors with positive elements measuring the amount by which the linear constraint bounds are missed on the low-side and up-side, respectively; also known as slack variables |
| D | Matrix providing linear constraints on the changes in portfolio holdings; an exemplary such matrix includes commodity prices and measures the dollar imbalance of all the exchanges of the counter offer |
| $d^l$; $d^u$ | Vectors providing lower and upper bounds, respectively, for the linear constraints on the changes in portfolio holdings |

Vectors "b" and "s", the amounts of each commodity to buy or sell, are determined by finding the maximum (or approximate maximum) of the utility function. Their difference is the change in the portfolio holdings, $\Delta\omega$.

$$\Delta\omega = b - s \quad (8)$$

Equation 9 below specifies upper and lower bounding constraints on the changes in portfolio holdings.

$$\Delta\omega^l \leq \Delta\omega \leq \Delta\omega^u \quad (9)$$

For a particular commodity, the meaning of equation 9 depends on whether the commodity can be bought, sold, or both. In the case of a commodity which is only bought, $\Delta\omega^u$ specifies the maximum amount to buy, and $\Delta\omega^l$ specifies an optional minimum amount that must be met for any exchange. Conversely, in the case of a commodity which is only sold, $\Delta\omega^l$ specifies the maximum amount to sell, and $\Delta\omega^u$ specifies an optional minimum amount that must be met for any exchange. Finally, in the case of a commodity that can be either bought or sold depending on the course of the negotiated exchange, $\Delta\omega^u$ specifies the maximum amount to buy, and $\Delta\omega^l$ specifies the maximum amount to sell. In this latter case, two additional parameters are optionally provided to specify minimum threshold amounts to buy and sell that must be met for any exchange.

These constraints, $\Delta\omega^u$ and $\Delta\omega^l$, change during the intermediated exchange negotiation in accordance with the previously described protocol. Before the intermediated exchange, the participant instructs its e-agent with the maximum amounts of commodities to buy or sell. The participant can also optionally specify the minimum amount to buy or sell so that if this minimum is not met no exchange of that commodity is made. The e-agent transmits in its opening message these upper and lower bounds on the amounts to buy or sell to the intermediary for its use in initial offer generation.

In subsequent negotiation rounds, the e-agent generates counter-offers by selecting amounts to buy or sell from the intermediary's preceding offers. Thus, at each stage of the negotiation, the upper bound in equation 9, that is $\Delta\omega^u$, $\Delta\omega^l$, or both as is appropriate, is set to the amounts offered in the immediately preceding offer from the intermediary. Accordingly, the upper bound limiting the exchanged amounts, and thus the decision variables in equation 9, vary during the intermediated negotiation.

In equation 10, $\omega$ is a vector containing the amounts of commodities that will be in the portfolio if an intermediary accepts the e-agent's counter-offer.

$$\omega = \Delta\omega + h \tag{10}$$

The amounts in the portfolio, $\omega$, are the current holdings of the portfolio, h, plus the changes in the portfolio, $\Delta\omega$. A participant can also optionally specify limits on the total amounts of each commodity in a portfolio by specifying upper and lower bounds, $\omega^u$ and $\omega^l$, in equation 11 that limit the possible values of $\omega$.

$$\omega^l \leq \omega \leq \omega^u \tag{11}$$

A preferred utility function, $U_A$, is expressed in terms of $\omega$ and $\Delta\omega$, and thus in terms of the decision variables b and s, in equation 12 below.

$$U_A = \alpha^t\omega - \gamma(\omega-B)^t\Sigma(\omega-B) - \delta T(\Delta\omega) - \phi^t(S^u + S^l) \tag{12}$$

The first term in equation 12 represents the preference, or expected return, of the proposed portfolio, and is a sum of the amount of each commodity in the proposed portfolio times its numeric preference factor, or expected return. The preference factors for all the commodities are gathered into the elements of vector $\alpha$. Other forms of utility functions adaptable to this invention are apparent to those of skill in the art.

The remaining three terms of the utility function above represent the participant's aversions to risk, to transaction costs, and to constraint slack, respectively. The second term, representing aversion to risk, is typically the variance of the preference or expected return with respect to an optional benchmark portfolio, represented as vector B of benchmark commodity amounts. If this benchmark portfolio is specified, the risk of a proposed portfolio will be zero if the proposed portfolio is the same as the benchmark portfolio. If the benchmark portfolio is not specified, B is 0, and the second term measures the absolute amount of risk in the proposed portfolio. The matrix $\Sigma$ has elements which are the covariance of the commodity preferences or return and represents risk in mean-variance portfolio theory. The factor $\gamma$ is a weighting factor representing the participant's overall aversion to risk.

The third term models transaction costs as a function of the amounts of commodity exchange, $\Delta\omega$. The transaction cost model, T, is preferably separable, in that the cost for exchanging a particular commodity is independent of the amounts of other commodities exchanged. T need not be linear in the amounts of commodities exchanged, and can, for example, represent decreasing costs with increasing amounts of commodities exchanged. The factor $\delta$ represents a participant's overall aversion to transaction costs.

The fourth term represents the participant's aversion to constraint slack, or in other words, constraint violation. This factor is a sum of products, each product including a term from vector $\phi$ representing a participant's aversion to the slack in that particular constraint multiplied by the amount by which that constraint is violated, either on the low side, represented by $S^u$, or the high side, represented by $S^l$.

In this utility function all the terms are preferably positive. Therefore, when this function is substantially maximized, the expected preference or return of the proposed portfolio is substantially maximized, while simultaneously the risk, the transaction costs, and the constraint violation slack are substantially minimized according to the specified aversions.

The utility function of equation 12 is substantially maximized within the limits of constraints such as specified by equations 13–16. Equations 13 and 14 illustrate financial asset allocation constraints that limit the amounts of particular classes of commodities in a final portfolio.

$$c^l \leq C\omega + S^l - S^u \leq c^u \tag{13}$$

$$0 \leq S^l, S^u \tag{14}$$

Such classes can be, for example, industry groupings, e.g., utility, technology, or cyclical stocks. Each row of matrix C adds portfolio holdings of commodities of a particular allocation class. Vectors $c^l$ and $c^u$ represent the minimum and maximum amounts, respectively, of commodities in the groups defined by matrix C. Slack variables $S^l$ and $S^u$, having positive elements according to equation 14, record the amount by which the commodity allocation constraints are violated on the low side and on the high side, respectively.

Equation 15 constrains the risk in proposed portfolio, $\omega$, compared to an optional benchmark represented by B. This constraint limits the total relative risk, or total absolute risk where B is 0, to less than a maximum quantity $\sigma^u$.

$$(\omega-B)^t\Sigma(\omega-B) \leq \sigma^u \tag{15}$$

Finally, equation 16 represents additional constraints on the amounts of commodities exchanged, $\Delta\omega$.

$$d^l \leq D\Delta\omega \leq d^u \tag{16}$$

In the case where matrix D represents the prices of commodities, this constraint limits the total dollar imbalance of the total commodity exchange represented by $\Delta\omega$ to be between a lower bound, $d^l$, and an upper bound, $d^u$. This constraint may be useful for limiting cash exposure during a particular intermediated exchange.

The framework described above implements the previously described portfolio strategies by merely setting certain variables to 0 or 1 as provided in Table 4. Absence of a parameter limitation is indicated by an empty box in this table. For example, the "active with risk" strategy allows all the parameters to be set freely by a participant. On the other hand, the "active with no risk" strategy requires that the risk aversion parameter, $\gamma$, be set to 0, leaving the other parameters to be freely set. The simple "list" strategy requires that all the preference weights, $\alpha$, be set to 1 with all the remaining parameters of the utility function set to 0. For this strategy, substantially maximizing the utility function merely maximizes the total amounts in the proposed portfolio, $\omega$, as the utility function in this strategy merely reduces to a sum of the amounts of commodities in a proposed portfolio. This maximum is limited by any optional constraints specified according to equations 9, 11, 13, 15 and 16.

Therefore, to select and parameterize a strategy, participants generally make some or all of the following selections for each order submitted to the intermediated exchange:

1. Specify commodities to buy and sell and the maximum, and optionally the minimum, amounts to be exchanged (vectors $\Delta\omega^l$, $\Delta\omega^u$, $\omega^l$, and $\omega^u$);
2. Specify commodity preference rankings by buy or sell side (vector $\alpha$);
3. Select risk model, benchmark portfolio, if any, and specify risk aversion and/or risk limit (matrix $\Sigma$, vector B, scalar $\gamma$, and scalar $\sigma^u$, respectively);
4. Select transaction cost model and specify cost aversion (function $T(\Delta\omega)$, scalar $\delta$, and the parameters of equations 17–20);
5. Specify other constraints, such as cash imbalance constraints (matrix D, vectors $d^u$ and $d^l$).

In the preferred embodiment, a participant makes these selections using a set of screen displays that facilitate entry of parameters or choices according to individual strategies.

TABLE 4

Strategy Option Implementation

| Strategy | $\alpha$ | $\gamma$ | $\delta$ | h | $\phi$ |
|---|---|---|---|---|---|
| Active with risk | | | | | |
| Active with no risk | | 0 | | | |
| Indexing | 1 | | | | |
| Characteristics | 1 | 0 | | | |
| Opportunity Cost | 1 | 0 | 0 | | 0 |
| List | 1 | 0 | 0 | 0 | 0 |

Various alternative utility functions and constraints may be used in various embodiments of the invention. Equations 17–20 illustrate one such alternative. These equations, include additional terms representing the transactions cost in the intermediated exchange compared to the transaction costs in other markets or exchanges. Here, vectors $b_i$ and $s_i$ represent the amounts to buy or sell, respectively, in this intermediated exchange and vectors $b_m$ and $s_m$ represent the amounts to buy or sell in other markets or exchanges.

$$\Delta\omega_i = b_i - s_i \quad (17)$$

$$\Delta\omega_m = b_m - s_m \quad (18)$$

$$\Delta\omega = \Delta\omega_i + \Delta\omega_m \quad (19)$$

Equations 17 and 18 give the net amounts exchanged in this intermediated exchange and in other markets. According to equation 19, the total amount of commodities exchanged, $\Delta\omega$, equals the sum of the net amounts exchanged in the intermediated exchange of this invention and the net amounts exchanged in other markets. The transaction cost term in the utility function, the fourth term in $U_A$ of the equation 12 is replaced according to equation 20.

$$\delta T(\Delta\omega) = \delta_i T(\Delta\omega_i) + \delta_m T(\Delta\omega_m) \quad (20)$$

The overall separable transaction cost model is the sum of two different separable transaction cost models: (1) a function of the amounts exchanged that uses the system of this invention, and (2) a function of the amounts exchanged in other markets. Sophisticated participants can use this alternative approach to make trade-offs between the cost of portfolio management using the system of invention and the cost of management in other markets.

Other alternative utility function and alternative portfolio techniques adaptable to this invention can be developed by those of skill in the art based on this disclosure. For example, additional constraints can be added, or the linear and quadratic terms for the commodity preferences and risk aversion of Equation 9 can be replaced by more general functions. Also frameworks other than the mean-variance, risk-reward model can be used by e-agents.

Method Based on Rules

Alternatively, an e-agent can use rules to generate counter-offers in response to an intermediary's offers. These rules, provided to the e-agent by the participant, preferably, are stated using typical programming language syntax, such as "if-then-else" statements, "for" statements, "while" statements, "case" statements, and so forth. These statements may include Boolean tests applied to the commodity amounts in an offer and executable portions that generate an e-agent's counter-offer. In one implementation, these statements are executed by a statement or a rule interpreter of the e-agent process, while in another implementation, these rules could be compiled into a module which is simply called from the e-agent process.

The following set of rules illustrate the rule-based approach.

```
BEGIN
  IF {     (Shares of IBM Stock offered for sale >= 1000
            shares) & (pork-bellies offered for purchase >=
            10 units) }
  THEN {
       (counter-offer to buy IBM stock <= 100,000 shares)
       & (and counter-offer to sell an equivalent dollar
       amount of pork-bellies)
  };
  IF {     grapefruit is offered for sale at less than $1
            per pound }
  THEN {
       counter-offer to buy grapefruit <= 10 pounds
  }
  ELSE IF {bananas are offered for sale at less than $2
            per pound }
  THEN
       counter-offer to buy bananas <= 4 pounds
  }
  ELSE IF { figs are offered for purchase at greater than
            $3 per pound }
  THEN {
       counter-offer to sell figs <= 20 pounds
  };
END.
```

Based on the above rules, an e-agent would generate an opening message with the following contents: IBM stock can be bought in quantities between 1,000 and 100,000 shares; pork bellies can be sold in quantities between 10 units and an amount dollar equivalent to 100,000 shares of IBM stock; grapefruit can be bought in amounts of less than 10 lbs.; bananas can be bought in amounts of less than 4 lbs.; figs can be sold in amounts less than 20 lbs. After this opening, the e-agent would generate counter-offers from intermediary offers by applying these rules to the offers. For example, an intermediary offer could include the following: the sale of 10,000 shares of IBM stock; the purchase of 1,000 pork bellies; the sale of 20 lbs. of grapefruit at $2 per lb.; the sale of 10 lbs. of bananas at $1 per lb.; and the purchase of 40 lbs. of figs at $4 per lb. Applying the above rules to such an offer, an e-agent would offer to buy an amount of IBM stock dollar-equivalent to 1,000 pork bellies, since the minimum requirements of the first rule are met by the offer of IBM stock to sell and pork bellies to purchase. No grapefruit is purchased, since it is offered at a price greater than $1 per lb. According to the first "else" alternative of this "if" statement, 4 lbs. of bananas are bought since they are offered at less than $2 per lb. This successful purchase terminates the "if" statement without further consideration of the offer to purchase figs. As a result, the e-agent would sell 1,000 pork bellies, purchase a dollar equivalent amount of IBM stock, and purchase 4 lbs. of bananas.

5.2.2. Offer Generation

As described, the intermediary and the e-agents exchange messages in order to arrive at a satisfactory intermediated exchange. The e-agents do not communicate directly with each other, and are not aware of each other's identity or existence. In the preferred embodiment for financial commodities, the intermediary seeks to allocate commodities in order to substantially maximize in a fair manner the total amount of all commodities exchanged. This commodity allocation can also be subject to certain optional constraints that may be implemented in the intermediary due to market requirements, secrecy requirements, efficiency requirements, and so forth.

Since many commodities are directly exchanged in whole units, the intermediary preferably does not generate offers to e-agents for fractional amounts of commodities. For example, financial markets typically exchange shares of common stock in units of 100. Such a common constraint can be implemented in the intermediary. Another type of constraint for intermediary implementation is known as "tiering constraints." In some situations, a participant or a group of participants may be unwilling to trade with other participants or other groups of participants, while at the same time wishing to maintain their anonymity. To maintain such secrecy, tiering constraints are preferably implemented in the intermediary.

Certain constraints may be implemented in either the e-agents or the intermediary. An example of such constraints are participant minimums on the number of units of a particular commodity that the participant is willing to exchange. For example, a participant may wish to exchange either 5,000 units or more up to some specified maximum or nothing at all. To substantially maximize the amounts of commodities eventually exchanged and to substantially minimize message generation, such e-agent minimums may be implemented in the intermediary. Other appropriate constraints can also be implemented in the intermediary. For example, limited e-agents, such as e-agents for list-strategy participants, can have their constraints implemented as part of offer generation in order that any generated offers are automatically acceptable to such limited e-agents, and can be accepted with an identical counter-offer without further rounds of negotiation.

The objectives of substantially maximizing the total amount of commodities exchanged and the fairness of their allocation among the e-agents often conflict. This conflict can be resolved in various ways. In the preferred embodiment that deals with financial commodities, the intermediary generates each offer in a manner that substantially maximizes the tradeoff between the total units exchanged and a pro-rata measure of allocation fairness. In other embodiments, the intermediary can substantially maximize the amount exchanged while ensuring fairness only over the entire intermediated exchange or, perhaps, only over series of intermediated exchanges. The intermediary may also choose to substantially maximize the fairness of allocation at the expense of the amount of exchanged commodities. In all cases, it is preferable that the intermediary act in a manner consistent with the joint interests of all the participants likely to be present in a given intermediated exchange.

In the preferred embodiment for financial commodities, the intermediary generates offers by substantially maximizing a utility function of the amounts of each commodity offered to each of the e-agents. A preferred utility function includes terms representing the amount exchanged and the fairness of the allocation. The general framework of this utility function and the optional constraints are presented using the variables in Table 5 below. (For clarity, the subscript, "n," denoting round number of the negotiation, is dropped in this subsection.)

TABLE 5

Intermediary Variables

| Variable | Meaning |
|---|---|
| $B^u_{i,j}$; $S^u_{i,j}$ | Maximum amount of commodity j to buy or sell in this exchange, respectively, indicated in e-agent i's opening message |
| $B^1_{i,j}$; $S^1_{i,j}$ | Minimum amount of commodity j to buy or sell in this exchange, respectively, indicated in e-agent i's opening message; if no minimum indicated, 0 is assumed |
| $Y^b_{i,j}$; $Y^s_{i,j}$ | Binary threshold variables are set to 1 if the e-agent i receives in the current offer its minimum buy or sell amounts, respectively, of commodity j; otherwise, they are set to 0 |
| $b_{i,j}$; $s_{i,j}$ | Amount of commodity j to buy or sell, respectively, offered to e-agent i by the intermediary, as determined according to intermediary objectives |
| $b^u_{i,j}$; $s^u_{i,j}$ | Maximum aount of commodity j which e-agent i can buy or sell according to the preferred protocol |
| $d^{buy}_{i,j}$; $d^{sell}_{i,j}$ | Current demands, or upper bounds, according to the preferred protocol on the amount of commodity j which e-agent i can buy or sell, respectively, at this round of the protocol |
| $w^b_{i,j}$; $w^s_{i,j}$ | The relative pro-rata amount of commodity j to buy or sell in this exchange, respectively, determined from the amounts in e-agent i's opening message compared to the total amounts to buy or sell, indicated in all the e-agents opening messages |
| $\gamma$ | A controllable parameter to adjust the tradeoff between fairness and amounts allocated |
| $O_1$, $\theta_1$ | Tiering-constraint e-agent subsets: for each pair of subsets associated with a given 1, no e-agent in the first subset wishes to trade with any e-agent in the second subset |
| $\delta^b_i$; $\delta^s_i$ | Optional fairness weights used by the intermediary to adjust the fairness of the allocation for e-agent i in determining buy or sell amounts to offer |

The preferred utility function, $U_I$ for the intermediary includes two terms, one term representing the total amount of commodities exchanged, and the second term representing the fairness of the commodity allocation. Since $b_{i,j}$ represents the amount of commodity J bought by e-agent I, the total amount of commodities, denoted by A, exchanged is given by equation 21.

$$A = \sum_{i,j} b_{i,j} \qquad (21)$$

Because of constraint equation 27, the total amounts sold equal the total amounts bought for each commodity.

Commodities are fairly allocated when each e-agent is offered a fair proportion of the total amount of each commodity present in an exchange. This invention is adaptable to numerous ways of determining the fair proportion and the amount of each commodity present. In the preferred embodiment, the fair proportion of a commodity for an e-agent is that e-agent's pro-rata purchase or sales fraction. This fraction is measured by comparing the demand which the intermediary has assigned to that e-agent in the current round of negotiation to the demands assigned to all the other e-agents in the current round. An e-agent's fair proportion changes during a negotiation, since the demands assigned to the e-agents change from round to round of the negotiation. In more detail, since $d^{buy}_{i,j}$ is the demand to buy commodity J assigned to e-agent I by the intermediary at the current round of the negotiation of the intermediated exchange, e-agent I's fair proportion of commodity J to buy is given by equation 22.

$$w^b_{i,j} = \frac{d^{buy}_{i,j}}{\sum_k d^{buy}_{k,j}} \qquad (22)$$

Similarly, since $d^{sell}_{i,j}$ is the demand to sell commodity J assigned to e-agent I by the intermediary at the current round of the negotiation, e-agent I's fair proportion of commodity J to sell is given by Equation 23.

$$w^s_{i,j} = \frac{d^{sell}_{i,j}}{\sum_k d^{sell}_{k,j}} \qquad (23)$$

Further, the preferred total amount of a commodity present in a round of the negotiation is the sum of the amounts of this commodity to be offered in this round to each of the e-agents.

In view of these choices, equation 24 is a preferred measure of the overall fairness of the commodity allocation among the e-agents.

$$W = \sum_j \left[ \sum_i \left( b_{i,j} - w^b_{i,j} \sum_k b_{k,j} \right)^2 + \sum_i \left( s_{i,j} - w^s_{i,j} \sum_k s_{k,j} \right)^2 \right] \qquad (24)$$

For example, considering the first purchase summation, the difference between the amount of commodity J that e-agent I is to be offered, $b_{i,j}$, and e-agent I's fair proportion of commodity J, that is the pro-rata purchase fraction, $w^b_{i,j}$, multiplied by the sum of all amounts of commodity J offered to all of the e-agents, represents the fairness of the allocation of commodity J for e-agent I's purchase. The greater the difference in these two quantities, the greater is the unfairness, either to e-agent I or to the other e-agents, of e-agent I's allocation of commodity J. A similar expression represents fairness of the allocation of commodity J for e-agent I's sale. The sum, W, of these measures over all commodities and all e-agents is the preferred measure of the fairness of the total allocation. The smaller W, the closer this allocation is to being perfectly pro-rata. This representation of W as a sum of squares is preferred because it facilitates computation of the maximum of the utility function for the intermediary. Other expressions for W can also be used. In fact, at the expense of increased computational cost, any monotonicly increasing function of the absolute values of these differences can be used as a measure of the allocation fairness.

In certain situations, the preferred fairness measure, which weights equally all e-agents, fails to result in an allocation satisfactory to the objectives of all the participants. For example, certain participants who have specified large exchange amounts, can receive proportionately less than they feel is fair in cases where other participants have specified certain constraints, such as dollar imbalance constraints. In such situations, an alternative fairness measure incorporates fairness weights, $\delta^b_i$ and $\delta^s_i$, which can give certain e-agents a greater or lesser influence in the fairness measure for purchases or sales according to whether their weights are specified to be greater or less than 1, respectively. An exemplary weighted fairness measure is given by equation 25.

$$W = \sum_j \left[ \sum_i \delta^b_i \left( b_{i,j} - w^b_{i,j} \sum_k b_{k,j} \right)^2 + \sum_i \delta^s_i \left( s_{i,j} - w^s_{i,j} \sum_k s_{k,j} \right)^2 \right] \qquad (25)$$

These fairness weights can be adjusted either during the course of an intermediated exchange or from one intermediated exchange to another, in order to satisfy the joint fairness requirements of all the participants.

Finally, the intermediary utility function is given by Equation 26 as the difference between the amount exchanged, A, and the measure of allocation fairness, W, multiplied by an aversion factor, γ.

$$U_I = A - \gamma W \qquad (26)$$

This aversion factor controls how seriously an intermediary considers allocation fairness. The greater the value of this aversion factor, the more important role the allocation fairness plays in the intermediary's overall offer generation.

Preferably, the value of this aversion factor is chosen according to the joint goals and objectives of the participants and the intermediary in a given intermediated exchange. In the preferred embodiment, this factor is heuristically chosen by running sample intermediated exchanges with typical input data or by rerunning past intermediated exchanges using the previous instructions provided by the participants along with other previous data but with various heuristics. A satisfactory aversion factor is one which meets the joint goals of the participants and the intermediary for fairness and maximum commodity exchange in these test runs.

The intermediary generates offers by substantially maximizing its utility function, $U_I$, which is a function of the offer amounts, $b_{i,j}$ and $s_{i,j}$, subject to certain constraints. One essential constraint is that each commodity is completely crossed, that is for each round of the negotiation the sum of the amounts of each commodity that the intermediary offers for sale to all the e-agents equals the sum of the amounts of that commodity that the intermediary offers to purchase from all the e-agents. Therefore, no commodity has an excess or a deficit in the exchange. This constraint is expressed in equation 27.

$$\sum_i b_{i,j} = \sum_i s_{i,j}, \forall j \qquad (27)$$

A further constraint is that all exchanges occur in multiples of standard commercial units. For example, for stocks, such a standard unit is 100 shares. Further, the coefficients and bounds must be chosen according to the commercial units of the problem. These integer constraints are expressed in equation 28.

$$b_{i,j}, s_{i,j} \text{ are integer } \forall i,j \qquad (28)$$

In the case of stock, each integer unit represents blocks of 100 shares.

Further constraints are bounds on the commodity amounts that can be exchanged. Equations 29 and 30 express the lower and upper bounds, respectively, on the amounts that e-agent I can buy of commodity J.

$$0 \leq y^b_{i,j} b^l_{i,j} \leq b_{i,j} \ \forall i,j \quad (29)$$

$$b_{i,j} \leq y^b_{i,j} b^u_{i,j} \ \forall i,j \quad (30)$$

Equations 31 and 32 express the lower and upper bounds, respectively, on the amounts E-agent I can sell of commodity J.

$$0 \leq y^s_{i,j} s^l_{i,j} \leq s_{i,j} \ \forall i,j \quad (31)$$

$$s_{i,j} \leq y^s_{i,j} s^u_{i,j} \ \forall i,j \quad (32)$$

According to equations 29 and 31, the decision variables of the problem are greater than equal to zero. Equation 33 limits the value of the variables, $y^b_{i,j}$ and $y^s_{i,j}$, called herein "threshold variables," to 0 and 1.

$$y^b_{i,j}, y^s_{i,j} \in \{0,1\}, \ \forall i,j \quad (33)$$

The threshold variables are by default 1, but are set to 0 if an offer being computed allocates less than the buy or sell minimum amounts of commodity J to e-agent I. These variables, together with equations 29 through 32, express the constraint that e-agent I will only buy or sell commodity J if it can exceed any specified minimum exchange requirements.

These exchange bounds play a role during a negotiation according to the preferred protocol for intermediated exchange of this invention. For the first offer generated by the intermediary, the upper limit constraints on sales and purchases by each e-agent are set to the limits provided by that e-agent in its opening message to the intermediary. Also, for the first and all subsequent offers, the lower limit constraints on sales and purchases by each e-agent are set to the minimum exchange constraints, if any, also specified in e-agents' opening messages.

During subsequent rounds of the negotiation, the upper limit constraints on sales or purchases of each commodity are set to the current demands for sales or purchases, respectively, according to the preferred negotiation protocol, that is:

$$b^u_{i,j} = d^{buy}_{i,j}; \ s^u_{i,j} = d^{sell}_{i,j} \quad (34)$$

In this manner, intermediary offers are automatically generated consistently with the Intermediary Rule of the preferred protocol. Where alternative bounds are used in a negotiation protocol, these upper and lower constraints are adjusted accordingly.

As previously discussed, the current demands, or upper bounds, $d^{buy}_{i,j}$ and $d^{sell}_{i,j}$, are adjusted during the rounds of the negotiation according to heuristic rules which balance requirements on negotiation convergence, exchange amounts, and fairness. Preferably, as the negotiation proceeds, the current demand for a commodity is chosen to progress from its initial amount, the maximum amount of the commodity of interest, towards the amount of the immediately preceding e-agent counter-offer in a substantially uniform fashion. This preferred heuristic is computed according to equations 35 and 36.

$$d_n = d_{n-2} - \left(\frac{n}{k}\right)(d_{n-2} - a_{n-1}) \ \forall n \leq K \quad (35)$$

$$d_n = a_{n-1} \ \forall n > K \quad (36)$$

In these equations, "n" denotes the number of the current round of the negotiation; "$d_n$" denotes the current demand; "$d_{n-2}$" denotes the immediately preceding demand; and "$a_{n-1}$" denotes the amount of the immediately preceding e-agent counter-offer. The constant "K" controls the rate by which the current demand approaches the immediately previous counter-offer. K is preferably approximately 5, or, alternatively between 3 and 10. Another embodiment of this heuristic replaces equation 35 with equation 37 when n>K.

$$d_n = d_{n-2} - \left(\frac{1}{K-n+1}\right)(d_{n-2} - a_{n-1}) \ \forall n \leq K \quad (37)$$

According to another heuristic, the current demand in a given round of negotiation, for a given commodity and e-agent, is the average of the immediately preceding intermediary offer and the immediately preceding e-agent counter-offer for that commodity. Thereby, for n<K, the current demand is determined according to equation 38.

$$d_n = d_{n-2} - \left(\frac{1}{2}\right)(d_{n-2} - a_{n-1}) \ \forall n \leq K \quad (38)$$

Among optional constraints are tiering constraints, which express the desire of certain e-agents not to exchange with certain other e-agents. According to the tiering constraints, pairs of sets of e-agents, $O_l$ and $\Theta_l$, are defined, such that for each pair of sets, no e-agent in set $O_l$ trades with any e-agent in set $\Theta_l$. Equation 39 expresses the tiering constraints for purchases of e-agents in set $O_l$, by requiring that all such purchases can be satisfied by sales of e-agents not in set $\Theta_l$.

$$\sum_{i \in O_1} b_{i,j} \leq \sum_{i \notin \Theta_1} s_{i,j}, \forall j, l \quad (39)$$

Equation 40 expresses similarly this constraint for sales of e-agents in set $O_l$.

$$\sum_{i \in O_1} s_{i,j} \leq \sum_{i \notin \Theta_1} b_{i,j}, \forall j, l \quad (40)$$

Further optional constraints may be included in the intermediary's offer generation computation, one such being dollar imbalance constraints for those e-agents. Dollar imbalance constraints are illustrated by equation 14.

The problem of substantially maximizing the utility function, $U_I$, as defined by equation 26, according to the described constraints is known in the art as a "mixed integer-quadratic optimization problem." Its solution provides the offers that the intermediary sends to each e-agent. As is commonly known in the relevant art, the computational demands involved in finding the solutions to such mixed integer-quadratic problems can be prohibitive, given the current capabilities of commercially available processors. Therefore, practitioners skilled in the art often use heuristic methods that do not guarantee that a solution is exactly optimal, but instead provide a solution that is satisfactorily accurate as well as computable in an acceptable time.

In particular, the quadratic form of the fairness term in the utility function, $U_I$, certain of the constraints, and the sheer size of mathematical programs that can be encountered can increase the computational demands of the intermediary. Accordingly, the preferred implementation of the intermediary computation uses one or more, and preferably all, of the following heuristics to achieve satisfactory accuracy within the available computational resources.

First, in view of the size of the problem that the intermediary solves for each of the possibly many rounds a successful negotiation may require, the mathematical program of the intermediary is linearized. The quadratic fairness term W, defined in equation 25, is approximated by a piece-wise linear, convex function according to methods known in the art of mathematical programming. The resulting linear mathematical program of the intermediary can then be modeled as a minimum-cost flow problem. Such a model can be routinely constructed by methods known in the art of mathematical programming. See, e.g., Papadimitriou et al., 1982, *Combinatorial Optimization: Algorithms and Complexity,* Prentice-Hall Inc., which is herein incorporated by reference in its entirety. In general, an implementation modeled as a minimum-cost flow problem uses less computation per round of the negotiation than an implementation using linear programming. However, an implementation using linear programming has the advantage that a subsequent round of negotiation can use the solution of the previous round of negotiation for an initial approximate solution. Therefore, in the preferred implementation, for the first K rounds of negotiation the intermediary computation is modeled as a minimum-cost flow problem and, in the subsequent rounds when the negotiation is closer to convergence, the problem is implemented using linear programming. The value of K is chosen to achieve an adequately accurate solution within the time bounds on the intermediary. In the preferred implementation, K is set to between 4 and 6, preferably approximately 5.

Next, the constraints represented by equations 29–33, which express that e-agent I will only buy or sell security J if the offered amount exceeds minimum exchange requirement $b'_{i,j}$ or $s'_{i,j}$, are modeled by the following preferred heuristic. For the first L rounds of the negotiation, these constraints are disregarded. After the L'th round, if the amount, $a_{n-1}$, chosen by the e-agent in a counter-offer is less than the specified lower bound, the intermediary sets the demand, $d_n$, for the current offer to 0, in order that none of that commodity will be offered to that e-agent in subsequent rounds of the negotiation. The value of L is chosen to substantially maximize the total amounts exchanged while still satisfying all such e-agent constraints. In the preferred implementation, K is set to between 4 and 6, preferably approximately 5.

Finally, the integer constraints represented by equation 28, which express that the commodities are exchanged in the relevant commercial units, are modeled by the following preferred heuristic. At each round of negotiation, first, the intermediary solves the commodity allocation problem disregarding the integer constraints of equation 28. Second, the intermediary then allocates any fractional commodity units in the resulting solution fairly among the e-agents, so that only integer units of commodities are actually exchanged. The allocation of fractional units can be done according to many methods. A preferred method for this allocation proceeds according to the following steps.

1. Ignore integer constraints and solve the problem of substantially maximizing the utility function of the intermediary subject to constraints with continuous variables. Such a solution can be obtained according to methods known in the art, for example, using commercially available mathematical programming software. This software includes CPLEX™ from CPLEX Optimization Inc. (Incline Village, Nev.) or OSL™ from IBM Corp. (Poughkeepsie, N.Y.). See, also, Karloff, 1991, *Linear Programming,* Birkhauser.

2. For each commodity J, adjust the amounts for each e-agent to buy or sell provided by the continuous solution to integer values according to in the following indented steps:

3. Let T=0.

4. For each e-agent I exchanging commodity J, randomly adjust the amount to buy, $b_{i,j}$, either to $\lfloor b_{i,j} \rfloor$ (the greatest integer less that or equal to $b_{i,j}$) or to $\lceil b_{i,j} \rceil$ (the least integer greater than or equal to $b_{i,j}$) with probabilities proportional to ($\lceil b_{i,j} \rceil - b_{i,j}$) or to ($b_{i,j} - \lfloor b_{i,j} \rfloor$), respectively; make a similar adjustment to the amount to sell, $s_{i,j}$; add the adjusted difference to T if the order is to buy, or subtract from T if the order is to sell.

5. If T>=1 of if T<=−1, then adjust the order in an opposite manner, that is from $\lfloor b_{i,j} \rfloor$ to $\lceil b_{i,j} \rceil$ or vice versa, in order to maintain the value of T to be strictly between −1 and 1.

6. Repeat steps 3, 4, and 5 for each e-agent I interested in commodity J.

Alternatively, the following process can be used to fairly allocate fractional units.

1. Ignore integer constraints and solve the problem of substantially maximizing the utility function of the intermediary subject to constraints with continuous variables according to the previously described methods.

2. For each commodity J, adjust the amounts for each e-agent to buy provided by the continuous solution to integer values according to in the following indented steps:

3. For each e-agent I exchanging commodity J compute $\lfloor b_{i,j} \rfloor$, the greatest integer less than or equal to $b_{i,j}$. This removes any fractional units from e-agent I.

4. Compute the sum given by equation 41.

$$B_j = \sum_i b_{i,j} - \lfloor b_{i,j} \rfloor \qquad (41)$$

This determines the total fractional units of asset J taken from all e-agents. Then truncate $B_j$ to $\lfloor B_j \rfloor$.

5. Reallocate the truncated $B_j$ fractional units back to the e-agents one unit at a time according to the following steps:

6. While $B_j > 0$ do:

7. Rank the e-agents in order by their:
   share of the allocation (ascending);
   slack in cash balance constraint (descending),
   units below minimum units (ascending).

8. Assign one unit to the e-agent ranked highest in step 7. Break any ranking deadlocks randomly.

9. $B_j = B_j - 1$

10. Repeat steps 1 and 2 for the continuous sell variables.

5.3. An Embodiment for Exchange of Financial Commodities

As discussed, this invention is particularly adapted to the exchange of financial commodities, and in this section the preferred implementation adapted to this exchange is described. Financial commodities include such intangibles as stocks and bonds, as well as contracts for the future exchange of tangible or intangible commodities, known as options. Preferably, these commodities are traded in financial markets during which publicly available bid and ask prices are established. Financial commodities are often identified by a number selected by the Committee of Uniform Security Identification (the "CUSIP number"), or by an exchange trading symbol, and in the following the word "symbol" is often used synonymously with financial commodity.

In this embodiment, the invention includes an Order-Manager system (hereinafter also referred to as an "OM" system). This system makes services for the electronic intermediated exchange of financial commodities available to, typically, remote participants over network interconnections. This system accepts commodity exchange orders from participants, performs intermediated exchanges periodically during the day, either at pre-established times or as instructed by the system operator(s), and reports the results of completed exchanges to the participants. In the preferred embodiment, preestablished exchanges are conducted four times per day. In general, the OM System according to the preferred embodiment is structured as a modular collection of computer processes that exchange messages. The next subsection describes the general structure and implementation of this set of computer processes. The subsequent subsection describes the message types exchanged and the software architecture of these processes.

5.3.1. The Order-Manager System

Figure 5:
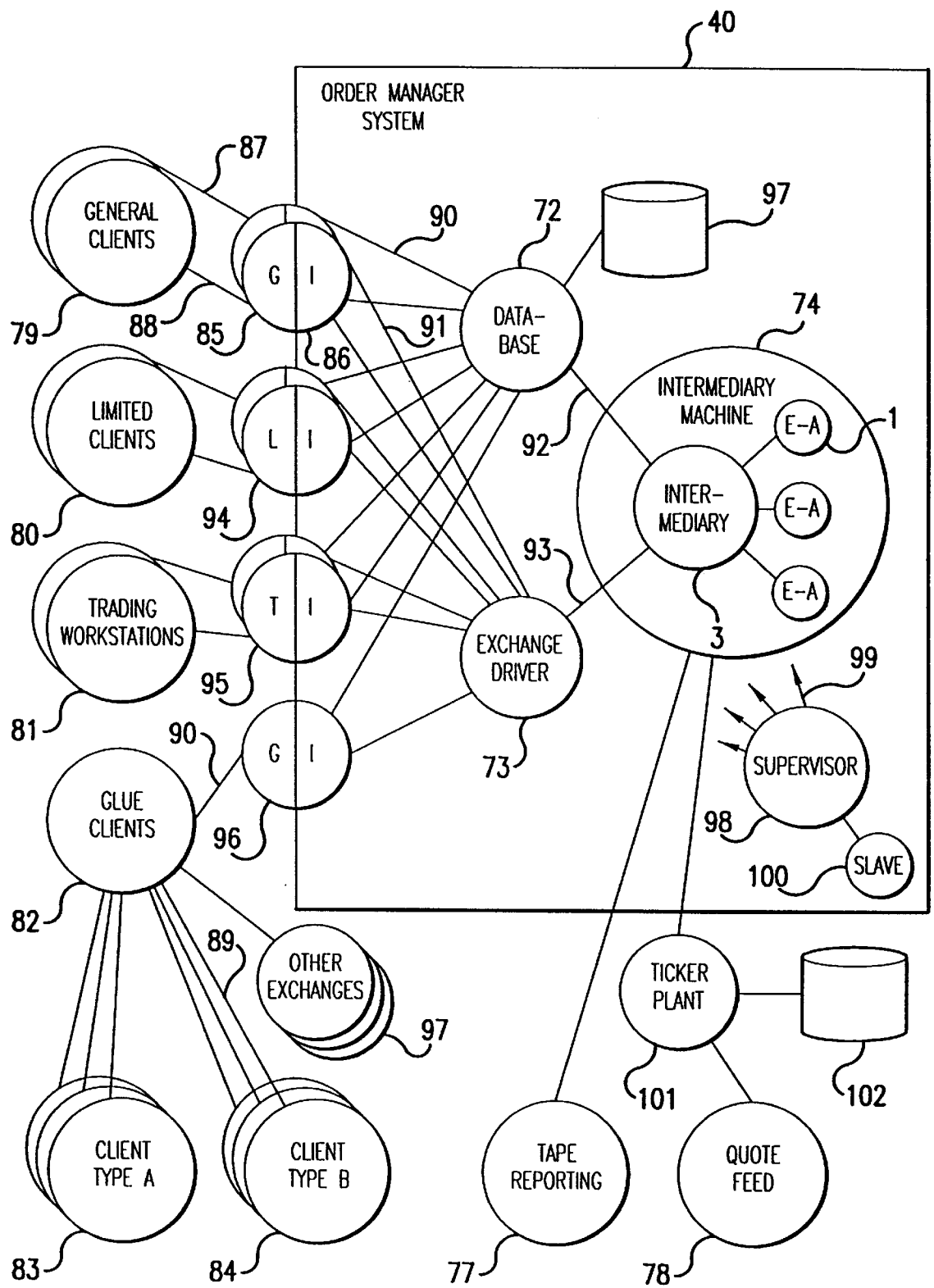

FIG. 5 illustrates a preferred implementation of the Order-Manager system 40, as well as several classes of client systems. The Order Manager includes, client interfaces, system component processes, and the intermediary with e-agents. In this and subsequent sections, a "client system" generally denotes the client portion of a client-server computer system. More particularly, it denotes a computer system used by a participant to access the OM system services.

Client systems for the participant access are preferably grouped into classes which have similar characteristics, such as similar order complexity, similar OM system access performance, similar OM system access authority, and so forth. These classes include general clients 79, limited clients 80, trading workstations 81, and further client types A 83 and types B 84. These client computer systems run participant interface software, herein called "client interactive" software, adapted to particular client types and constructed according to the user interface specification appropriate to the particular client system. In more detail, general client systems 79 are for those participants who require the most general processing capabilities from their e-agents. As described previously, such processing capabilities include selecting commodities according to methods such as finding a constrained extremum of an objective function of commodity amounts or applying rules to commodity amounts. Therefore, the client interactive software for general clients is adapted to the entry or receipt of a large number of variables describing these capabilities, such as the variables identified in Table 3. Accordingly, this software includes screens for entry and display of these variables and the interface is preferably interactive. In other embodiments, this software can be non-interactive, for example, by being adapted to batch data entry by a participant.

On the other hand, limited client systems 80 are for participants with simpler exchange requirements. A type of limited client, the "list completion" client of Table 2, merely accepts any offer from the intermediary which includes commodities of interest and meets limited types of constraints. Such a client is specified by a more limited set of variables, including a list of commodities sought in an exchange, maximum and, optionally, minimum amounts of each commodity sought, and constraints such as tiering, dollar constraints, and price limit constraints. As described subsequently, limited clients may also be processed efficiently by the intermediary without creating separate e-agents. Limited clients may optionally be processed by general client systems and general client interface processes, since they can be specified by variables which are a special cases of those for general clients.

Other client systems types include trading computer workstations 81 and glue client computer systems 82. Trading workstation systems 81 are a special class of client system designed for operators and administrators of the OM system, and not for participants. One or more of the trading workstations can have administrator-level authority for their users to control access to the OM System by other client systems, initiate, monitor, and control intermediated exchanges, and perform other general system control and configuration functions. Other trading workstations may be used by operators who accept orders for intermediated exchanges from participants without client systems.

Glue client systems 82, also called herein the "glue," are more complex clients of the OM system. Although they are client systems of the OM system 40, they are in turn server systems to attached client systems of participants of various types, such as type A clients 83 and type B clients 84 attached by links 89. Client systems attached to glue clients, or to the glue, execute more capable client interactive software, which can direct financial commodity requests to various trading systems other than the OM system 40. Therefore, in addition to being linked to the OM system 40, glue clients 82 are also attached to other exchange systems 97, such as systems for trading in the NYSE or the National Market System of the NASD, and route exchange requests from their own attached client systems to the correct exchange system. As a router connected to the OM system, the glue clients preferably multiplex the OM system requests of their own attached clients over one link, such as link 90.

Finally, certain clients are specialized for administrative and operations functions. Such functions include participant commission billing, end-of-day clearance of completed exchanges, and so forth. The client interactive software for these client systems is specialized to these particular operations functions.

Turning now to the client interface processes of the OM, FIG. 5 illustrates that each client system directly attached to the OM system 40 is linked to an instance of an interface process. Preferably, these interface computer processes are specialized to the particular requirements of that class of client systems to which they are linked. Therefore, general clients 79 have general client interface processes 85; limited clients 80 have limited client interface processes 94; trading workstations 81 have trading client interface processes 95; and each glue client 82 has a specialized glue interface process 96.

As each client connects to the OM system, an interface process of the type specialized for handling that client is preferably spawned. This interface process maintains the connection to the client, and terminates after the client disconnects from the system. To decrease computational overhead, and thereby to increase performance, an OM system is adaptable to more complex client interface process which are capable of simultaneously supporting and maintaining connections to several clients. A special case of such a more complex client interface process is the "glue" client, which serves all the clients directly connected to a glue server through a single connection that server. Client interfaces can be of two general types: a first type in which a separate interface instance is required for each separate instance of participant access, and a second type in which multiple participants are multiplexed over a single instance of a client interface. Client interfaces for general clients 79, limited clients 80, and trading workstations 81 are representative of the first type of client interfaces. For these systems, a separate interface process is created for each participant during that participant's access to the OM system. The client interactive software and interface processes of this type are preferably specialized to take advantage of this dedicated access link. Participant exchange request information can be held in memory by the interface process for rapid access in the event of, for example: queries by participants; validation of participant's order corrections, deletions, etc.; attaching participant's order details to reports coming from the intermediary before sending them to participants; and so forth.

Client interface processes are preferably implemented to include two processing functions or halves, as illustrated by the two halves of the circles illustrating client interfaces 85, 94, 95, and 96. One processing function, for example function 85, is for connecting to client systems and exchanging messages with participants of the intermediated exchanges through the client interactive software. This function presents a single communication port for access to the OM system and supports communication protocols and message formats appropriate to each class of client system and client interactive software. Thus, client systems do not need knowledge of the detailed internal structure of the OM system.

The other interface function, for example function 86, connects to the internal components of the OM System and exchanges messages with these components. Thus, the OM internal components do not require knowledge of its client systems, for example, knowledge of their types, their network addresses, their communication protocols, or their client interactive software. Preferably, the internal interface functions of the interfaces run substantially the same program code.

The two components of the interfaces pass messages between each other and translate between external formats appropriate for transmission to clients, and internal formats appropriate for transmission to the OM system components. Preferably, all messages exchanged between an OM System and its clients and also between internal OM System components are individually acknowledged and validated to preserve system integrity and client security. Also, other interface implementations can be used. For example, to the extent that limited or other client types are special cases of general clients, such client types can also access the OM System through general client interfaces.

Another function of the interface processes relates to orders that are submitted with a potential duration of several intermediated exchanges or several days. Some participant strategies and corresponding e-agents are designed for only a single intermediated exchange. If a participant employing such a strategy did not receive all desired amounts of commodities, then a new order must be constructed by the client interactive software and submitted to request any residual amounts. However, other participant strategies and corresponding e-agents permit update of a pending order by either removing satisfied commodity requests or by subtracting partially satisfied commodity amounts. The pending updated order remains for the next intermediated exchange for up to participant specified maximum number of exchanges or days. The interface processes for such participants, without involvement of the client interactive software, are responsible both for such order update and for maintaining the order pending according to the participant's specifications.

Types of external electronic message exchanged between clients and the OM system include the following: orders, order corrections, exchange reports, queries, query responses, commands, command responses, and broadcast system messages. In general, these external message types begin with a message header exemplified in Table 6.

TABLE 6

| Message Header | | | |
|---|---|---|---|
| Client identifier | E-agent identifier | Message type | Record Count |

The client identifier field uniquely identifies a client to the OM System, and can be assigned by, for example, a system operator when a particular participant is authorized to make use of the OM System. In cases where a client requires an e-agent and an e-agent has already been assigned, the e-agent identifier or address is included in the message header in order to make message delivery internal in the OM system more efficient. The message type field indicates the type of the message, and the record count field specifies the length or number of sub-records present in this particular message.

Order messages include basic and optional information and can be formatted into a variety of alternative formats. In the preferred embodiment a client presents basic portfolio information, that is identification of the financial commodities to be exchanged along with the maximum amounts of each commodity to be exchanged. Basic portfolio messages have multiple records of a format exemplified in Table 7.

TABLE 7

| Portfolio Detail Record Format | | | | |
|---|---|---|---|---|
| Asset identifier | Price | Buy/Sell | Minimum trade size | Maximum trade size |

The fields of this message are described in the following table 8.

TABLE 8

| Portfolio Message Fields | | | |
|---|---|---|---|
| Field Name | Data Type | Description | Values |
| Asset Identifier | Char. (24) | Unique identifier for asset across participants. | Any valid string, e.g. a symbol or CUSIP number. |
| Price | Float | For certain participants, a dollar ceiling (for a buyer) or a dollar minimum (for a seller) beyond which no asset should be exchanged. | Any non-negative number. |
| Buy/Sell | Char. (1) | Flag to indicate whether asset is being offered for sale or bid for purchase. | B: Asset is bid for purchase. S: Asset is offered for sale. |

TABLE 8-continued

Portfolio Message Fields

| Field Name | Data Type | Description | Values |
| --- | --- | --- | --- |
| Minimum Trade Size | Float | Minimum units of asset required by e-agent for a purchase or sale. | Any non-negative number. |
| Maximum Trade Size | Float | Maximum units of asset that e-agent will buy or sell. | Any non-negative number. |

For limited clients, certain additional constraints can be presented in optional order messages, which supplement the minimum trade amount constraints present in the portfolio message. For example, cash imbalance constraints can be presented as a pair of floating point numbers establishing lower and upper bounds for permitted cash balances after an exchange. Tiering constraints can be presented as a list of identifiers of other clients that this client does not wish to exchange with. Alternatively, for limited clients, both the base portfolio information and the optional constraints can be presented in a single order message.

For general clients, an order message of the preferred embodiment necessarily includes considerable information in addition to the basic portfolio information provided by the limited or list client. First, such information includes an indication of the type of e-agent processing requested, such as offer evaluation according either to mean-variance portfolio theory or to procedural rules. In the first case, an order message can include numeric parameters sufficient to define the scalars, vectors, and matrices which specify the objective function and constraints. An exemplary specification is presented in Table 3. In the latter case, an order message can include the procedural rules specifying e-agent processing. In both cases, either text form or in binary coded form can be used. Also, this additional information can optionally be combined with the basic portfolio information into a single, potentially long, order message. Therefore, the client interface for a general client is preferably adapted to handle such large order messages.

Turning to the additional message types, any parameter supplied in an order message can be altered by a client prior to initiation of an intermediated exchange by submitting an order-correction message. An order-correction message can simply update the particular parameters that the client wishes changed. In the preferred embodiment, the order-correction message replaces all parameters previously supplied by a client, whether changed or not.

After an intermediated exchange completes, the OM system returns exchange reports to each client. These reports include a list of commodity identifiers exchanged on behalf of this client, the amounts exchanged, the exchange price, and an indication of whether the exchange was a buy or a sell. Additionally, in the case of general clients with e-agents performing more complicated processing, the OM system can return special data reflecting the details of e-agent processing, for the participant to check that the e-agent is processing according to requirements, and where this is not the case, to alter parameters or rules to correct processing deficiencies.

Using query messages, a client or participant can query an OM system concerning, for example, the status of submitted orders, the time to the order cutoff for next scheduled intermediated exchange, current commodity prices, and so forth. The OM system returns responses to client queries in the query-response messages. In addition, OM system operators, using the trading workstation interactive application, with OM system operator authority, can submit command messages and receive command-response messages from the OM system. Exemplary commands include those for scheduling an intermediated exchange, controlling access to an intermediated exchange, querying exchange orders or the status or the progress of an intermediated exchange, querying and altering system configuration, querying and altering client authorization, and so forth. A further command provides for running test intermediated exchanges known as "scenarios." Such test exchanges are advantageous for the purposes of providing trading workstation users with a prediction of the results of the next exchange, of verifying that no orders or other data have been submitted that might cause an exchange to fail, and of removing such problematic data, if any. Upon receiving a command to perform such a scenario, the intermediary carries out a complete intermediated exchange using the currently submitted orders, but does not store these exchange results in the database. Further, only the trading workstation clients are informed of the results of a scenario; no reports are sent to the participants or to the tape reporting service. Finally, broadcast system messages can include messages indicating the cutoff of orders for the next intermediated exchange, the commencement of an intermediated exchange, and the completion of the exchange.

In addition to the client interfaces, the Order-Management system has interfaces to a source of commodity prices and to systems for publicly reporting the results of financial exchanges. E-agent strategies of the general clients and optional dollar imbalance or price ceiling constraints of the limited clients can require a snap-shot of up-to-the-moment prices of participating commodities just before an intermediated exchange. This invention can use various sources of price data that provide on request and in a sufficiently timely fashion such a snap-shot.

However, in the case of financial commodities, currently available are "quote feeds," which either broadcast all quotes/trades of financial commodity prices or are capable of responding to a price query only for one commodity at a time. To use such a service, this invention preferably uses a ticker plant system, which includes ticker plant program 101, of FIG. 5, for linking to and monitoring quote feed 78 along with database 102 for accumulating commodity prices. The program monitors the quote feed for price information concerning securities of interest in upcoming intermediated exchanges, and maintains a database of such prices. At the beginning of an intermediated exchange, this database provides the up-to-the-moment prices of commodities participating in the exchange. Since illiquid commodities can appear on a quote feed only a few times each day, the ticker plant must monitor the entire universe of commodities likely to participate in upcoming exchanges. The ticker plant may also perform certain related functions, such as, discovering missing or bad prices, providing for manual price update, accumulating price statistics, and so forth. Preferably, the program of the ticker plant is constructed as a price information server that responds to queries with up-to-the-moment prices of multiple commodities. Thus, a client of the ticker plant is the order-manager system. Currently, preferred quote feed for the ticker plant is S&P Commstock, Inc. (Harrison, N.Y.).

For financial commodities, regulatory authorities require public reporting of all exchanges within established and stringent time limits. In order to satisfy such rules, an OM system can connect to public reporting services and can send to such services in appropriate formats messages indicating the results of each intermediated exchange. Such messages include asset identifiers along with amounts exchanged and exchange prices. For stocks and those bonds which are traded on the New York Stock Exchange ("NYSE"), the American Stock Exchange ("AMEX"), or the National Market System ("NMS"), such a reporting service is available from the Securities Industry Association Automation Corp. ("SIAC"). For options, such a reporting service is available from the Options Pricing Reporting Authority ("OPRA").

FIG. 5 also illustrates a preferred internal structure of order-manager system 40 of the preferred embodiment, including supervisor subsystem 98 with slave-supervisor 100, exchange driver subsystem 73, database subsystem 72, and intermediary machine or machines 74, which host the functions for performing the intermediated exchange. In general, the supervisor function together with the database function maintain a fault-proof system. The exchange driver function manages message flow to and from the intermediary. The intermediary and its internal functions, which actually perform the intermediated exchange, are described in the next subsection.

These OM system functions are described sequentially in more detail in the following paragraphs and subsections after description of the communication links between these functions. These links are used for inter-process messages. The supervisor maintains communication links, illustrated by link 99, with all processes in the OM system 40. Each instance of a client interface establishes a communication link both with the database subsystem 72 and with the exchange driver 73. For example, instance 85 of the general client interface establishes communication link 90 with database function 72 and communication link 91 with exchange driver function 73. Thereby, the intermediary itself need merely establish two links, link 92 with database subsystem 72 and link 93 with the exchange driver 73, and need not have knowledge of the number, identity, or addresses of any of the client interfaces. In addition, the intermediary establishes a link with the ticker plant 101, which acts as a server of up-to-the-moment commodity price information. The intermediary also establishes communication links with external tape reporting service 77, which provides public reporting of completed exchanges.

Supervisor 98 manages a fault-tolerant system environment by monitoring the OM system processes and restarting any failed processes. It performs this role in cooperation with database subsystem 72 and on the basis of process conventions used in the OM system. The supervisor 98 establishes communication links with the OM system processes, such as links 99, and then periodically queries status of the processes. If a process responds with an error status or fails to respond at all, the supervisor restarts the process. If any system process other than an interface process fails, the process itself then recovers its last saved process state from the database subsystem 72 and begins processing from that last state. In the case of a client interface process, in addition the supervisor indicates to the interface process to which client to connect. After recovering the saved state of that connection from the database, it reconnects to that client.

All processes in the OM system are structured for fault-recovery. First, all processes periodically save their state in the database subsystem 72. Second, the processes, other than interface processes, automatically assume that, upon being started, they are starting after a previous failure, and, accordingly, retrieve from the database saved process state and begin again with that state. An interface process, however, upon starting, is informed by the supervisor whether it is being restarted after a failure, in which case it also retrieves the saved process state from the database and begins again with that state as for other processes, or whether it is being started to serve a new client, in which case it begins from an initial state.

Concerning the intermediary in more detail, for recovery purposes, computation of an intermediated exchange is treated as a single operation, which either completes or fails as a unit. Therefore, database subsystem 72 stores sufficient state information, such as all input data, including order and order-correction messages, for an intermediary to be able to reconstruct its initial state just prior to commencement of an intermediated exchange. If the intermediary or an e-agent fails during the course of an intermediated exchange, all the e-agents and the intermediary are refreshed with the saved state information and the exchange restarted from the beginning upon operator command. Optionally, at operator discretion, an e-agent that failed during an exchange can be excluded from the restarted intermediated exchange. If an e-agent fails prior to an exchange, the intermediary can simply reinvoke the e-agent with its controlling portfolio and other order information. Also, the database stores information concerning the commodities exchanged immediately upon completion of an intermediated exchange. Therefore, if a system component fails during the reporting process after an exchange, the results of the exchange can be retrieved and the reporting process restarted.

Additionally, it is advantageous to test e-agents when they are submitted by participants from their client systems. Participants can submit parameters, rules, or entire e-agent programs which fail to correctly function. Failure of a single e-agent may lead to failure of an entire intermediated exchange. To avoid this possibility, the OM system should preferably test an e-agent for correct functions. This can be done by presenting each e-agent with a range of offers to verify that it does not fail and that it returns counter-offers satisfying the Agent Rule as discussed above. Unsatisfactory e-agents may be excluded from the intermediated exchange and their submitting participants notified.

Supervisor 98 is itself protected from failure by slave-supervisor 100. The slave-supervisor process maintains a copy of the state of the supervisor and monitors the supervisor by exchanging status messages. If the status messages indicate that supervisor 98 has failed, slave-supervisor 100 takes over the supervisor function of monitoring the other OM system processes and immediately starts a new slave-supervisor to monitor itself.

The database components of the OM system participate essentially in providing for a fault-tolerant system by storing copies of all input and output messages and records reflecting the up-to-the-moment state of all OM system processes. The database includes database software subsystem 72 together with storage means 97. Database subsystem 72 is preferably a relational database system, such as SYBASE version 11 supplied by SYBASE Inc. Storage means 97 preferably includes a mixture of solid-state and disk storage configured, as is known in the relevant art, for sufficient performance and reliability. Nightly tape backups are performed to protect from disk failures. In order to store copies of messages sent from participants to the OM system, database subsystem 72 establishes separate communication links to client system interface processes over which it receives these message copies. For example, database subsystem 72, has established connection 90 with the instance 86 of a general client interface. Additionally, the database establishes communication link 92 with the intermediary over which it receives results of each intermediated exchange promptly after exchange completion. If recovery is needed, as previously explained, copies of this data is supplied to the failing process in order to reestablish its state.

In the case of intermediated exchanges of financial commodities, in which stringent time limits must be met for reporting of exchange results, it is advantageous that these results be promptly committed in the database before reporting. To meet these performance requirements, these results are first stored as a large binary block of unformatted data representing these results. Upon committing the exchange results, client and public reporting can begin. During reporting, the unformatted binary block can then be extracted and formatted into a standard relational row and column format for final storage in the relational database. Typically, direct formatted storage in the database is too slow to meet equity reporting requirements.

The database performs certain other functions in the OM system. First, the data about exchange inputs and outputs can be used to tailor intermediary heuristics. As previously described, the intermediary makes use of certain heuristics to meet the joint exchange goals of the participants and the intermediary. By rerunning stored, historical intermediated exchanges with varied heuristics and comparing results, these heuristics can be tailored. The database subsystem provides such retrospective data. Second, the database receives certain intermediate data for an intermediated exchange, including commodity prices used during the intermediated exchange and information tracking the process of the intermediary and e-agent computations. Such tracking information is useful to improve the performance of these computations. The database also stores system configuration information. This information includes communication addresses of the OM computer(s) and software processes, as well as identities, addresses and authorizations of clients permitted to access the OM system. This information is made available to the OM system processes during execution and to operators for display and modification. Hardware and software modularity and configuration flexibility are maintained in order to allow easy addition of new clients and participants, new client types, new e-agent computational methods, new hardware machines, new communication pathways, and so forth.

Turning now to the exchange driver 73, it manages order, order-correction, and command messages received from the client systems directed to the intermediary 3, and also manages intermediated exchange results from the intermediary directed to the client systems. Therefore, first, exchange driver 73 receives input messages from its connections with the interface processes and forwards them over its single link 93 to the intermediary 3. After passing messages to the intermediary prior to an exchange, it waits for completion of the exchange. After the intermediated exchange completes, exchange driver 73 receives all the exchange results from the intermediary and distributes them appropriately. For each portfolio of each participant, it formats messages with the identifiers of the commodities exchanged, the amounts exchanged, and the exchange prices, and sends those messages to the interface process connected to that participant's client system. In order to distribute exchange results, the exchange driver can maintain information relating client identifiers with client interface network addresses. Also, the exchange driver receives commands directed to the intermediary, such as the command to prepare for an exchange and the command to initiate an exchange. Optionally, the exchange driver may periodically generate commands to initiate an exchange according to a schedule set by system operators, using the trading workstation interactive application. In the preferred embodiment, such commands originate from those trading work stations which have operator authority. The exchange driver also originates broadcast messages to the participants.

In the preferred implementation, each previously described software function of the order-manager system is implemented as a system process that may be multi-threaded. Each such process is executed on one of one or more computers. Communication connections between processes are implemented either within a computer for collocated processes, or, alternatively, over network interconnections between the OM system computers for remotely located processes. Preferably, all communication interconnections are managed according to a common network protocol. The number and capability of OM system computers and the arrangement and the capacity of network interconnections among these computers are chosen according to methods known in the system arts in order to achieve desired performance and throughput targets. In particular, since financial situations are increasingly fluid, it is preferable that an intermediated exchange of financial commodities be completed as fast as is reasonably possible after the command to initiate the exchange is received, e.g., preferably within 5–10 seconds. Therefore, the computers on which the intermediary and the e-agents are hosted are preferably capable of significant integer and floating-point numerical computations. Preferred computers for intermediary and e-agent functions are Sun UltraSparc work stations model 2, or equivalent computers of equal or greater capacity. These computers run the SunOS operating system and associated operating system components, for example communication drivers. They are interconnected by LANs, preferably an ethernet LAN operating at 100 mega-bps. The preferred network protocol is IP with TCP for managing interprocess sessions.

In more detail, for equities, an intermediated exchange must be completed and publicly reported within 90 secs. This requirement follows from National Association of Securities Dealers ("NASD") regulations which require that all trades of an equity at its most recent price be reported within 90 secs. Since the intermediated exchange, according to the preferred embodiment, commences by obtaining the up-to-the-moment prices of financial commodities to be exchanged, it must complete and report the trade within the 90 sec. window required by NASD. Preferably, the prices actually used are the most recent quote mid-spread prices, that is the average of the most recent bid and most recent asked prices. Further, since transmission time of input prices and output results can require from 15 to 30 secs., the actual intermediated exchange computation for equities must compute within 60 to 75 secs., at most. Given the method of intermediated exchange computation, necessary computers are chosen to have the capability to perform the necessary computation within approximately 1 minute or less. Further, the method of intermediated computation, itself, is chosen so that it is possible to meet this requirement. For example, the rounding heuristic for accommodating integer constraints provides computational simplicity in order to meet this NASD window. Also, the current demand heuristic provides sufficiently rapid convergence.

Other order-manager system architectures can be used. For example, in an alternative in order to improve intermediary reliability by limiting external access, the ticker plant price server can be linked to the exchange driver instead of to the intermediary. Similarly, the tape reporting external interface can be linked to the exchange driver. In a different embodiment, the intermediary and the exchange driver may be combined into one process; the intermediary may establish direct connections with client interfaces in order to obtain orders and return exchange results. Also, as noted, the intermediary machine 74 can be implemented using several machines. In this case, the system configuration component of database 72 would contain the addresses and communication links between such machines, as well as the machine for each e-agent of each particular participant.

5.3.2. Intermediary Message Protocol and Process Structure

The functions hosted on the intermediary machine(s) are described in detail in this subsection. Described first are the preferred implementation, the general functions, and the message protocol of the intermediary and e-agents. Described second are the processes according to which the intermediary and e-agents function.

FIG. 6 illustrates in more detail an implementation of the intermediary machine(s) 74 of FIG. 5. The intermediary machine or machines generally hosts intermediary process 3 and e-agent processes 1. Optionally, an exchange with only limited clients has no e-agent processes. The intermediary machine is preferably a plurality of machines connected by a communication network, such as a LAN with the system processes distributed across the machines in order to equalize processing load and thereby achieve increased performance, as is known in the art. Further, as previously described, certain e-agent processes can be located remotely from the OM system, being hosted on machines controlled by particular participants and connected to the intermediary by telecommunication links. Alternatively, where one machine has a sufficient computing capacity to meet the computing demands of all these processes, they are collocated on that single machine for reduced communication overhead. Such a single machine can be either a very capable uni-processor or a multi-processor. In the latter case, the same software architecture can be used with each e-agent assigned to its own processor. An alternative architecture for a multi-processor machine implements the intermediary and the e-agents as separate threads of a single process. A further alternative for a very capable uni-processor implements the intermediary and the e-agents as parts of one single-threaded program linked by procedure calls.

As further illustrated in FIG. 6, intermediary process 3 includes three principal functions: allocation function 114, local data area function 113, and communications interface function 112. Allocation function 114 performs the actual computations necessary to generate offers to e-agents according to the preferred protocols for intermediated exchange. In the preferred embodiment, and especially for financial commodities, this computation is performed according to the methods of Section 5.2.2, which depends on the solution of a mixed integer-quadratic numerical optimization problem limited by described constraints. This problem can be solved by methods known in the art and available as software packages from commercial suppliers as discussed before.

Local data area function 113 is responsible for storing and retrieving most shared data used by the intermediary. It includes functions or methods to store and retrieve shared data objects, thereby providing an interface between communications interface function 112 and allocation function 114. Before the commencement of an exchange, the communication interface stores in the local data area, information generally necessary for an intermediated exchange, such as up-to-the-moment commodity prices. Also stored in the local data area 113 are the exchange requirements and objectives of certain limited function clients, such as list clients. These exchange requirements include their portfolio order and correction messages and any constraint requirements, such as dollar imbalance or tiering constraints. After an exchange, the communications interface 112 distributes the exchange results, which have been stored in local data area function 113 by the allocation function 114, to database 72, to exchange driver 73, and to tape reporting service 77. First, the exchange results, stored in an unformatted binary representation in the local data area, are quickly committed in the database in this binary form. These unformatted results are intelligible to the intermediary but are not formatted into database fields. After database commitment, the results are distributed to the other elements, optionally being translated into text form. For certain client interactive software that is capable of formatting the binary results no text translation is necessary. When recovering from a failure during exchange reporting after a completed exchange, the just completed exchange results are retrieved into local data area function 113 from database function 72 in order to restart the reporting process.

During the actual intermediated exchange, allocation function 114 first retrieves the previously described stored data, and constructs an in-memory representation of the mathematical programming ("MP") optimization problem that is solved to generate intermediary offers. To generate an offer, the intermediary passes this representation to MP library routines, which actually solve the optimization problem. The solution result is then updated in local data area function 113, in order that the exchange results are immediately available for distribution in case the e-agents accept the intermediary offers. If they do not accept their offers, the in-memory structures are updated with the e-agent counter-offers and the next round of the electronic negotiation proceeds. The in-memory MP representation is constructed in two phases in order that the intermediary is not committed to any particular set of MP library routines. In a first phase a general representation of the problem is constructed. In a second phase, a specific representation is constructed directed to the particular library routines currently used. For example, in the preferred case of using CPLEX™ derived library routines, this second phase constructs a representation adapted to use by the CPLEX™ routines.

Finally, communications interface function 112 provides functions for all external communications needed by intermediary 3. Therefore, it communicates with exchange driver 73, which in turn communicates with all instances of client system interfaces in the OM system, with the database 72 for reporting and recovery purposes, with the ticker plant 101 for obtaining price information, and with tape reporting service 77 for publicly reporting results of an intermediated exchange. During normal exchange processing, the communications interface function 112 receives input data from the exchange driver 73, which it distributes as appropriate to the local data area 113 or the allocation function 114. During recovery processing, the communications interface function 112 retrieves data from the database function 72 either to be prepared to execute an exchange following a system failure that occurred while not running the actual intermediated exchange, to restart an intermediated exchange following a failure of the actual exchange, or to restart the reporting process.

The intermediary is preferably implemented as a single process constructed from the three functional modules described. In summary, the communications interface handles all inter-process communication of the intermediary. The local data area separates the handling of the complex data required by the intermediary from the other intermediary functions. For sufficient performance, all this local data is kept in actual machine memory. Finally, the allocation function computes the actual intermediated exchange. These functional modules communicate by method or procedure calls.

The preferred implementation of the intermediary 3 and of e-agents 1 uses object-based technology. According to such an implementation each of the principle intermediary functions is an instance of an object containing private data and presenting methods necessary to carry out the particular functions required. In a preferred object-oriented implementation, messages between intermediary functions on communication links 121 and between the intermediary and e-agents 1 across communication links 120 contain data for invoking methods presented by these objects. For example, the local data area function 113 maintains intermediary data shared among the principal functions and presents methods to store and retrieve this data, among others. The communications interface function 112 presents methods to communicate with the described externally connected processes, among others. The allocation function 114 presents a single method to run an intermediated exchange, which performs offer generation for each negotiation stage of an exchange and places the offer results in the local data area. The preferred language for such an implementation is C++.

In particular, the numerical optimization calculations required by the allocation function 114 constructed according to the preferred embodiment, can be inherited from computational classes built from commercially available numerical optimization packages suitable for solving mixed integer or quadratic programming problems. A preferred such package is CPLEX™ from CPLEX optimization, Inc. (Incline Village, Nev.). These inherited computational functions are preferably multi-threaded and therefore, capable of executing in parallel on a multi-processor computer system for improved response time. Such a multi-processor computer can be either a shared-memory or a message-passing multi-processor system as are currently commercially available.

A less preferred implementation of the functions of the intermediary 3 and e-agents 1 is according to any programming technology which provides for process and function coordination by message passing, while not necessarily providing for encapsulation or inheritance.

To improve performance, any implementation of the intermediary and the e-agents should keep as much data as possible in memory. At least the data stored in the local data area as well as any data needed by the MP optimization calculations should be memory-resident. Further, it is preferable that an OM system, together with its client systems and their particular client interactive software, keep all the data for a particular intermediated exchange in memory. This provides for rapid computation of an exchange and for rapid reporting of exchange results.

Before turning to a detailed description of the message flow in the intermediary machine(s) of the order-manager system, optimization of this message flow in order to take advantage of certain properties of limited, or list, clients or participants is discussed. Intermediated exchanges with certain limited clients can be treated separately from the exchanges with more general clients in order to decrease computational requirements and increase performance. Such special clients are those which have strategies that accept all offered commodities that are within specified basic constraints, if any. Among such clients are those participants that have selected the previously described list completion strategy.

On the other hand, exchange definitions for more general clients are forwarded to e-agents, which perform the intermediated exchange for these participants. Alternatively, all clients can be treated similarly with their own e-agents, even such special, or list, clients.

Figure 7:
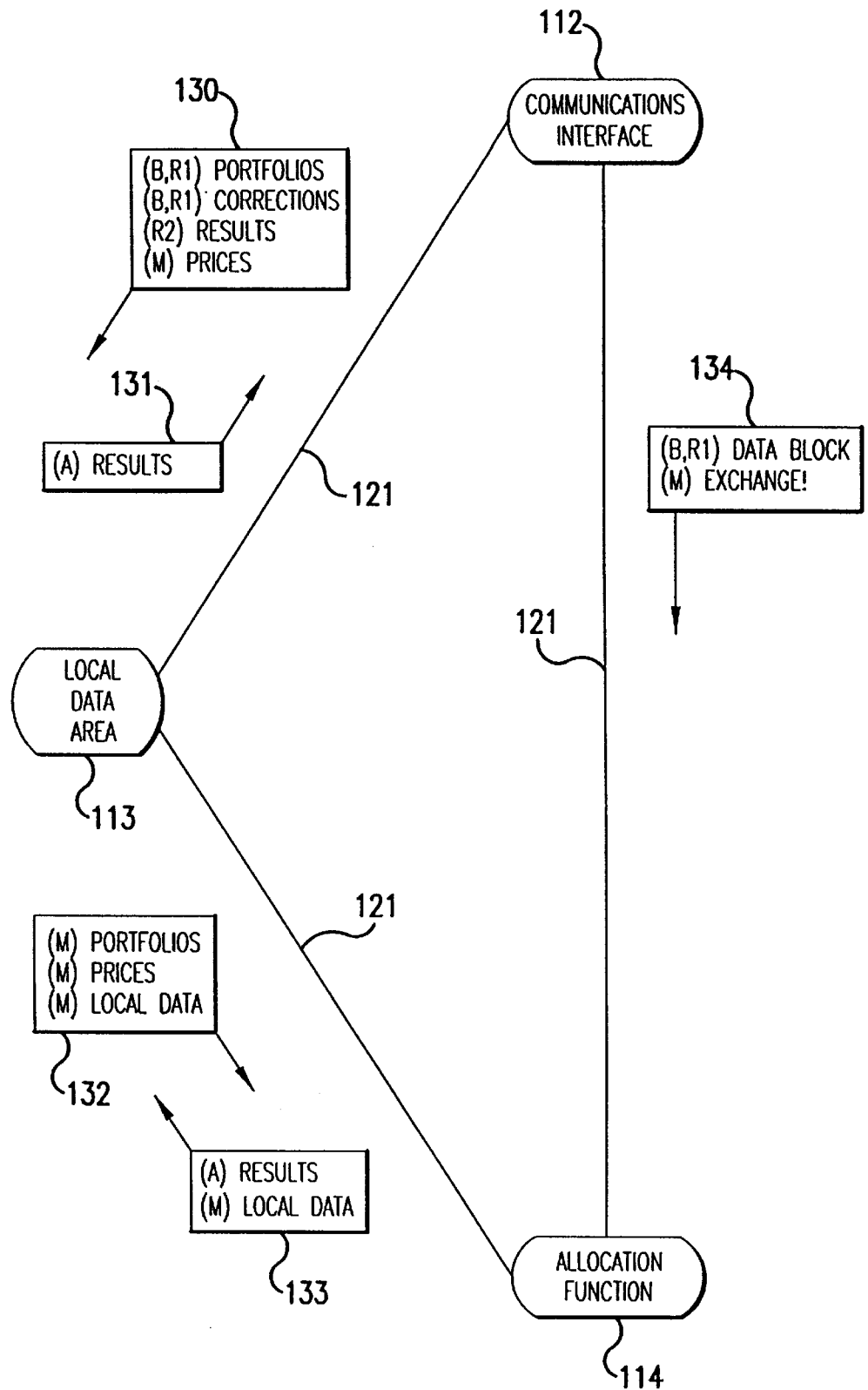
Figure 8:
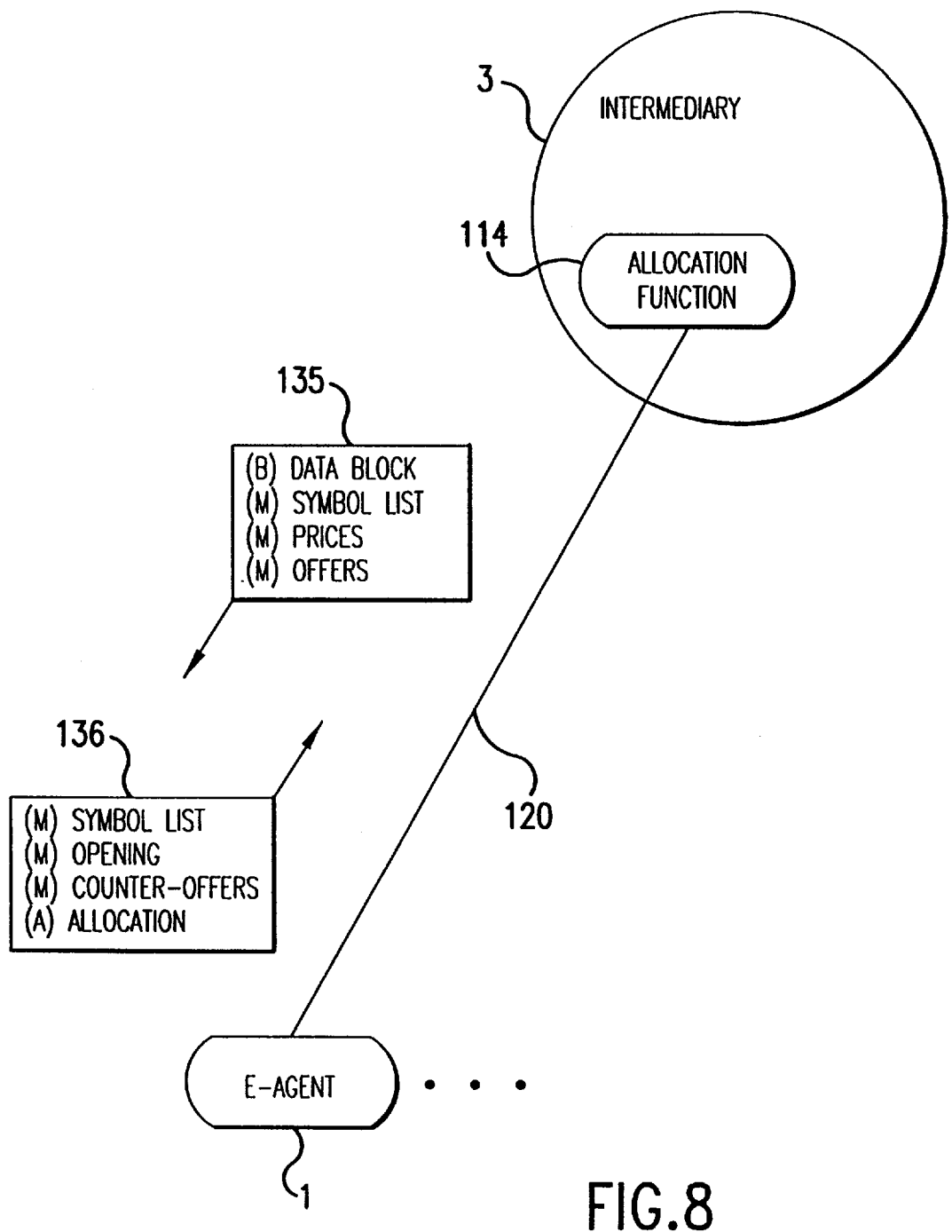

FIGS. 7, 8, and 11 illustrate message flow internal to intermediary 3, between its principal functions, and also external to the intermediary, with its linked processes. These figures adopt the following conventions. Messages exchanged between two components or processes in one direction are illustrated in one block of messages. The transmission time of each message in a block with respect to an intermediated exchange is indicated by a parenthesized code that precedes the message. This code uses the following abbreviations: "B" denotes messages passed before commencement of an exchange; "M" denotes messages passed during an exchange; "A" denotes messages passed after an exchange; "R1" denotes messages for recovery of exchange failures; and "R2" denotes messages for recovery of reporting failures.

Now with respect to FIG. 11, the messages exchanged between communications interface 112 of the intermediary 3 and connected external processes are as follows. Before an intermediated exchange, the exchange driver 73 sends to the communications interface 112 messages of the types indicated in block 200, including: portfolio messages, extended data block messages, correction messages, and commands from system operators. In more detail, portfolio messages include the list of financial commodities, perhaps by trading symbol or CUSIP number, along with the maximum amounts to buy or sell. In addition, these messages indicate certain parameterized constraints, such as minimum exchange amount, cash imbalance, and tiering constraints. Such information, preferably packaged as a single message, is needed for all clients, but is adequate to completely describe only the limited clients which are processed in the previously described optimized fashion. For general clients, extended data block messages are sent which include parameters sufficient to describe the general strategies and constraints according to, for example, the exemplary methods for counter-offer generation described in Section 5.2.1. In a preferred implementation for general clients, this extended information is packaged together with portfolio information in a single message. Alternatively, it can be packaged as a plurality of separate messages. The communications interface accepts correction messages, which correct or alter any exchange parameter for any client prior to commencement of an exchange. For general clients, it is preferred that a correction message replace all previously supplied parameters with new parameters, whether or not changed. Finally, commands from system operators can query the state of intermediary 3 or initiate an intermediated exchange. An exemplary exchange initiation command is represented by "Exchange!". The communications interface function 112 returns validation and exchange result messages to the exchange driver 73, as indicated in block 201. Receipt of all the input messages is acknowledged in a validation message. Also, after completion of an intermediated exchange, communications interface function 112 retrieves exchange results from the local data area and distributes them to the exchange driver 73 and tape reporting process 77. To the exchange driver, the exchange results are distributed grouped by client or participant in a form adapted to further distribution to clients across the client interface processes.

Just before commencement of an intermediated exchange, communications interface function 112 requests the most current price data from ticker plant 101 for the commodities participating in the exchange and receives the prices in a message indicated in block 203. The identity of participating commodities is determined by the allocation function 114, as is described subsequently. After completion of an exchange, the communications interface returns exchange results to the tape reporting service 77 as indicated in block 202. The results are distributed as a list of exchanges by commodity in form adapted to the particular reporting service.

Finally, the communication interface sends to the database function 72, an exchange results message as indicated by block 205. These results are sent in a compact binary format for rapid storage. If recovery is needed, processes restarted by the supervisor request check-pointed state information sufficient to restart their processing. Messages containing this state information are indicated by the messages in block 204. For example, to recover from failures after commencement but before completion of an intermediated exchange, the communications interface retrieves all input data necessary to an exchange, such as copies of portfolios, general client data blocks, corrections, and so forth. When this data is restored, intermediary 3 waits for an operator command to restart an exchange. To recover from failures after a final exchange is completed, the compact binary form results of the just completed exchange are sent from the database 72 and report distribution restarted using these retrieved results.

FIG. 7 illustrates the messages exchanged between each pair of principal internal components of the intermediary 3 of FIG. 6. This figure illustrates an embodiment that is optimized to specially treat limited, or list, clients, which require one, or at most a small predetermined number of, rounds of negotiation according to the preferred protocol. Further, in a preferred object-based implementation, each message type illustrated in FIG. 7 is sent by invoking methods in the object instance representing the receiving function. Message types in block 130 are sent from the communications interface 112 to the local data area 113 at the indicated times. Thus, prior to an exchange, portfolio and constraint messages, and corrections to these messages, for those limited clients with the previously described optimized processing, are sent to the local data area. At the commencement of an exchange, the communications interface also sends prices for the commodities to be exchanged to the local data area. Since the local data area preferably stores most shared data needed by the intermediary, additional types of such data as required are forwarded from the communications interface for storage in the local data area. Also, as indicated in block 130, for recovery of the failure of an exchange, the communications interface re-sends these portfolio messages to the local data area, and for recovery of the failure of reporting, the communications interface retrieves the results of the immediately previous exchange and sends them to the local data area 113. As indicated in message block 131, after an intermediated exchange, the local data area 113 returns the results of the exchange to communications interface 112 for distribution.

The message types in block 134 are sent from the communications interface 112 to the allocation function 114. Thus, prior to an exchange, and for recovery during exchange failure, the communications interface 112 sends to the allocation function 114 those messages defining the exchange requirements and objectives of general clients. Such messages include at least extended data block messages and, also, portfolio messages, where several messages are used to define a general client. When the allocation function receives messages defining a general client portfolio, it starts an e-agent program of the processing type defined by the model used by the client on the appropriate computer and the defining data is passed to it. For example, in the case of financial commodities, it is preferred that the e-agent process offers according to mean-variance portfolio methods, as described in Section 5.2.1. In this case, the information defining the e-agent can include one or more of the variables listed in Table 3. Alternatively, the e-agent can process according to procedural rules, and the defining information is a representation of these rules. Additionally, communications interface 112 passes to allocation function 114 relevant operator commands, such as the command Exchange! for initiating an intermediated exchange. Since shared data is preferably communicated through the local data area 113, the allocation function returns no messages directly to the communication interface. In an alternative embodiment, the communications interface can communicate directly with the e-agents, in which case it passes only commands directly to the allocation function.

Message types indicated in blocks 132 and 133, respectively, are sent between the allocation function and the local data area. Thus, at the commencement of an intermediated exchange, the allocation function 114 retrieves up-to-the-moment commodity price data from the local data area 113, both for its use and for forwarding to the e-agents. The allocation function also fetches all data from the local data necessary for it to build an in-memory representation of its mathematical programming problem for offer generation. During the protocol of an intermediated exchange, the local data area and allocation function exchange such shared local data as is necessary for the computations performed by the allocation function's. Also portfolio and constraint data is provided to the allocation function from the local data area for those limited clients whose counter-offers are generated directly by the allocation function. Finally, when an exchange is completed, exchange results are returned to the local data area for storage before further distribution.

FIG. 8 illustrates the messages exchanged between the e-agent 1 and the allocation function 114 of intermediary 3 across link 120. Message types in block 135 are sent from the allocation function to the e-agent, and message types in block 136 are returned from the e-agent. In general, an e-agent responds to messages from the intermediary and does not independently generating messages to an intermediary. E-agents respond to at least two general types of messages from the intermediary, queries for an initial e-agent opening message and queries for e-agent counter-offer messages to previous intermediary offers. At the commencement of an intermediated exchange, the intermediary queries the e-agents for their initial openings. In response, each e-agent specifies the maximum amount of each commodity that it is interested in buying or selling in this intermediated exchange. Optionally, an e-agent can preserve the flexibility to be either a buyer or a seller of a particular commodity, depending on the course of the intermediated exchange, by specifying both a maximum amount to buy and a maximum amount to sell in the initial opening message. During the course of the preferred protocol of an intermediated exchange, an e-agent responds to an offer from the intermediary with a counter-offer. The counter-offer specifies the amounts of each commodity from the offer that the agent is interested in buying or selling at this round of the negotiation. An e-agent may not counter-offer to buy or sell more than the intermediary offered in the immediately preceding offer message. Optionally, the e-agent can simultaneously offer to buy and sell the same commodity. The only limitation on e-agent generation of counter-offers is given by the preferred protocol for intermediated exchange as previously discussed.

In more detail, before an intermediated exchange, allocation function 114 passes extended data blocks and other messages defining the exchange requirements and objectives of a particular participant to the associated e-agent. In an alternative implementation, the allocation function can also invoke e-agents for limited clients, such as for list clients. In this case, all client definitions and objectives are represented by appropriate e-agents and all portfolios, constraints, and objectives are sent to e-agents. Also before an intermediated exchange, an e-agent can be tested by the intermediary sending one or more pairs of offers, followed by a query for the e-agent's counter-offer. Such testing can minimize the chances of admitting a failure-prone e-agent to an exchange.

Next, at the commencement of an intermediated exchange, the allocation function forwards up-to-the-moment price data to e-agents. Possibly in view of this price data, each e-agent determines the financial commodities, described by symbols or CUSIP numbers, which it is interested in trading in this exchange and sends this information to the intermediary. The intermediary then transmits to the e-agent those commodities that are to be actually exchanged in the current exchange, that is those commodities which have at least one e-agent interested in buying and at least one other e-agent interested in selling. The e-agents next transmit their opening messages, which are lists of the commodities together with maximum amounts that the e-agent is interested in exchanging. Alternatively, e-agents can transmit only opening messages that have both commodities of interest and the upper bounds.

During the intermediated exchange, allocation function 114 and e-agents 1 exchange offers and counter-offers according to the preferred protocol for intermediated exchanges. Optionally, during an intermediated exchange, an e-agent can transmit to the allocation function certain data reflecting the process of its counter-offer generation, in order that its participant can be assured of its proper functioning and improve future functioning. After an intermediated exchange completes, certain e-agents return an allocation message to allocation function 114. Such e-agents represent participants that exchange multiple separate portfolios, general or limited, according to the same requirements and objectives. In this case, one e-agent performs the intermediated exchange for a portfolio combined from these multiple separate portfolios, and on completion of the exchange, returns to the intermediary the allocation of its final accepted offer among the multiple separate portfolios which it is managing.

E-agents are implemented in a manner similar to that of the intermediary, and, especially, similar to that of the allocation function of the intermediary. Thus, preferably, e-agents are implemented with an object-oriented methodology, for example in C++. They include methods invoked by the allocation function for sending and receiving the described messages. For financial commodities selected according to mean-variance portfolio methods, the e-agents preferably employ commercially available computational packages in a manner similar to the allocation function. These methods of such packages are capable of solving the constrained linear, quadratic, continuous, or mixed-integer optimization problems in order to compute counter-offers. Further, they construct in-memory representation of their mathematical programming problems in a manner similar to that of the intermediary.

Figure 9:
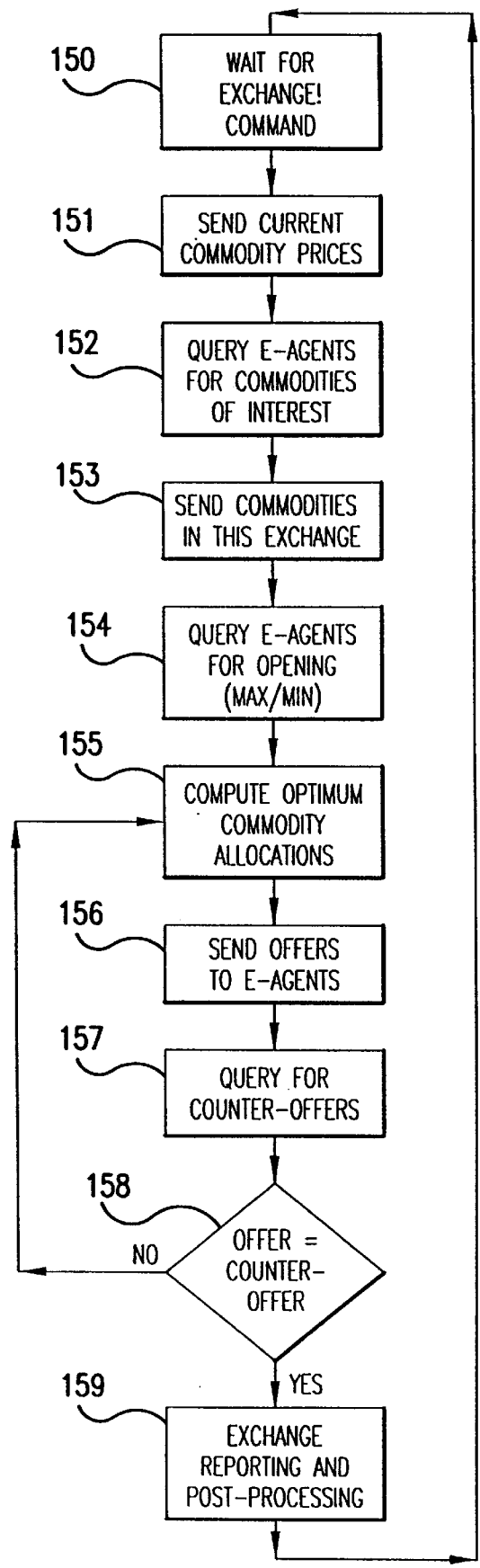
FIG. 9 is a flow chart of a process for an e-agent used in the intermediary machine of FIG. 6.

Next, the processes which implement the message exchanges of an intermediated exchange are described in more detail, first with respect to the intermediary and second with respect to the e-agent. FIG. 9 illustrates an embodiment of the process of the allocation function of the intermediary. In general, the allocation function waits at step 150 for the "Exchange!" command before beginning an intermediated exchange. Next, at steps 151–154, it performs various initialization actions for the intermediated exchange. At steps 155–158, the allocation function performs the intermediated exchange negotiation according to the preferred protocol. Finally, at step 159 end-of-exchange post-processing is performed, and the allocation function returns to wait for another Exchange! command.

In more detail, after receiving the Exchange! command, the intermediary requests up-to-the-moment asset prices and sends them to connected e-agents at step 151. The e-agents determine the financial commodities of interest for this exchange in view of these prices, and return a list of the commodities of interest upon query by the intermediary at step 152. At step 153, the intermediary determines those commodities that can be exchanged in this intermediated exchange and sends that list to the connected e-agents. The commodities that can be exchanged are those for which at least one e-agent has indicated an interest in buying and at least one other e-agent has indicated an interest in selling. Using the list of commodities that can actually be exchanged, the allocation function and the e-agents update, respectively, their offer and counter-offer computation methods to consider only those commodities that can actually be exchanged. Thereby, commodities that are not to be exchanged are ignored in these computations, and computational demands are decreased. Next at step 154, the exchange negotiation begins when the intermediary queries the e-agents for the commodities of interest along with the maximum, and optionally minimum, amounts to be exchanged. Alternatively, these initialization steps can proceed in different orders which have similar effects. For example, step 152 can be combined with step 154 so that the intermediary determines the commodities to be actually exchanged from the e-agents' opening messages. Also, the intermediary can delay making prices available to the e-agents until after receiving the e-agents' opening messages at step 154.

Next, at steps 155–158, the exchange negotiation is performed. At step 155, the intermediary generates offers to all clients by, preferably, allocating the maximum amount of commodities for exchange in a fair manner. For financial commodities, this is preferably performed according to the methods described in section 5.2.2. Offer determination is optimized within the constraints on the amounts to be exchanged according to the current round of negotiation according to the preferred protocol, together with any tiering, cash imbalance, or other constraints of the limited clients which are specially processed during the intermediary offer generation. During this optimization, offer amounts not meeting clients' minimum exchange requirements are set to zero, and the excess is reallocated optimally among the other clients. The commodity amounts in the computed offers are rounded to round-lots, and any rounding excess is fairly allocated among the e-agents exchanging this commodity, according to the previously described method. At step 156, the generated and rounded offers are then sent to the e-agents representing general clients. Offers for limited clients, such as list clients, can be automatically accepted by the intermediary, since they necessarily fall within the constraint bounds of these clients, which, in fact, constrained the intermediary's offer generation at step 155. At step 157, the allocation function receives from the e-agents their counter-offer amounts selected from the preceding offer amounts. If all the counter-offer amounts equal the preceding offer amounts, test 159 terminates the intermediated exchange. If any counter-offer amount does not equal its preceding offer amount, then the allocation function returned to step 155 to compute new offers for all the clients.

After the intermediated exchange completes at step 158, step 159 performs certain post-processing. First, those e-agents representing multiple portfolios with identical requirements and objectives send to the intermediary their allocations among their managed portfolios. Then, the allocation function sends to the local data area the intermediated exchange results in the format of one binary data block. As described, the communication interface function then distributes these exchange results to the individual clients, to the tape reporting service, to administrative systems, and to the database. The allocation function then returns to step 150 to wait for a command signalling commencement of the next intermediated exchange.

Figure 10:
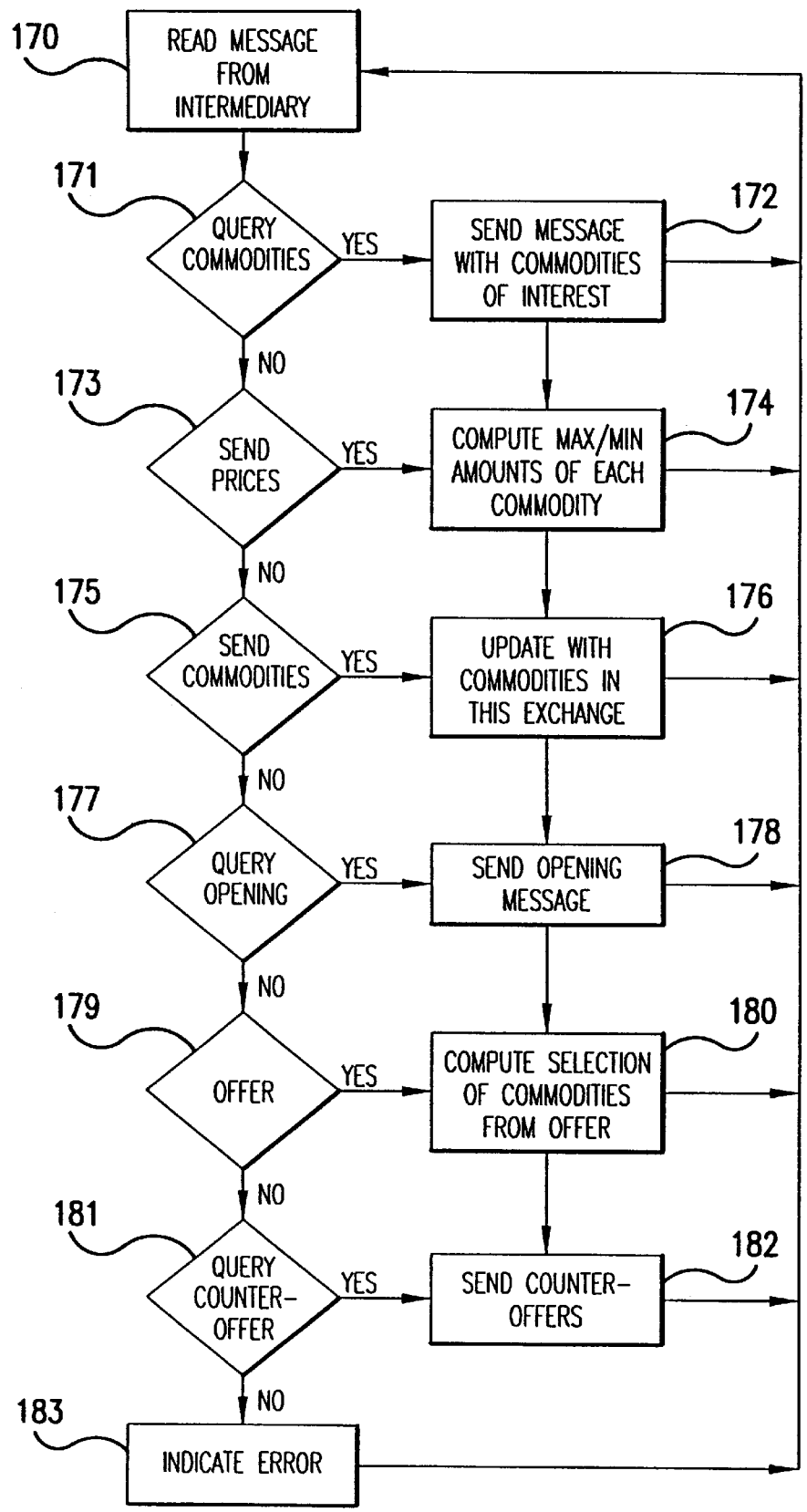
FIG. 10 is a flow chart of a process for an intermediary machine of FIG. 6.

FIG. 10 illustrates a process for the e-agents of this invention. Preferably, in general, an e-agent is a slave of the intermediary, waiting for messages from the intermediary and responding appropriately to each received message. Therefore, at step 170, an e-agent waits for and reads the next message from the intermediary. At steps 171, 173, 175, 177, 179, and 181 the e-agent tests a received message for the various recognized message types, and performs processing appropriate to each recognized message type. If an unrecognized message type is received, step 183 indicates this error and performs appropriate processing, which optionally can include causing this intermediated exchange to fail and exchange recovery to be entered.

Turning now to the detailed message types recognized, if an e-agent receives a query assets message, at step 172 it returns a message to the intermediary with a list of the commodities of interest in this exchange. When an e-agent receives a prices message from the intermediary, at step 174 it computes the maximum and minimum amounts of each commodity that it is interested in trading in this exchange. When an e-agent receives a "send commodity" message, at step 176 it updates its counter-offer computation methods with the commodities to be actually exchanged. Thereby, commodities in which it was interested but which are not to be exchanged are not considered in future computations. This increases the efficiency of e-agent counter-offer computation. When an e-agent receives a query opening message, at step 178 it sends the opening message of the preferred negotiation protocol described above. This message includes the assets of interest together with their maximum and minimum amounts, these limits having been computed at step 174. Steps 171–178 perform e-agent initialization for this particular intermediated exchange. As described for the intermediary, these steps may be altered or combined in various fashions corresponding with similar alternatives for the intermediary. Finally, when an e-agent receives an offer message, at step 180 it computes its selection, which is preferably optimized, from the commodity amounts offered, which it returns when queried. When an e-agent receives a query counter-offer message, at step 182 it returns to the intermediary these counter-offered commodity amounts.

Preliminary to the process illustrated in FIG. 10, the e-agent has been invoked and provided with the extended data and, optionally, portfolio data, necessary to define the detailed processing in the illustrated steps.

Programs for the intermediary and the e-agent, both in a human readable form and a machine readable form capable of causing a computer to execute these programs, can be recorded on any convenient computer readable medium. Such mediums include magnetic discs, both hard discs and floppy discs, on optical discs, such as CD-ROM discs, on magnetic tape, and so forth.

6. SPECIFIC EMBODIMENTS, CITATION OF REFERENCES

The present invention is not to be limited in scope by the specific embodiments described herein. Indeed, various modifications of the invention in addition to those described herein will become apparent to those skilled in the art from the foregoing description and accompanying figures. Such modifications are intended to fall within the scope of the appended claims.

Various publications are cited herein, the disclosures of which are incorporated by reference in their entireties.

What is claimed is:

1. A computer system for electronic intermediated exchange of a plurality of commodities among a plurality of participants comprising:

a. one or more computer-based machines;

b. a plurality of electronic agent (e-agent) computer programs running on at least one of said computer-based machines, wherein each said participant is associated with at least one of said e-agent computer programs, and each said e-agent computer program stores in an electronic memory digital data representing commodity exchange objectives of its associated participant; and c. an electronic intermediary computer program running on at least one of said computer-based machines, wherein said intermediary computer program stores in an associated electronic memory digital data representing commodity exchange objectives of the intermediated exchange and exchanges electronic offer and electronic counter-offer messages with said e-agent computer programs;

wherein (i) said e-agent computer programs receive said electronic offer messages from said intermediary computer program, generate said electronic counter-offer messages according to said exchange objectives of said associated participants, and send said electronic counter-offer messages to said intermediary computer program, and (ii) said intermediary computer program receives said electronic counter-offer messages from said e-agent computer programs, generates said electronic offer messages according to said exchange objectives of said intermediated exchange, and sends said electronic offer messages to said e-agent computer programs.

2. The computer system of claim 1 wherein said commodities are intangible commodities.

3. The computer system of claim 1 wherein said exchange of electronic messages between said intermediary computer program and said e-agent computer programs converges to an exchange of said commodities, that is substantially satisfactory both to said e-agent computer programs, according to said digital data representing said commodity exchange objectives of said participants, and also to the intermediary computer program, according to said digital data representing commodity exchange objectives of the intermediated exchange.

4. The computer system of claim 1 wherein said electronic offer messages contain digital data representing the amounts of said commodities that said intermediary computer program offers to said e-agent computer programs, and wherein said electronic counter-offer messages contain digital data representing the amounts of said commodities that said e-agent computer programs accept from said intermediary computer program.

5. The computer system of claim 4 wherein said exchange of electronic messages terminates when said e-agent computer programs generate electronic counter-offer messages accepting all the amounts of commodities offered in the immediately preceding electronic offer messages received from said intermediary computer program.

6. The computer system of claim 4 wherein said e-agent computer programs generate electronic counter-offer messages accepting amounts of commodities that are less than or equal to the amounts offered in one or more of the preceding electronic offer messages received from said intermediary computer program.

7. The computer system of claim 6 wherein said one or more preceding intermediary computer program electronic offer messages is the immediately preceding electronic offer message.

8. The computer system of claim 4 wherein the e-agent computer programs and the intermediary computer program exchange messages according to sequential rounds of an electronic negotiation, each round of said negotiation comprising said intermediary computer program sending electronic offer messages to said e-agent computer programs followed by said e-agent computer programs sending electronic counter-offer messages to said intermediary computer program.

9. The computer system of claim 8 wherein said electronic memory associated with said intermediary computer program further stores digital data representing a plurality of current and preceding bounds, each said current bound representing the maximum amount of a particular commodity that can be offered to a particular e-agent computer program in a current round of said electronic negotiation and each said preceding bound being a current bound from a preceding round of said electronic negotiation, and wherein said intermediary computer program generates electronic offer messages offering amounts of commodities less than or equal to the appropriate one of said current bounds.

10. The computer system of claim 9 wherein said plurality of current bounds depends at least on commodity amounts in said intermediary electronic offer messages, said e-agent electronic counter-offer messages, and said preceding bounds from one or more preceding rounds of said electronic negotiation.

11. The computer system of claim 10 wherein said one or more preceding rounds of said electronic negotiation is the immediately preceding round of said electronic negotiation.

12. The computer system of claim 9 wherein said plurality of current bounds depends at least on commodity amounts in said e-agent electronic counter-offer messages and on the preceding bounds from the immediately preceding round of said electronic negotiation.

13. The computer system of claim 12 wherein said electronic memory associated with said intermediary computer program further stores digital data representing a selected round of said electronic negotiation, wherein before said selected round of negotiation said plurality of current bounds are selected to be between commodity amounts in said e-agent electronic counter-offer messages and said preceding bounds of the immediately preceding round of said electronic negotiation, and wherein after said selected round of negotiation the plurality of current bounds are selected to be equal to e-agent electronic counter-offer messages of the immediately preceding round of said electronic negotiation.

14. The computer system of claim 13 wherein before said selected round of negotiation said plurality of current bounds are selected to be substantially a weighted average of the commodity amounts in said e-agent electronic counter-offer messages and said preceding bounds of the immediately preceding round of said electronic negotiation.

15. The computer system of claim 1 wherein said e-agent computer programs further send electronic opening messages to said intermediary computer program before said exchange of electronic offer and counter-offer messages, each said electronic opening message including digital data representing maximum amounts of commodities each participant will exchange in said intermediated exchange.

16. The computer system of claim 1 wherein said electronic memory associated with said intermediary computer program further stores digital data representing a plurality of bounds on selling or buying of each commodity by each e-agent computer program, and wherein said commodity exchange objectives of said intermediary computer program comprise that a substantially maximized amount of commodities are exchanged in said intermediated exchange subject to constraints (i) that for each said commodity the total amount sold equals the total amount bought by all said e-agent computer programs, and (ii) that for each commodity the amount sold or bought by each e-agent computer program is less than the appropriate one of said bounds.

17. The computer system of claim 16 wherein said commodity exchange objectives of said intermediary computer program further comprise that a measure of the unfairness of the share of commodities offered to each e-agent computer program is substantially minimized.

18. The computer system of claim 17 wherein said measure of unfairness increases substantially as the share of commodities offered to each e-agent computer program differs from a pro-rata share.

19. The computer system of claim 18 wherein said measure of unfairness increases substantially as the square of the difference of the share of commodities offered to each e-agent computer program differs from a pro-rata share.

20. The computer system of claim 18 wherein said pro-rata share for a commodity for an e-agent computer program depends at least on the ratio of said bounds for that commodity for that e-agent computer program to the sum of the bounds for that commodity for all the e-agent computer programs.

21. The computer system of claim 18 wherein said measure of unfairness includes a plurality of adjustable factors, each factor associated with an e-agent computer program and for adjusting the rate of increase of said measure of unfairness as the share of commodities offered to an e-agent computer program differs from a pro-rata share.

22. The computer system of claim 1 wherein said electronic offer messages contain digital data representing the amounts of commodities offered to said e-agent computer programs, and wherein said intermediary computer program generates said commodity amounts for said electronic offer messages by substantially maximizing the value of a utility function of said amounts of commodities subject to e-agents constraints.

23. The computer system of claim 22 wherein said utility function comprises a difference of a first terms and a second term, said first term representing the total amount of all commodities offered to said e-agent computer programs and said second term representing the unfairness of the share of commodities offered to said e-agent computer programs.

24. The computer system of claim 22 wherein one or more non-linear terms in said utility function is approximated by a plurality of piece-wise linear terms.

25. The computer system of claim 22 wherein said commodities are exchanged in whole commercial units, and wherein any fractional commercial units generated by substantially maximizing the value of said utility function are reallocated among said e-agent computer programs in a substantially fair manner, whereby only whole commercial units of commodities are actually offered.

26. The computer system of claim 1 wherein said electronic counter-offer messages contain digital data representing the amounts of said commodities that said e-agent computer programs accept from said intermediary computer program, and wherein at least one of said e-agent computer programs generates electronic counter-offer messages by accepting all commodity amounts previously offered by said intermediary computer program and limited by pre-specified maximum commodity exchange bounds and by optional constraints.

27. The computer system of claim 1 wherein said electronic counter-offer messages contain digital data representing the amounts of said commodities that said e-agent computer programs accept from said intermediary computer program, and wherein at least one of said e-agent computer programs generates electronic counter-offer messages by executing a computer program that substantially maximizes the value of a utility function of said commodity amounts.

28. The computer system of claim 27 wherein said utility function is determined according to mean-variance portfolio methods.

29. The computer system of claim 28 wherein said utility function comprises a difference of two terms, a first term representing the expected return from a portfolio having said commodity amounts and a second term representing the risk of a portfolio having said commodity amounts.

30. The computer system of claim 27 wherein said maximization of said utility function is limited by optional constraints.

31. The computer system of claim 1 wherein said electronic counter-offer messages contain digital data representing the amounts of said commodities that said e-agent computer programs accept from said intermediary computer program, and wherein at least one of said e-agent computer programs for said associated participant generates electronic counter-offer messages by executing procedural rules having variables referring to said commodity amounts.

32. The computer system of claim 1 wherein at least one of said e-agent computer programs is provided by said associated participant.

33. The computer system of claim 1 wherein at least one of said e-agent computer programs is memoryless.

34. The computer system of claim 1 wherein at least one of said participants is associated with more than one e-agent computer programs.

35. The computer system of claim 1 wherein at least one of said e-agent computer programs is an autonomously running computer process.

36. The computer system of claim 1 wherein at least one of said e-agent computer programs are executed on the same computer-based machine as said intermediary computer program.

37. The computer system of claim 1 wherein at least one of said e-agent computer programs are executed on a computer-based machine geographically remote from the computer-based machine on which said intermediary computer program is executed.

38. The computer system of claim 1 further comprising communications means for sending digital information representing said electronic offer messages and said electronic counter-offer messages between said e-agent computer programs and said intermediary computer program.

39. The computer system of claim 38 wherein said communication means includes means functioning according to the IP or the TCP/IP communication protocols.

40. The computer system of claim 38 wherein said communication means includes inter-process communication means of an operating system of one of said computer-based machines running at least one of said e-agent computer programs and said intermediary computer program.

41. The computer system of claim 38 wherein said communication means includes inter-computer communication means between at least two of said computer-based machines where said e-agent computer programs and said intermediary computer programs are executed.

42. The computer system of claim 1 wherein said e-agent computer programs receive electronic order messages from computers of said associated participants, said electronic order messages containing digital data representing said commodity exchange objectives of said associated participants, and wherein said intermediary computer program sends electronic results messages to said computers of said participants, said electronic results messages containing digital data representing the results of an intermediated exchange.

43. The computer system of claim 42 wherein said digital data representing said commodity exchange objectives of said participants is tested before said electronic intermediated exchange begins.

44. The computer system of claim 1 further comprising a supervisor computer program running on at least one of said computer-based machines, and wherein said supervisor periodically tests each computer program of said computer computer system to determine if it has failed.

45. A computer implemented method for an electronic intermediated exchange of a plurality of commodities among a plurality of participants comprising the electronic negotiation steps of:

a. sending a plurality of electronic offer messages generated by an intermediary computer program to a plurality of e-agent computer programs, each e-agent computer program associated with and representing one of said participants, each said electronic offer message including digital data representing amounts of commodities offered to said e-agent computer programs by said intermediary computer program;

b. sending a plurality of electronic counter-offer messages generated by said e-agent computer programs to said intermediary computer program, each said electronic counter-offer message including digital data representing amounts of commodities accepted by said e-agent computer program; and c. repeating steps (a) and (b) until the amounts of commodities in said electronic offer messages are substantially satisfactory to said e-agent computer programs, according to exchange objectives of said participants stored as digital data accessible to said e-agent computer programs, and to said intermediary computer program, according to objectives for said intermediated exchange stored as digital data accessible to said intermediary computer program.

46. The method of claim 45 wherein said electronic counter-offer messages generated by said e-agent computer programs represent accepted amounts of commodities that are less than or equal to amounts of commodities represented in one or more of said preceding electronic offer messages received from said intermediary computer program.

47. The method of claim 46 wherein said one or more preceding electronic offer messages is the immediately preceding electronic offer message.

48. The method of claim 45 wherein step (c) terminates when said e-agent computer programs generate electronic counter-offer messages representing acceptance of the total amounts of commodities offered in the immediately preceding electronic offer messages received from said intermediary computer program.

49. The method of claim 45 wherein step (a) further comprises said intermediary computer program, first, determining digital data representing a plurality of bounds, each said bound representing a maximum amount of a particular commodity that can be offered to a particular e-agent computer program in a current round of said electronic negotiation, and second, generating said electronic offer messages representing offered amounts of commodities less than or equal to the appropriate one of said bounds.

50. The method of claim 49 further comprising before step (a) a step of sending a plurality of electronic opening messages from said e-agent computer programs to said intermediary computer program, each said electronic opening message including digital data representing maximum amounts of commodities participants will exchange in said intermediated exchange, and wherein said intermediary determines said bounds initially to be said maximum amounts.

51. The method of claim 49 wherein said bounds in a later round of said negotiation are not greater than said bounds in an earlier round of said negotiation.

52. The method of claim 49 wherein said plurality of bounds in a current round of said negotiation depends on commodity amounts represented in said intermediary electronic offer messages, said e-agent electronic counter-offer messages, and said bounds from one or more preceding rounds of said negotiation.

53. The method of claim 52 wherein said one or more preceding rounds of said negotiation is the immediately preceding round of said negotiation.

54. The method of claim 49 wherein said plurality of current bounds depends at least on commodity amounts represented in said e-agent electronic counter-offer messages and on said bounds from the immediately preceding round of said negotiation.

55. The method of claim 54 wherein said plurality of bounds depends at least on a weighted average of commodity amounts represented in said e-agent electronic counter-offer messages and said bounds from the immediately preceding round of said negotiation.

56. The method of claim 55 wherein after a selected round of said negotiation said bounds are determined to be equal to commodity amounts represented in said e-agent electronic counter-offer messages from the immediately preceding round of said negotiation.

57. The method of claim 45 further comprising before step (a) a step of sending from said intermediary computer program to said e-agent computer programs a plurality of electronic initial messages, each said electronic initial message including digital data representing the particular commodities that can be exchanged in said intermediated exchange.

58. The method of claim 45 further comprising before step (a) a step of said e-agent computer programs receiving and storing a plurality of electronic order messages from said participants, each said electronic order message including digital data representing said exchange objectives of that participant.

59. The method of claim 45 further comprising after step (c) a step of sending a plurality of electronic results messages to each said participant, each said electronic results message including digital data representing the amounts of commodities in said satisfactory electronic offer message.

60. The method of claim 45 further comprising before step (a) a step of said intermediary computer program receiving and storing electronic objective messages from an operator of said electronic intermediated exchange, each said electronic objective message including digital data representing said objectives of said intermediated exchange.

61. A computer readable medium comprising encoded instructions for causing an electronic computer to function according to claim 45.

62. A computer implement method for representing a participant in an intermediated exchange of commodities, said intermediated exchange performed by an electronic negotiation with an intermediary computer program, said method comprising:

a. receiving an electronic order message from a computer of said participant, said electronic order message including digital data representing the objectives of said participant for said intermediated exchange in order that e-agent computer program can represent said participant;

b. receiving one of a plurality of electronic request messages from said intermediary computer program; and c. sending one of a plurality of electronic response messages to said intermediary computer program in response to said electronic request message, said electronic response message being (i) an electronic opening message, if said electronic request message was a query for an electronic opening message, said electronic opening message including digital data representing the maximum amounts of commodities that said e-agent computer program will exchange in said intermediated exchange, and (ii) an electronic counter-offer message, if said electronic request message was an electronic offer message, said electronic offer message including digital data representing amounts of commodities offered to said e-agent computer program by said intermediary computer program, said electronic counter-offer message including digital data representing amounts of commodities accepted by said e-agent computer program as determined according to exchange objectives, said accepted amounts being less than or equal to said offered amounts and being all equal to said offered amounts only if said offered amounts meet said exchange objectives.

63. The method of claim 62 further comprising, between steps (a) and (b), a step of exchanging one or more electronic initial messages between said e-agent computer program and said intermediary computer program, said electronic initial messages including digital data representing commodities of interest to said participant according to said exchange objectives as determined by said e-agent computer program, and commodities participating in said intermediated exchange with prices for said participating commodities as determined by said intermediary computer program.

64. The method of claim 62 wherein said exchange objectives are expressed as procedural rules which determine accepted amounts of commodities from offered amounts of commodities.

65. The method of claim 62 wherein said exchange objectives are expressed according to mean-variance portfolio theory.

66. The method of claim 65 wherein said exchange objectives are expressed as utility function of commodity amounts, and wherein accepted commodity amounts substantially maximize said utility function subject to maximum amount constraints given by said offered commodity amounts.

67. The method of claim 66 wherein said utility function includes terms representing expected return and expected risk.

68. A computer readable medium comprising encoded instructions for causing an electronic computer to function according to claim 62.

69. A computer implemented method for an intermediated exchange of commodities among a plurality of participants, each participant represented by an e-agent computer program, said method comprising:
   a. sending electronic opening messages to an intermediary computer program from said e-agent computer programs, said electronic opening messages including digital data representing the maximum amount of each commodity that each e-agent computer program will exchange in said intermediated exchange;
   b. sending electronic offer messages by said intermediary computer program to said e-agent computer programs, each said electronic offer message including digital data representing amounts of commodities currently offered to each e-agent computer program, said amounts being determined so that for each commodity the amount being offered for sale by all the e-agent computer programs equals the amount being offered for purchase by all the e-agent computer programs;
   c. receiving electronic counter-offer messages by said intermediary computer program from said e-agent computer programs, each said electronic counter-offer message including digital data representing amounts of offered commodities accepted by each said e-agent computer program, said accepted commodity amounts being less than or equal to said offered commodity amounts;
   d. repeating steps (b) and (c), each repetition being a round of an electronic negotiation, until said e-agent computer programs accept all the amounts of commodities offered, said accepted amounts being final commodity amounts; and
   e. sending results electronic messages to computers of said participants, said electronic results messages including digital data representing said final commodity amounts.

70. The method of claim 69 further comprising before step (a), a step of exchanging one or more electronic initial messages between said intermediary computer programs and said e-agent computer programs, said electronic initial messages including digital data representing commodities that said e-agent computer programs will exchange in said intermediated exchange, and commodities actually participating in said intermediated exchange with prices for said participating commodities.

71. The method of claim 69 wherein step (b) further comprises said intermediary computer program, first, determining digital data representing a plurality of bounds, each said bound representing a maximum amount of a particular commodity that can be offered to a particular e-agent computer program in a current round of said electronic negotiation, and second, generating said electronic offer messages representing offered amounts of commodities that are less than or equal to said bounds.

72. The method of claim 71 wherein said intermediary computer program determines said bounds initially to be said maximum amounts.

73. The method of claim 71 wherein said bounds in a later round of said negotiation are not greater than corresponding bounds in an earlier round of said negotiation.

74. The method of claim 71 wherein said plurality of bounds in a current round of said negotiation depends at least on commodity amounts represented in said intermediary electronic offer messages, said e-agent electronic counter-offer messages, and said bounds from one or more preceding rounds of said negotiation.

75. The method of claim 74 wherein said one or more preceding rounds of said negotiation is the immediately preceding round of said negotiation.

76. The method of claim 71 wherein said plurality of current bounds depends at least on commodity amounts represented in said e-agent electronic counter-offer messages and on said bounds from the immediately preceding round of said negotiation.

77. The method of claim 76 wherein said plurality of bounds depends at least on a weighted average of commodity amounts represented in said e-agent electronic counter-offer messages and said bounds from the immediately preceding round of said negotiation.

78. The method of claim 77 wherein after a selected round of said negotiation said bounds are determined to be equal to commodity amounts represented in said e-agent electronic counter-offer messages from the immediately preceding round of said negotiation.

79. The method of claim 69 further comprising before step (a) a step of sending from said intermediary computer program to said e-agent computer programs a plurality of electronic commodity messages, each said electronic commodity message including digital data representing the particular commodities that can be exchanged in said intermediated exchange.

80. A computer readable medium comprising encoded instructions for causing an electronic computer to function according to claim 69.

81. An order-manager computer system for electronic intermediated exchange of a plurality of commodities among a plurality of participants, said computer system comprising:
   a. one or more computer-based machines;
   b. a plurality of client-interface electronic processes running on one or more of said computer-based machines for communicating with computer-based machines of said participants in order to receive from said participants electronic order messages representing exchange objectives of said participants and to send to said participants electronic results messages representing the commodities exchanged in said intermediated exchange;
   c. an exchange-driver electronic process running on one of said computer-based machines for transferring said electronic order messages and said electronic results messages between said client-interface processes and an intermediary electronic process;
   d. an electronic database running on one of said computer-based machines for storing copies of said order and said electronic results messages, and, in event of process failure in said order-manager computer system, for retrieving said message copies in order to restart said failed process; and e. a plurality of e-agent electronic processes running on one or more of said computer-based machines, each said e-agent process for representing one of said participants according to said exchange objectives by generating electronic counter-offer messages sent to said intermediary process in response to electronic offer messages received from said intermediary process; wherein f. said intermediary electronic process running on one of said computer-based machines for generating said electronic offer messages sent to said e-agent processes in response to said electronic counter-offer messages received from said e-agent processes, said exchange of offer and electronic counter-offer messages being according to a protocol for performing said intermediated exchange, and further for generating said electronic results messages when said intermediated exchange completes.

82. The order-manager computer system of claim 81 further comprising communication means interconnection said computer-based machines.

83. The order-manager computer system of claim 81 wherein said electronic offer messages and said electronic counter-offer messages include digital data representing amounts of commodities, and wherein according to said protocol (i) the amounts of commodities represented in said electronic counter-offer messages are less than or equal to the amounts of commodities represented in immediately preceding corresponding electronic offer messages, and (ii) the amounts of commodities represented in said electronic offer messages are less than or equal to the amounts of commodities represented in immediately preceding corresponding electronic offer messages.

84. The order-manager computer system of claim 81 wherein said intermediary process further comprises:

a. a communications interface component for communicating messages between the intermediary process and the exchange driver process and the database;

b. an allocation component for performing the computations for generating said electronic offer messages; and c. a local data area component for storing data to be exchanged between said communication interface component and said allocation component.

85. The order-manager computer system of claim 81 further comprising:

a. a supervisor process running on one of said computer-based machines for periodically testing other processes of said order-manager computer system for failure, and in case of failure, for managing restart of any failed process detected by the supervisor process; and b. a slave-supervisor process running on one of said computer-based machines for periodically testing said supervisor process for failure, and in case of failure, for assuming the functions of said supervisor process.

* * * * *